US011480262B1

(12) United States Patent
Glick et al.

(10) Patent No.: US 11,480,262 B1
(45) Date of Patent: Oct. 25, 2022

(54) COMPLEMENTARY FLUIDIC VALVES AND SYSTEMS

(71) Applicant: Meta Platforms Technologies, LLC, Menlo Park, CA (US)

(72) Inventors: Casey Glick, Kirkland, WA (US); Erik Samuel Roby, Seattle, WA (US); Andrew Arthur Stanley, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/362,776

(22) Filed: Jun. 29, 2021

Related U.S. Application Data

(63) Continuation of application No. 16/451,964, filed on Jun. 25, 2019, now Pat. No. 11,054,056.

(51) Int. Cl.
*F16K 31/124* (2006.01)
*F16K 31/122* (2006.01)
(Continued)

(52) U.S. Cl.
CPC .......... *F16K 31/1223* (2013.01); *F16K 11/07* (2013.01); *F16K 1/126* (2013.01);
(Continued)

(58) Field of Classification Search
CPC .. F16K 31/1223; F16K 31/363; F16K 31/383; F16K 11/07; F16K 1/126;
(Continued)

(56) References Cited

U.S. PATENT DOCUMENTS 1,849,702 A * 3/1932 Bard .................. F16K 31/1223
92/152
3,070,295 A 12/1962 Glattli
(Continued)

FOREIGN PATENT DOCUMENTS

CH            376688 A    4/1964
DE     102012013594 A1    1/2014
(Continued)

OTHER PUBLICATIONS

Glick C., et al., "Complementary Fluidic Valves and Logic Gates," U.S. Appl. No. 16/408,412, filed May 9, 2019, 118 pages.
(Continued)

*Primary Examiner* — Minh Q Le
(74) *Attorney, Agent, or Firm* — FisherBroyles, LLP

(57) ABSTRACT

A fluidic valve may include an inlet, a control port, an additional control port, an outlet, a fluid channel configured to convey fluid from the inlet to the outlet, and a piston that includes (1) a restricting gate transmission element configured to block, when the piston is in a first position, the fluid channel and unblock, when the piston is in a second position, the fluid channel, (2) a controlling gate transmission element configured to interface with a control pressure from the control port that forces the piston towards the first position when applied to the controlling gate transmission element, and (3) an additional controlling gate transmission element configured to interface with an additional control pressure from the additional control port that forces the piston towards the second position when applied to the additional controlling gate transmission element. Various other related devices, systems, and methods are also disclosed.

20 Claims, 54 Drawing Sheets

(51) Int. Cl.

| | |
|---|---|
| *F16K 11/07* | (2006.01) |
| *F16K 31/383* | (2006.01) |
| *F16K 99/00* | (2006.01) |
| *G05D 7/00* | (2006.01) |
| *G05D 7/01* | (2006.01) |
| *F16K 31/363* | (2006.01) |
| *F16K 1/12* | (2006.01) |

(52) U.S. Cl.
CPC .......... *F16K 31/363* (2013.01); *F16K 31/383* (2013.01); *F16K 99/0055* (2013.01); *F16K 99/0059* (2013.01); *F16K 2099/009* (2013.01); *F16K 2099/0069* (2013.01); *G05D 7/00* (2013.01); *G05D 7/0193* (2013.01)

(58) Field of Classification Search
CPC ............. F16K 99/0055; F16K 99/0059; F16K 2099/0069; F16K 2099/009; G05D 7/00; G05D 7/0193
USPC ............... 137/625.4, 538, 488, 625.2, 625.6, 137/625.26, 596.14, 885, 115.07, 627.5, 137/489.5
See application file for complete search history.

(56) References Cited

U.S. PATENT DOCUMENTS

| | | | |
|---|---|---|---|
| 3,122,313 A | 2/1964 | Glattli | |
| 3,319,654 A | 5/1967 | Giovanni et al. | |
| 3,402,737 A | 9/1968 | Goldstein | |
| 3,447,566 A | 6/1969 | Hayner et al. | |
| 3,596,560 A | 8/1971 | Butterworth | |
| 3,605,811 A | 9/1971 | Lovell et al. | |
| 3,768,374 A * | 10/1973 | Ito | G01P 15/034 303/181 |
| 3,770,012 A * | 11/1973 | Bitzer | G11B 5/5521 235/201 ME |
| 3,805,840 A | 4/1974 | Byers, Jr. | |
| 4,026,193 A | 5/1977 | Olmsted | |
| 4,204,458 A | 5/1980 | Kononov et al. | |
| 4,226,543 A | 10/1980 | Schluter | |
| 4,630,645 A | 12/1986 | Spa | |
| 5,492,149 A | 2/1996 | Loschelder et al. | |
| 6,237,635 B1 | 5/2001 | Nambu | |
| 9,611,943 B2 | 4/2017 | Chen et al. | |
| 11,054,056 B1 | 7/2021 | Glick et al. | |
| 11,125,255 B1 | 9/2021 | Stanley et al. | |
| 2005/0012058 A1 | 1/2005 | Medina | |
| 2007/0075286 A1 | 4/2007 | Tanner | |
| 2010/0148099 A1 * | 6/2010 | Lundberg | F16K 11/07 251/63 |
| 2016/0186885 A1 * | 6/2016 | LaVallee, III | F16K 31/1225 251/26 |
| 2019/0145542 A1 | 5/2019 | Rehhoff et al. | |
| 2019/0249789 A1 | 8/2019 | John et al. | |
| 2021/0010495 A1 | 1/2021 | Stanley et al. | |
| 2021/0018102 A1 * | 1/2021 | Stanley | F16K 3/0254 |

FOREIGN PATENT DOCUMENTS

| | | |
|---|---|---|
| GB | 878697 A | 10/1961 |
| GB | 1217496 A | 12/1970 |
| WO | 2021007220 A1 | 1/2021 |

OTHER PUBLICATIONS

Glick C., et al., "Complementary Fluidic Valves and Systems," U.S. Appl. No. 16/451,964, filed Jun. 25, 2019, 139 pages.

International Search Report and Written Opinion for International Application No. PCT/US2020/041027, dated Oct. 26, 2020, 10 Pages.

Non-Final Office Action dated Jan. 6, 2021 for U.S. Appl. No. 16/408,412, filed May 9, 2019, 42 Pages.

Non-Final Office Action dated Jan. 7, 2021 for U.S. Appl. No. 16/408,413, filed May 9, 2019, 40 Pages.

Non-Final Office Action dated Jan. 15, 2021 for U.S. Appl. No. 16/507,788, filed Jul. 10, 2019, 42 Pages.

Non-Final Office Action dated Nov. 16, 2020 for U.S. Appl. No. 16/451,964, filed Jun. 25, 2019, 17 Pages.

"Pneumatic Logic & Controls," Telepneumatic [Online], Jun. 30, 2017, 104 pages, Retrieved from the Internet: URL: https://www.parker.com/literature/Literature%20Files/pneumatic/Literature/Telepneumatic/PCC-4.pdf.

Stanley A.A., et al., "Complementary Fluidic Logic and Memory Devices," U.S. Appl. No. 16/507,788, filed Jul. 10, 2019, 187 pages.

Stanley A.A., et al., "Complementary Fluidic Valves, Logic Gates, and Latches," U.S. Appl. No. 16/408,413, filed May 9, 2019, 146 pages.

Notice of Allowance received for U.S. Appl. No. 16/507,788 dated Jul. 20, 2021, 19 pages.

Notice of Allowance received for U.S. Appl. No. 16/408,413 dated Jun. 17, 2021, 20 pages.

Notice of Allowance received for U.S. Appl. No. 16/451,964 dated Mar. 2, 2021, 19 pages.

Notice of Allowance received for U.S. Appl. No. 16/408,412 dated Jun. 15, 2021, 20 pages.

* cited by examiner

| INVERTER TRUTH TABLE 700 ||
|---|---|
| INPUT | OUTPUT |
| 0 | 1 |
| 1 | 0 |

*FIG. 7*

FULL-ADDER TRUTH TABLE 2000

| INPUTS | | | OUTPUT | |
|---|---|---|---|---|
| A | B | $C_{IN}$ | $C_{OUT}$ | S |
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

*FIG. 20*

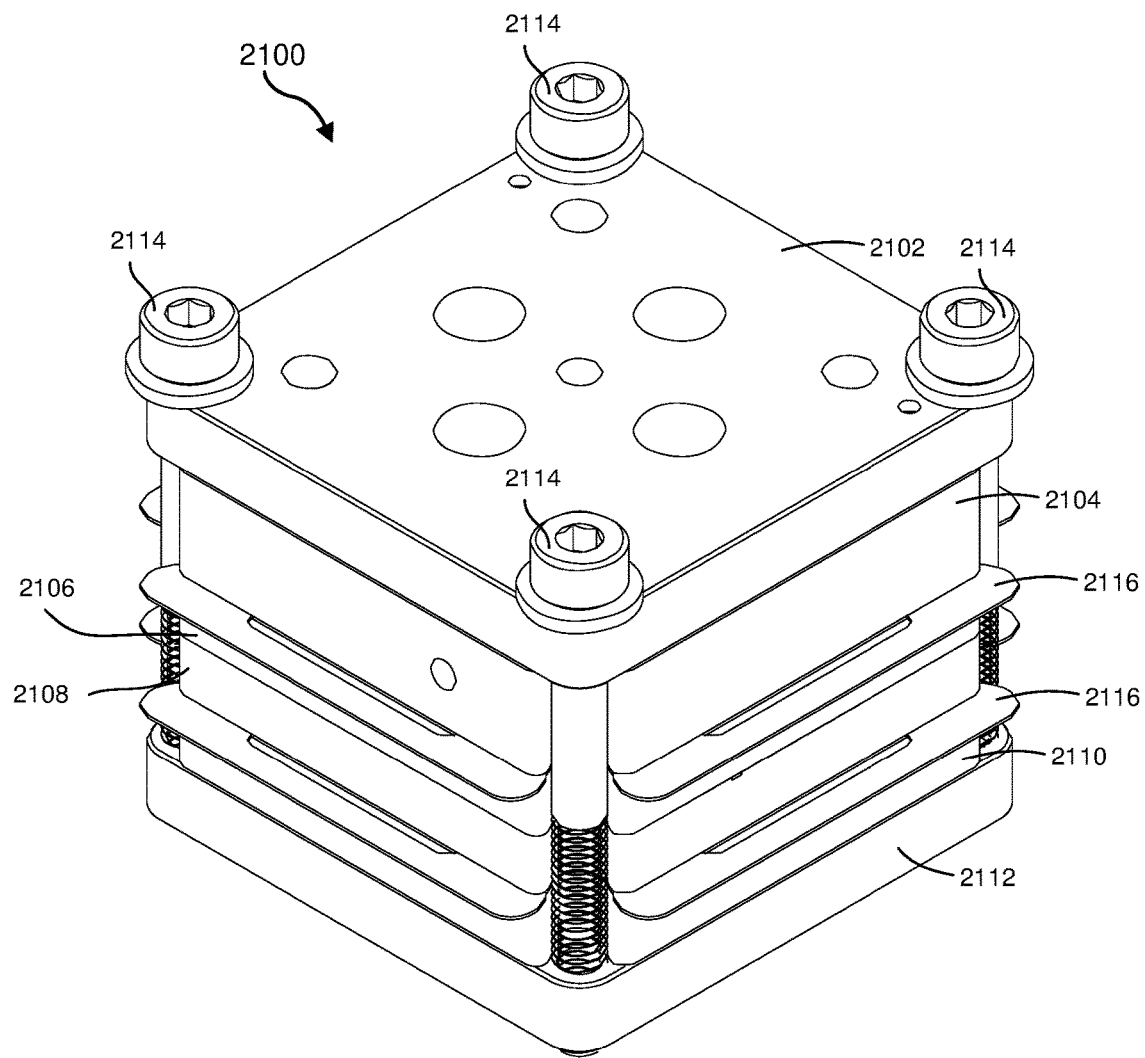
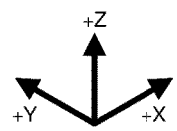
FIG. 21

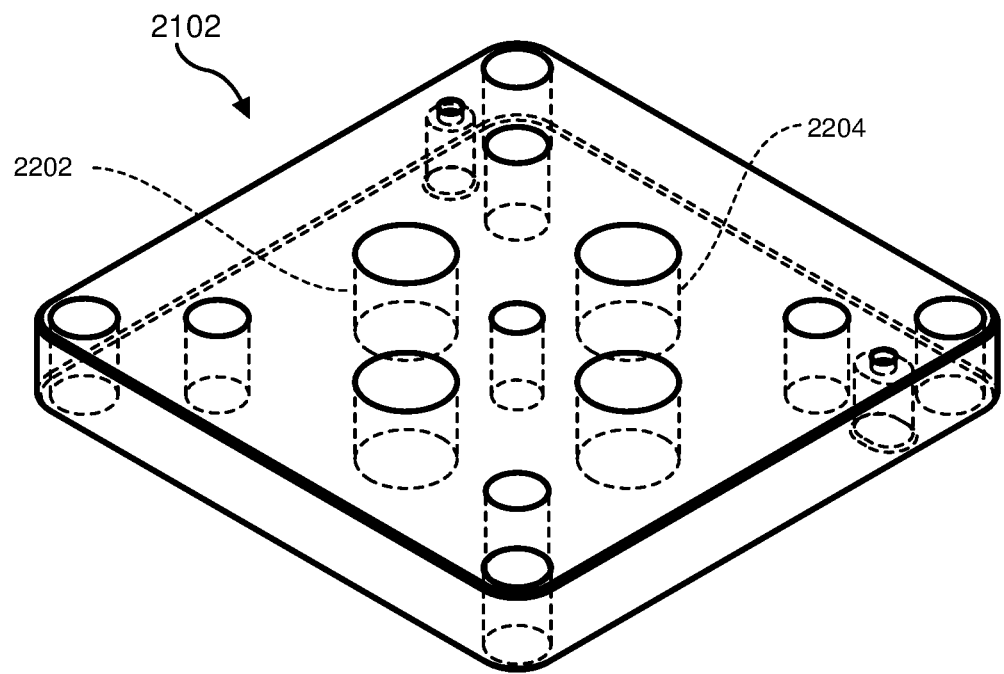
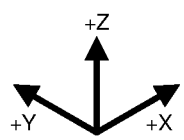
FIG. 22

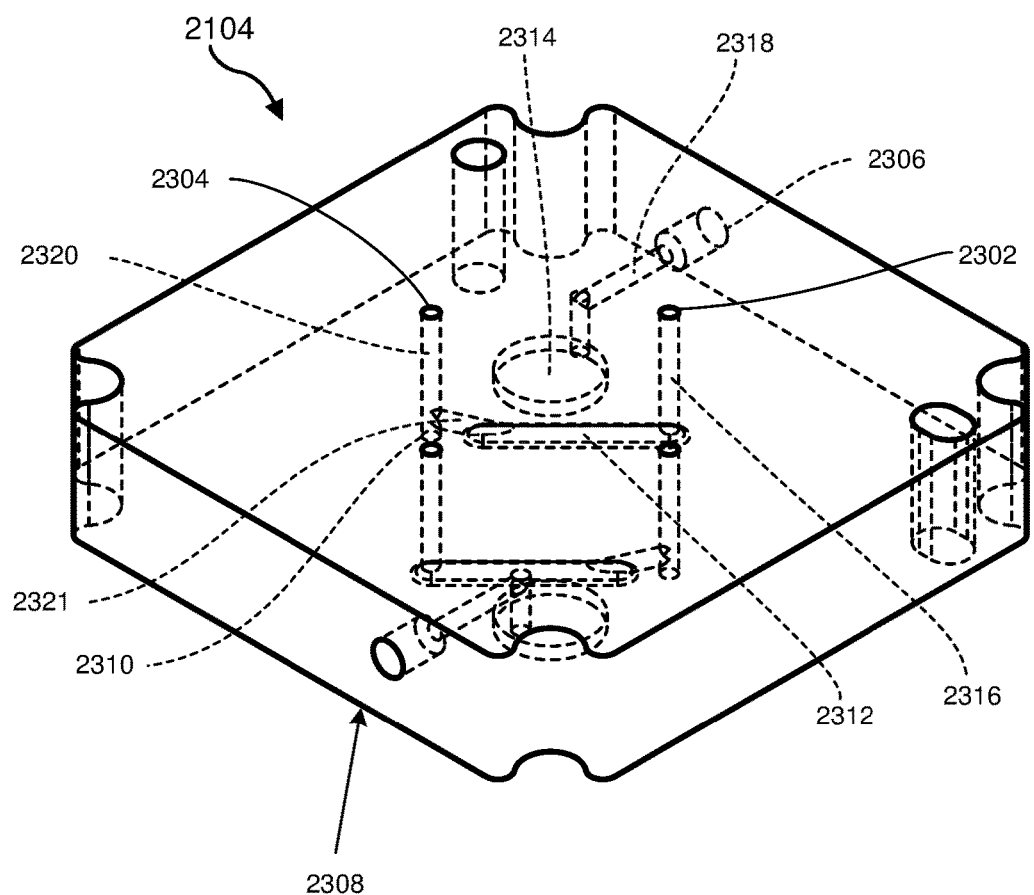
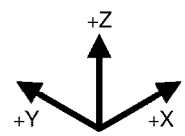
FIG. 23

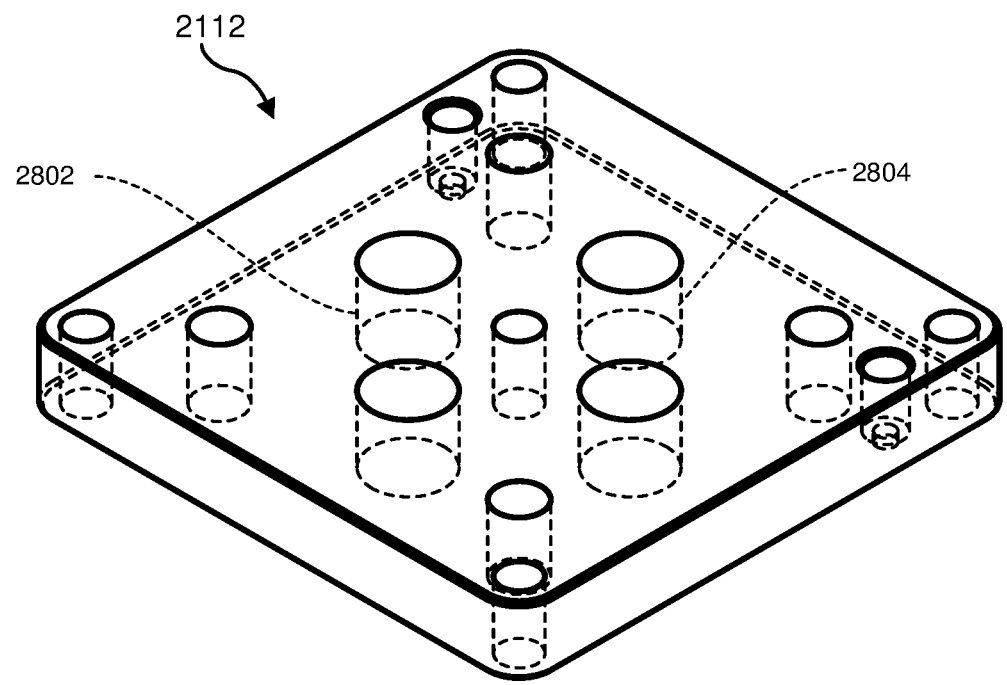
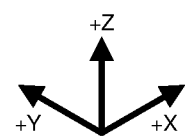
FIG. 28

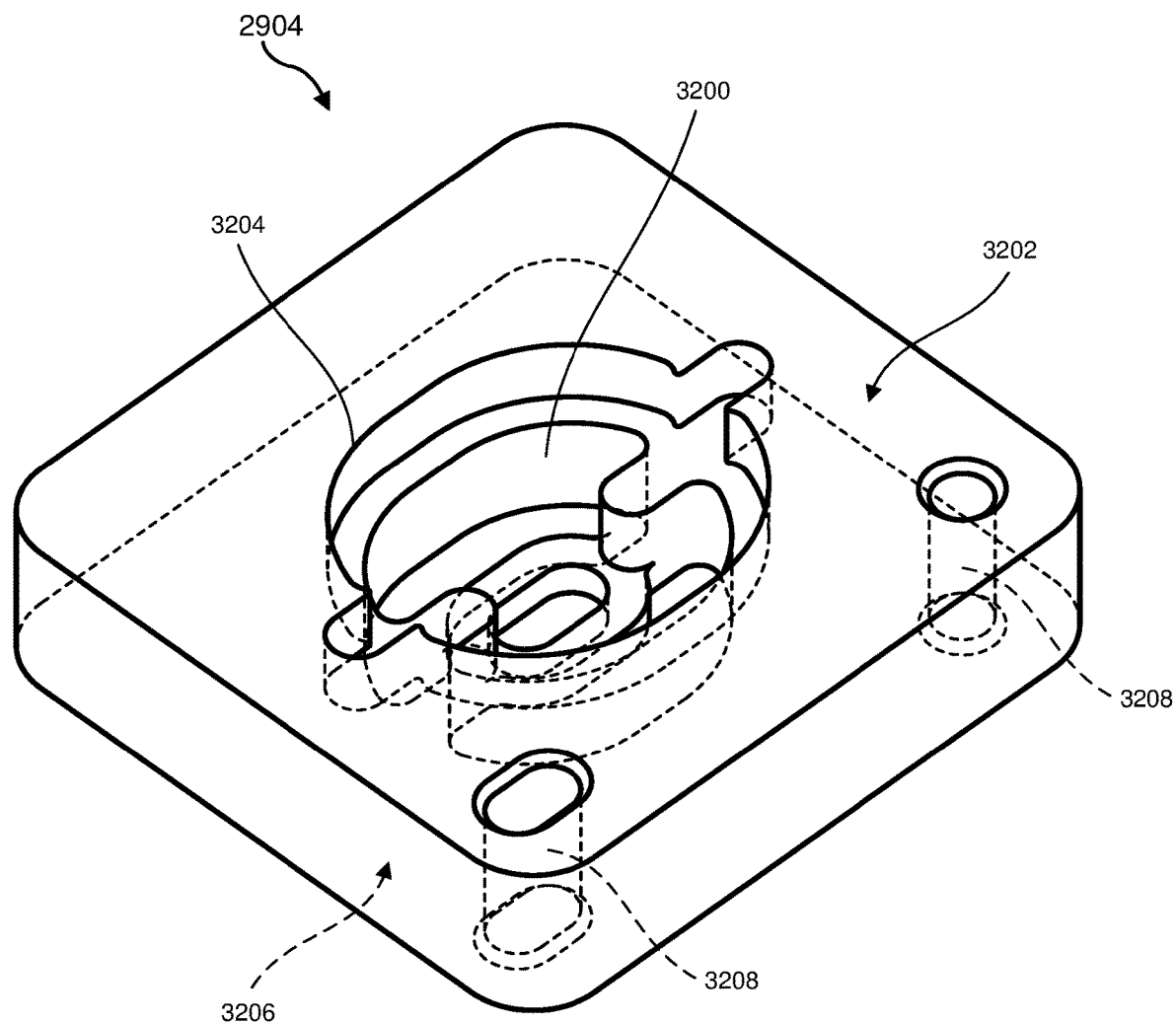
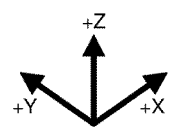
FIG. 32

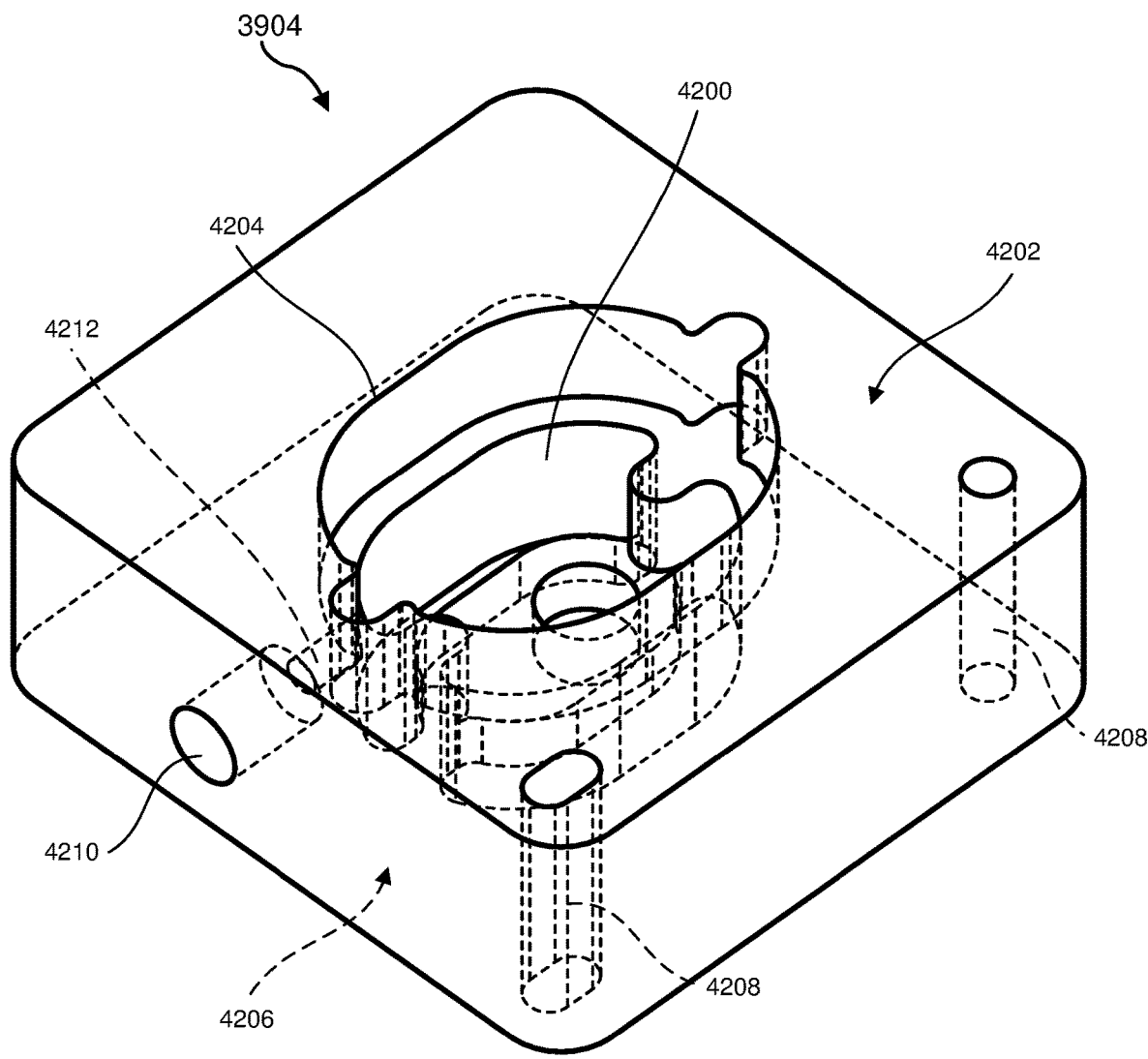
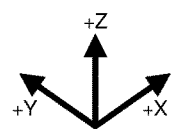
FIG. 42

COMPLEMENTARY FLUIDIC VALVES AND SYSTEMS

CROSS REFERENCE TO RELATED APPLICATION

This application is a continuation of U.S. application Ser. No. 16/451,964 filed 25 Jun. 2019, the disclosures of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 4A and 4B are schematic diagrams of another exemplary complementary fluidic valve, according to at least one embodiment of the present disclosure.

FIG. 7 is a diagram of a truth table of the inverter of FIGS. 6A and 6B, according to some embodiments.

FIG. 20 is a diagram of a truth table of the fluidic valve and systems of FIGS. 17-19, according to some embodiments.

FIG. 21 is a perspective view of an exemplary fluidic-valve device, according to at least one embodiment of the present disclosure.

FIG. 22 is a partially transparent perspective view of an exemplary top clamping layer of the fluidic-valve device of FIG. 21, according to at least one embodiment of the present disclosure.

FIG. 23 is a partially transparent perspective view of an exemplary layer of the fluidic-valve device of FIG. 21, according to at least one embodiment of the present disclosure.

FIG. 28 is a partially transparent perspective view of an exemplary bottom clamping layer of the fluidic-valve device of FIG. 21, according to at least one embodiment of the present disclosure.

FIG. 32 is a partially transparent perspective view of another exemplary layer of the fluidic-valve device of FIG. 29, according to at least one embodiment of the present disclosure.

FIG. 42 is a partially transparent perspective view of another exemplary layer of the fluidic-valve device of FIG. 39, according to at least one embodiment of the present disclosure.

Figure 1:
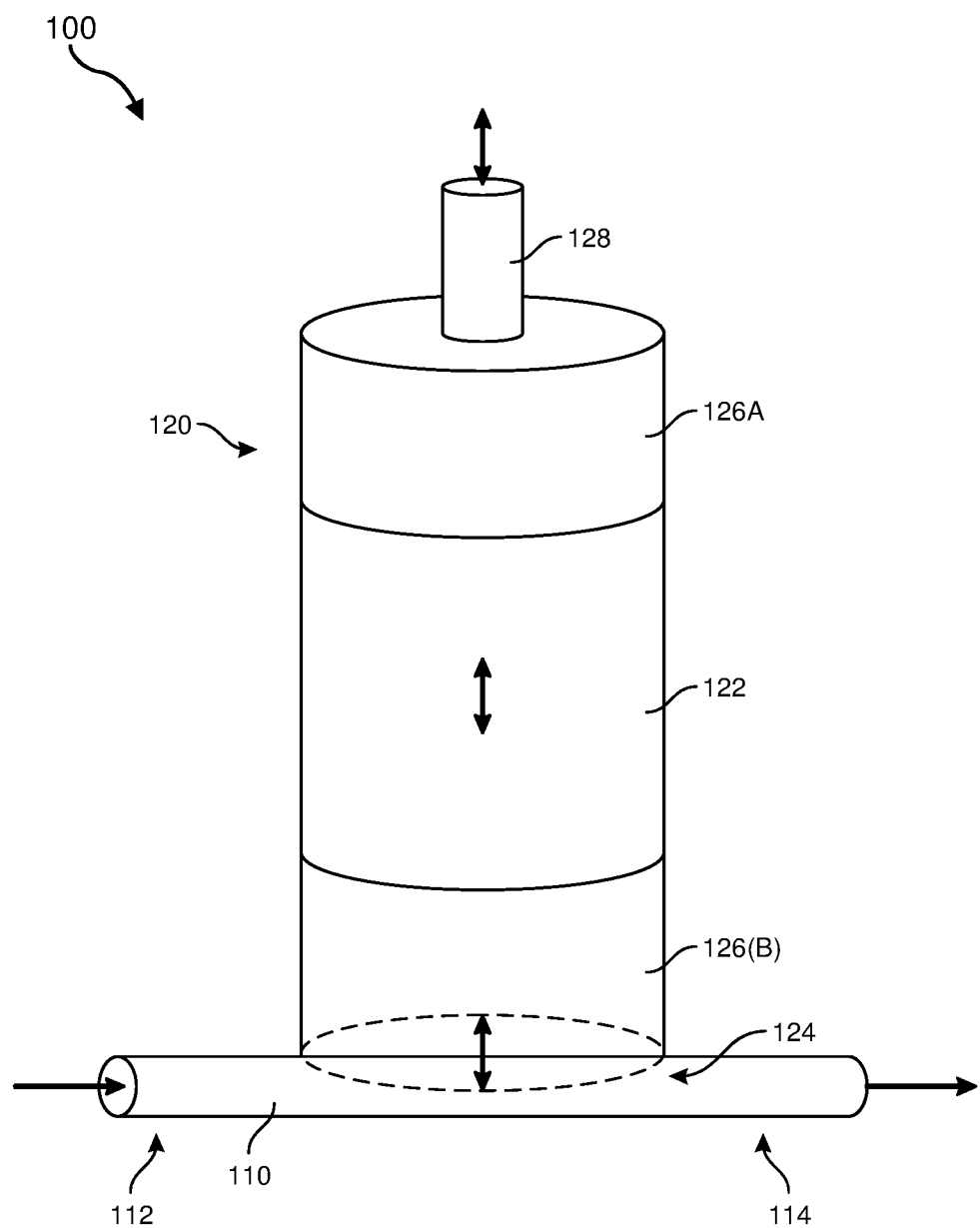
FIG. 1 is an illustration of an exemplary fluidic control system that may be used in connection with embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to complementary fluidic valves and systems that may be used in various fluidic circuits or systems to perform a wide range of functions and logical operations. For example, as will be explained in greater detail below, embodiments of the instant disclosure may be configured as three-way valves, normally open valves, normally closed valves, binary inverters, threshold detectors, fluidic pressure adders, and/or full adders. Embodiments of the instant disclosure may use a single rigid or mostly rigid piston that has at least two upper gate transmission elements (an upper restricting gate transmission element and an upper controlling gate transmission element) and at least two lower gate transmission elements (a lower restricting gate transmission element and a lower controlling gate transmission element). The upper restricting gate transmission element may be configured to restrict fluid flow in an upper fluid channel when the rigid piston is in an upward position and allow fluid flow in the upper fluid channel when the rigid piston is in a downward position. Similarly, the lower restricting gate transmission element may be configured to restrict fluid flow in a lower fluid channel when the rigid piston is in the downward position and allow fluid flow in the lower fluid channel when the rigid piston is in the upward position.

Embodiments of the instant disclosure may provide various features and advantages over traditional fluidic valves. For example, embodiments of the instant disclosure may provide, using only a single component or design, various inverting and non-inverting functions with low-leakage control of outlet pressures. Because embodiments of the instant disclosure may use a single piston to open a top valve at the same time a bottom valve closes, embodiments of the instant disclosure may operate as a low-mechanical-complexity three-way valve with fractional movements between fluid channels. By using a large surface-area differential between controlling gate transmission elements and restricting gate transmission elements, embodiments of the instant disclosure may use smaller control fluid pressures to actuate against higher source fluid pressures.

The present disclosure may include fluidic systems that involve the control (e.g., stopping, starting, restricting, increasing, etc.) of fluid flows through fluid channels. The control of fluid flow may be accomplished with a fluidic valve. FIG. 1 shows a schematic diagram of a fluidic valve 100 for controlling flow through a fluid channel 110, according to at least one embodiment of the present disclosure. Fluid from a fluid source (e.g., a pressurized fluid source, a fluid pump, etc.) may flow through the fluid channel 110 from an inlet port 112 to an outlet port 114, which may be operably coupled to, for example, a fluid-driven mechanism, another fluid channel, or a fluid reservoir.

Fluidic valve 100 may include a gate 120 for controlling the fluid flow through fluid channel 110. Gate 120 may include a gate transmission element 122, which may be a movable component that is configured to transmit an input force, pressure, or displacement to a restricting region 124 to restrict or stop flow through the fluid channel 110. Conversely, in some examples, application of a force, pressure, or displacement to gate transmission element 122 may result in opening restricting region 124 to allow or increase flow through the fluid channel 110. The force, pressure, or displacement applied to gate transmission element 122 may be referred to as a gate force, gate pressure, or gate displacement. Gate transmission element 122 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 1, gate 120 of fluidic valve 100 may include one or more gate terminals, such as an input gate terminal 126A and an output gate terminal 126B (collectively referred to herein as "gate terminals 126") on opposing sides of gate transmission element 122. Gate terminals 126 may be elements for applying a force (e.g., pressure) to gate transmission element 122. By way of example, gate terminals 126 may each be or include a fluid chamber adjacent to gate transmission element 122. Alternatively or additionally, one or more of gate terminals 126 may include a solid component, such as a spring, a lever, screw, or piston, that is configured to apply a force to gate transmission element 122.

In some examples, a gate port 128 may be in fluid communication with input gate terminal 126A for applying a positive or negative fluid pressure within the input gate terminal 126A. A control fluid source (e.g., a pressurized fluid source, a fluid pump, etc.) may be in fluid communication with gate port 128 to selectively pressurize and/or depressurize input gate terminal 126A. In additional embodiments, a force or pressure may be applied at the input gate terminal 126A in other ways, such as with a piezoelectric element or an electromechanical actuator, etc.

In the embodiment illustrated in FIG. 1, pressurization of the input gate terminal 126A may cause the gate transmission element 122 to be displaced toward restricting region 124, resulting in a corresponding pressurization of output gate terminal 126B. Pressurization of output gate terminal 126B may, in turn, cause restricting region 124 to partially or fully restrict to reduce or stop fluid flow through the fluid channel 110. Depressurization of input gate terminal 126A may cause gate transmission element 122 to be displaced away from restricting region 124, resulting in a corresponding depressurization of the output gate terminal 126B. Depressurization of output gate terminal 126B may, in turn, cause restricting region 124 to partially or fully expand to allow or increase fluid flow through fluid channel 110. Thus, gate 120 of fluidic valve 100 may be used to control fluid flow from inlet port 112 to outlet port 114 of fluid channel 110.

Figure 2:
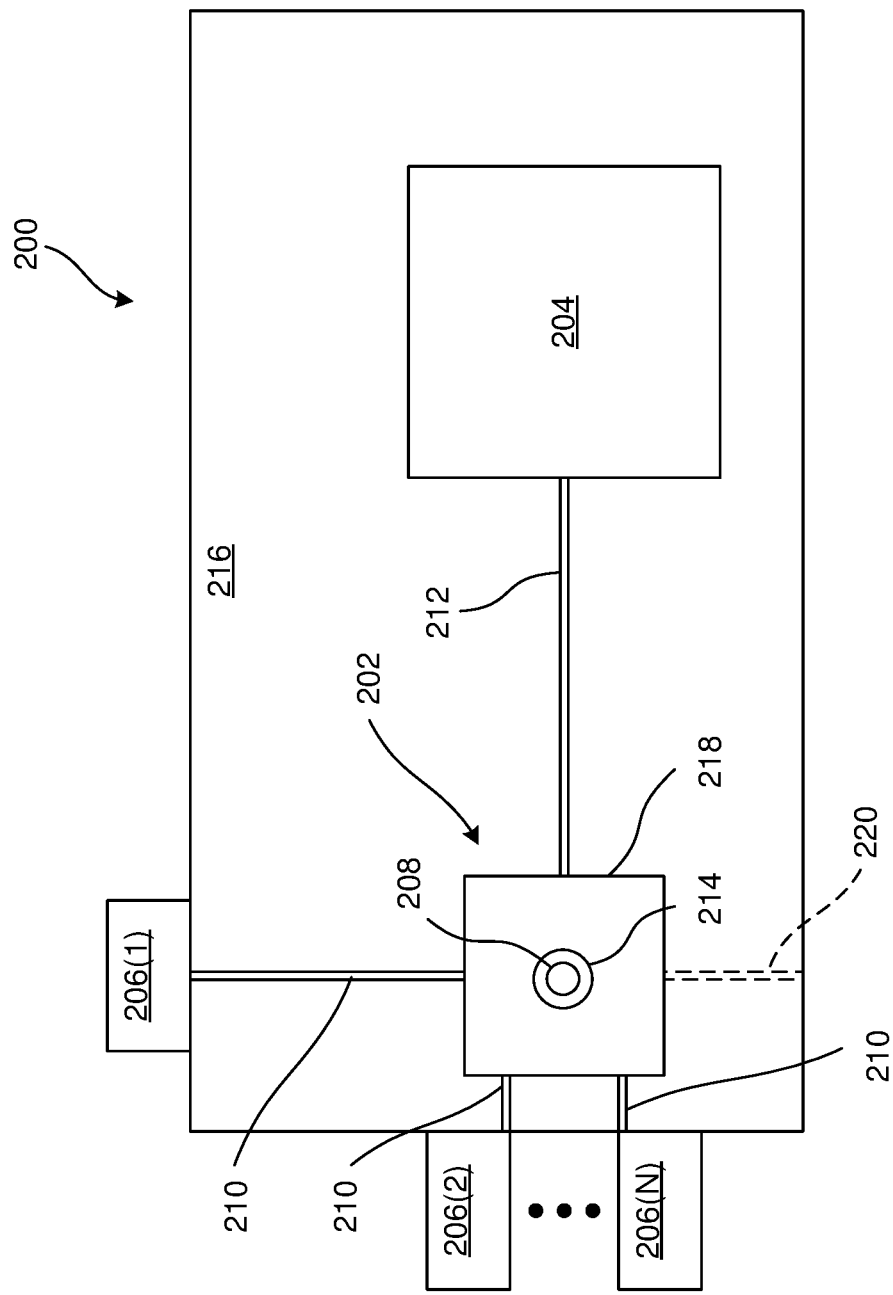
FIG. 2 is a block diagram of an exemplary fluidic system, according to at least one embodiment of the present disclosure.

FIG. 2 is a schematic view of a fluidic system 200 that includes a fluidic valve 202, a fluid-driven mechanism 204 configured to be activated, controlled, or fed by fluidic valve 202, and one or more fluid sources 206(1)-(N) for controlling and/or being controlled by fluidic valve 202. In some examples, the flow of a fluid from one of fluid sources 206(1)-(N) may be controlled by a piston 208 of fluidic valve 202. A port 210 (e.g., an inlet port or a control port) may provide fluid communication between each of fluid sources 206(1)-(N) and fluidic valve 202. An outlet port 212 may provide fluid communication between fluidic valve 202 and fluid-driven mechanism 204. As shown, fluidic valve 202 may include piston 208 that may be movable within a cavity 214 to open and close fluidic valve 202 for controlling flow of the fluid.

Fluidic system 200 may include a substrate 216, within which or on which at least some of the components of fluidic system 200 are disposed. For example, at least a portion of substrate 216 may define one or more of a valve body 218 of fluidic valve 202, fluid sources 206, ports 210, outlet port 212, cavity 214, and/or fluid-driven mechanism 204. In some embodiments, substrate 216 may include a stack of materials, such as a drive body portion, at least one flexible material (e.g., an elastic material), a gate body portion, and/or a fluid channel body portion. In some examples, the term "flexible" may mean capable of flexing and/or returning to an original state without permanent damage. A flexible material may also be stretchable. In some examples, substrate 216 may include at least one of silicon, silicon dioxide, a glass, and/or a rigid polymer (e.g., a polycarbonate material, an acrylic material, a urethane material, a fluorinated elastomer material, a polysiloxane material, etc.).

Fluid-driven mechanism 204 may be any fluid load or mechanism that may be driven or controlled by flowing and/or pressurization of fluid. By way of example and not limitation, fluid-driven mechanism 204 may include at least one of a microelectromechanical device (e.g., a so-called "MEMS" device), an expansible cavity, a piston system, and/or a haptic feedback device. Each of fluid sources 206 may be any source or mechanism that can provide a pressurized fluid (e.g., gas (e.g., air, nitrogen, etc.) or liquid (e.g., water, oil, etc.)) to fluidic valve 202. By way of example and not limitation, fluid sources 206 may each be or include a pressurized reservoir, a fan, a pump, or a piston system, etc. In some examples, one or more of fluid sources 206 may be capable of providing a pressurized fluid at a high pressure and/or a low pressure. In general, a "high pressure" may be any pressure of a fluid that falls within a high or maximum pressure range, and a "low pressure" may be any pressure of a fluid that falls within a low or minimum pressure range. In some situations, a pressure falling within a high pressure range may be considered to represent one state (e.g., "1") of a bit or binary digit, and a pressure falling within a low pressure range may be considered to represent the other state (e.g., "0") of a bit or binary digit. In some examples, one or more fluid sources 206 may be a source of fluid pressures or a drain of fluid pressures.

Optionally, in some embodiments, an interstitial-pressure inlet/outlet 220 (shown in FIG. 2 in dashed lines) may be in fluid communication with fluidic valve 202. Interstitial-pressure inlet/outlet 220 may enable one or more chambers within fluidic valve 202 to expand and/or contract as piston 208 is moved back and forth to open or close fluidic valve 202, as will be explained in further detail below.

In some embodiments, fluidic system 200 may be incorporated in a pneumatic control system and/or may be used for industrial pneumatic controls. Additionally or alternatively, fluidic system 200 may be incorporated in a haptic feedback device, such as for use with an artificial reality (e.g., virtual reality, augmented reality, mixed reality, or hybrid reality) system. Fluidic system 200 may be positioned on or in a wearable device (e.g., a headband, a head-mounted display, a glove, an armband, etc.) that is configured to provide haptic feedback (e.g., vibration, pressure, etc.) to a user. For example, fluid-driven mechanism 204 of fluidic system 200 may be an expansible cavity configured to fill and expand with the fluid upon opening of fluidic valve 202. The expanding cavity may press against the user, and the user may sense the pressure from the expanding cavity, such as resulting from an action taken by the user in the artificial reality. By way of example, fluidic system 200 may be incorporated in a finger of a glove, and the user may use his or her finger in space to make a selection in an artificial reality environment. The expansible cavity of fluidic system 200 may be filled and expanded with the fluid to provide a pressure point on the user's finger to confirm the selection made by the user. The pressure point may provide a sensation that the user is touching a real object. Alternatively, fluid-driven mechanism 204 may include an eccentric rotating element that may be rotated by the flowing fluid when fluidic valve 202 is in an open state, resulting in a vibrating sensation as haptic feedback for the user.

Figure 3A:
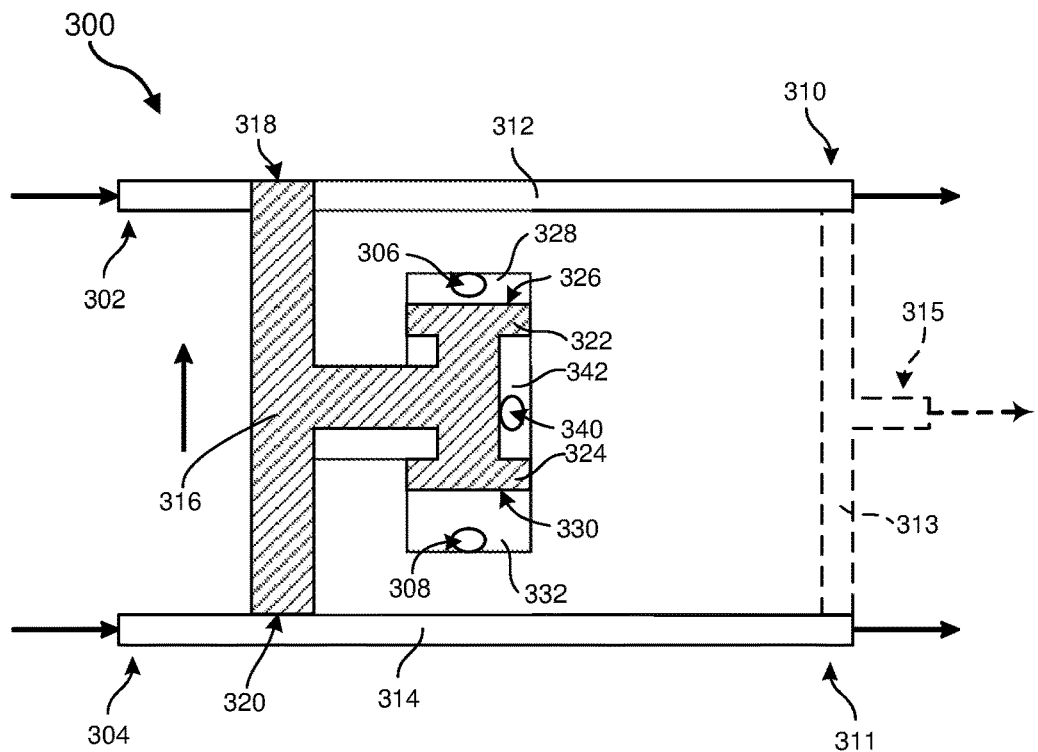
FIGS. 3A and 4B are schematic diagrams of an exemplary complementary fluidic valve, according to at least one embodiment of the present disclosure.
Figure 3B:
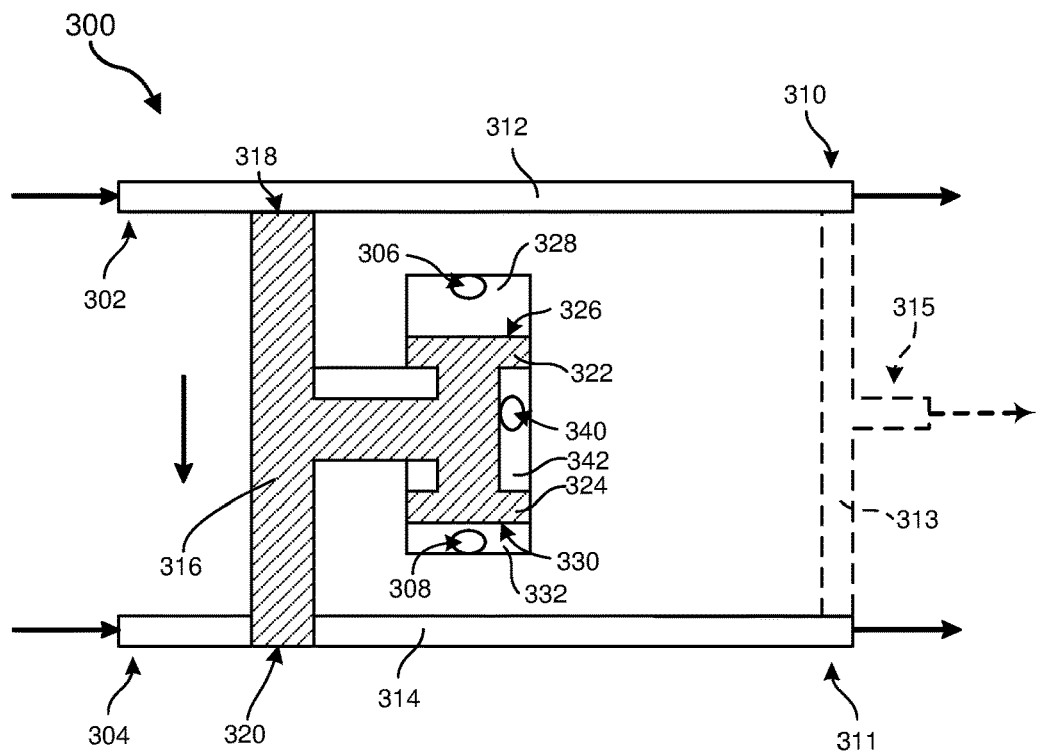

Fluidic valve 202 in FIG. 2 may have various forms and configurations. FIGS. 3A and 3B are schematic diagrams illustrating two positions of an exemplary fluidic valve 300. As shown, fluidic valve 300 may include an inlet port 302, an inlet port 304, a control port 306, a control port 308, an outlet port 310, an outlet port 311, a fluid channel 312 configured to convey fluid from inlet port 302 to outlet port 310, a fluid channel 314 configured to convey fluid from inlet port 304 to outlet port 311, and a piston 316. In at least one example, an internal or external fluid channel 313 may be configured to convey fluid from fluid channel 312 or outlet port 310 to fluid channel 314 or outlet port 311. Additionally, fluid channel 313 may include an additional outlet port 315.

In some examples, piston 316 may be formed from a single piece of a substantially rigid material (e.g., a rigid plastic, metal, or glass). Alternatively, piston 316 may be formed from a substantially rigid composite part. Piston 316 may include a restricting gate transmission element 318 configured to block or restrict fluid channel 312 when piston 316 is in the position illustrated in FIG. 3A and unblock fluid channel 312 when piston 316 is in the position illustrated in FIG. 3B. Piston 316 may also include a restricting gate transmission element 320 configured to block or restrict fluid channel 314 when piston 316 is in the position illustrated in FIG. 3B and unblock fluid channel 314 when piston 316 is in the position illustrated in FIG. 3A. Because of the complementary positions of restricting gate transmission elements 318 and 320, fluid flow may not tend to flow directly from inlet port 302 to inlet port 304 if/when fluid channel 313 joins outlet ports 310 and 311. Piston 316 may include complementary or opposing piston heads 322 and 324. Piston head 322 may have a controlling gate transmission element 326 configured to interface with a control pressure 328 from control port 306 that, when applied to controlling gate transmission element 326 forces piston 316 towards the position illustrated in FIG. 3B. Similarly, piston head 324 may have a controlling gate transmission element 330 configured to interface with a control pressure 332 from control port 308 that, when applied to controlling gate transmission element 330 forces piston 316 towards the position illustrated in FIG. 3A. In at least one example, control port 306 or control port 308 may be permanently closed or absent and control pressure 328 or control pressure 332 may be generated by a mechanical preload force.

In some embodiments, fluidic valve 300 may include an interstitial-pressure outlet/inlet 340 that may direct fluid pressures from/to interstitial region 342. In some examples, interstitial-pressure outlet/inlet 340 may connect interstitial region 342 to an outside atmosphere or an additional control fluid source. In some embodiments, the additional control fluid source may modulate fluid pressures within interstitial region 342 to actuate piston 316 or modulate the level of control pressures 328 and/or 332 at which piston 316 actuates.

As shown in FIGS. 3A and 3B, controlling gate transmission elements 326 and 330 may have substantially the same surface areas. As such, movement of piston 316 from the position illustrated in FIG. 3A to the position illustrated in FIG. 3B may require a greater fluid pressure at control port 306 than at control port 308. Similarly, movement of piston 316 from the position illustrated in FIG. 3B to the position illustrated in FIG. 3A may require a greater fluid pressure at control port 308 than at control port 306. In alternative embodiments, controlling gate transmission elements 326 and 330 may have different surface areas. In some examples, restricting gate transmission elements 318 and 320 may have substantially the same surface areas, which may be substantially less than the surface areas of controlling gate transmission elements 326 and 330. As such, movement of piston 316 may be mostly caused by the fluid pressures applied to control port 306 and 308 rather than any fluid pressures applied to inlet ports 302 and 304.

Figure 4A:
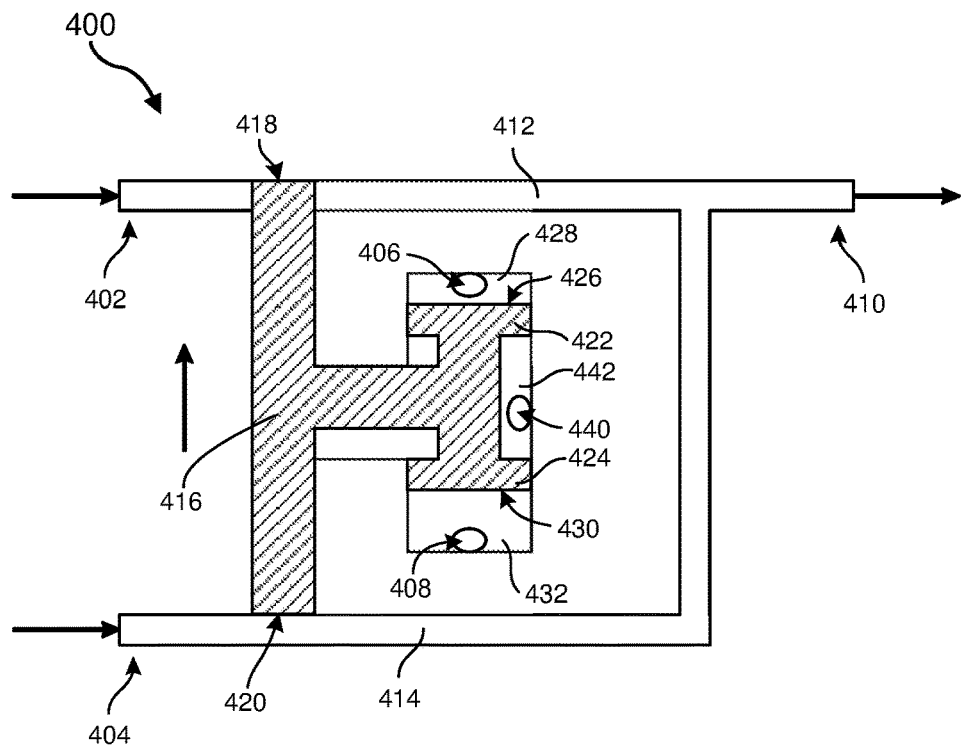
Figure 4B:
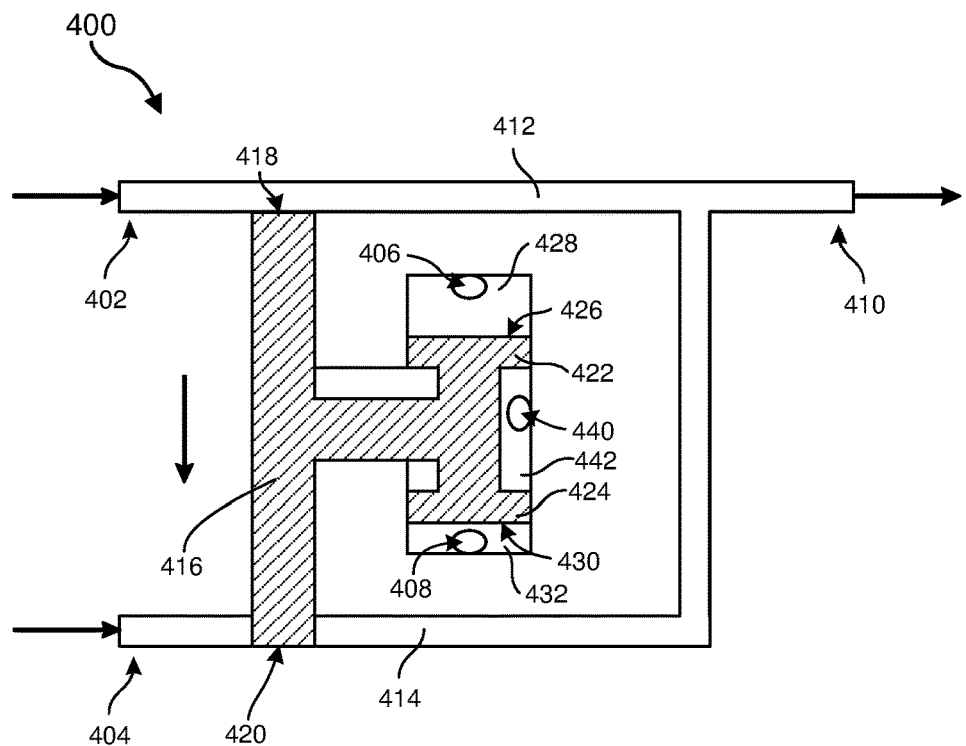

FIGS. 4A and 4B are schematic diagrams illustrating two positions of an exemplary fluidic valve 400. As shown, fluidic valve 400 may include an inlet port 402, an inlet port 404, a control port 406, a control port 408, an outlet port 410, a fluid channel 412 configured to convey fluid from inlet port 402 to outlet port 410, a fluid channel 414 configured to convey fluid from inlet port 404 to outlet port 410, and a piston 416. In some examples, piston 416 may be formed from a single piece of a substantially rigid material (e.g., a rigid plastic, metal, or glass). Alternatively, piston 416 may be formed from a substantially rigid composite part. Piston 416 may include a restricting gate transmission element 418 configured to block or restrict fluid channel 412 when piston 416 is in the position illustrated in FIG. 4A and unblock fluid channel 412 when piston 416 is in the position illustrated in FIG. 4B. Piston 416 may also include a restricting gate transmission element 420 configured to block or restrict fluid channel 414 when piston 416 is in the position illustrated in FIG. 4B and unblock fluid channel 414 when piston 416 is in the position illustrated in FIG. 4A. Because of the complementary positions of restricting gate transmission elements 418 and 420, fluid flow may not tend to flow directly from inlet port 402 to inlet port 404. Piston 416 may include complementary or opposing piston heads 422 and 424. Piston head 422 may have a controlling gate transmission element 426 configured to interface with a control pressure 428 from control port 406 that, when applied to controlling gate transmission element 426 forces piston 416 towards the position illustrated in FIG. 4B. Similarly, piston head 424 may have a controlling gate transmission element 430 configured to interface with a control pressure 432 from control port 408 that, when applied to controlling gate transmission element 430 forces piston 416 towards the position illustrated in FIG. 4A. In at least one example, control port 406 or control port 408 may be permanently closed or absent and control pressure 428 or control pressure 432 may be generated by a mechanical preload force.

In some embodiments, fluidic valve 400 may include an interstitial-pressure outlet/inlet 440 that may direct fluid pressures from/to interstitial region 442. In some examples, interstitial-pressure outlet/inlet 440 may connect interstitial region 442 to an outside atmosphere or an additional control fluid source. In some embodiments, the additional control fluid source may modulate fluid pressures within interstitial region 442 to actuate piston 416 or modulate the level of control pressures 428 and/or 432 at which piston 416 actuates.

As shown in FIGS. 4A and 4B, controlling gate transmission elements 426 and 430 may have substantially the same surface areas. As such, movement of piston 416 from the position illustrated in FIG. 4A to the position illustrated in FIG. 4B may require a greater fluid pressure at control port 406 than at control port 408. Similarly, movement of piston 416 from the position illustrated in FIG. 4B to the position illustrated in FIG. 4A may require a greater fluid pressure at control port 408 than at control port 406. In some examples, restricting gate transmission elements 418 and 420 may have substantially the same surface areas, which may be substantially less than the surface areas of controlling gate transmission elements 426 and 430. As such, movement of piston 416 may be mostly caused by the fluid pressures applied to control port 406 and 408 rather than any fluid pressures applied to inlet ports 402 and 404.

Figure 5A:
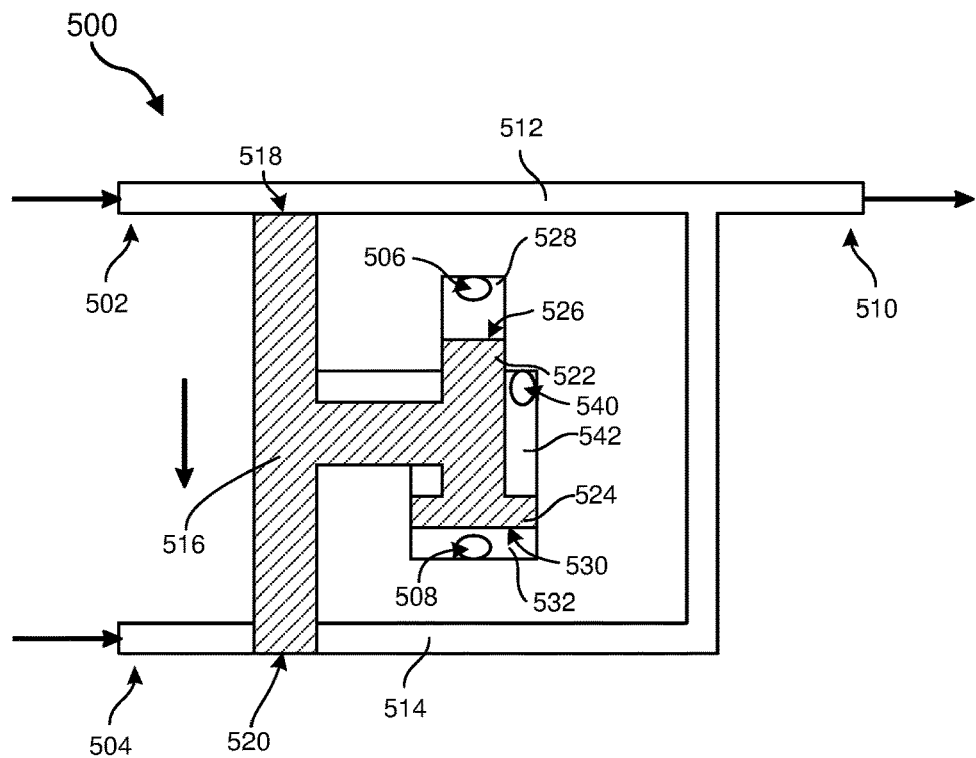
FIGS. 5A and 5B are schematic diagrams of another exemplary complementary fluidic valve, according to at least one embodiment of the present disclosure.
Figure 5B:
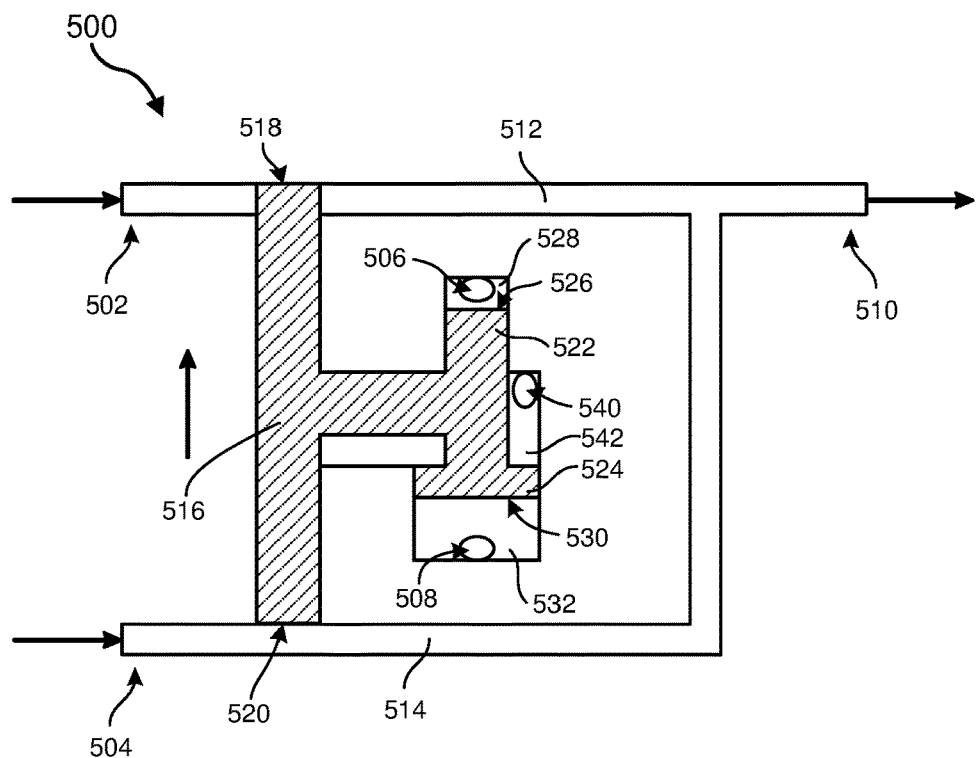

In some examples, the fluidic valves described herein may have controlling gate transmission elements with different surface areas. FIGS. 5A and 5B are schematic diagrams illustrating two positions of an exemplary fluidic valve 500 having controlling gate transmission elements with different surface areas. As shown, fluidic valve 500 may include an inlet port 502, an inlet port 504, a control port 506, a control port 508, an outlet port 510, a fluid channel 512 configured to convey fluid from inlet port 502 to outlet port 510, a fluid channel 514 configured to convey fluid from inlet port 504 to outlet port 510, and a piston 516. Although not shown, in some embodiments, control port 506 may be absent, and another source of force (e.g., a spring or another element providing a mechanical preload force) may be used to apply a force to controlling gate transmission element 526. In some examples, piston 516 may be formed from a single piece of a substantially rigid material (e.g., a rigid plastic, metal, or glass). Alternatively, piston 516 may be formed from a substantially rigid composite part. Piston 516 may include a restricting gate transmission element 518 configured to block or restrict fluid channel 512 when piston 516 is in the position illustrated in FIG. 5B and unblock fluid channel 512 when piston 516 is in the position illustrated in FIG. 5A. Piston 516 may also include a restricting gate transmission element 520 configured to block or restrict fluid channel 514 when piston 516 is in the position illustrated in FIG. 5A and unblock fluid channel 514 when piston 516 is in the position illustrated in FIG. 5B. Piston 516 may include complementary or opposing piston heads 522 and 524. Piston head 522 may have a controlling gate transmission element 526 configured to interface with a control pressure 528 from control port 506 that, when applied to controlling gate transmission element 526 forces piston 516 towards the position illustrated in FIG. 5A. Similarly, piston head 524 may have a controlling gate transmission element 530 configured to interface with a control pressure 532 from control port 508 that, when applied to controlling gate transmission element 530 forces piston 516 towards the position illustrated in FIG. 5B. In at least one example, control port 506 or control port 508 may be permanently closed or absent and control pressure 528 or control pressure 532 may be generated by a mechanical preload force.

In some embodiments, fluidic valve 500 may include an interstitial-pressure outlet/inlet 540 that may direct fluid pressures from/to interstitial region 542. In some examples, interstitial-pressure outlet/inlet 540 may connect interstitial region 542 to an outside atmosphere or an additional control fluid source. In some embodiments, the additional control fluid source may modulate fluid pressures within interstitial region 542 to actuate piston 516 or modulate the level of control pressures 528 and/or 532 at which piston 516 actuates.

As shown in FIGS. 5A and 5B, controlling gate transmission elements 526 and 530 may have different surface areas (e.g., the surface area of controlling gate transmission element 530 may be substantially larger than the surface area of controlling gate transmission element 526). As such, movement of piston 516 from the position illustrated in FIG. 5A to the position illustrated in FIG. 5B may require a fluid pressure at control port 508 that is less than that at control port 506. In some examples, the relative surface areas of controlling gate transmission elements 526 and 530 may be configured such that specific pressure differences between the pressures applied to control ports 506 and 508 trigger movement of piston 516 between the positions illustrated in FIGS. 5A and 5B. For example, the surface area of controlling gate transmission element 530 may be configured to have a surface area that is two times greater than the surface area of controlling gate transmission element 526 in order to trigger movement of piston 516 from the position illustrated in FIG. 5A to the position illustrated in FIG. 5B when the pressure applied to control port 508 is greater than one half the pressure applied to control port 506. In some examples, restricting gate transmission elements 518 and 520 may have substantially the same surface areas, which may be substantially less than the surface areas of controlling gate transmission elements 526 and 530. As such, movements of piston 516 may be mostly caused by the fluid pressures applied to control port 506 and 508 rather than any fluid pressures applied to inlet ports 502 and 504.

Figure 6A:
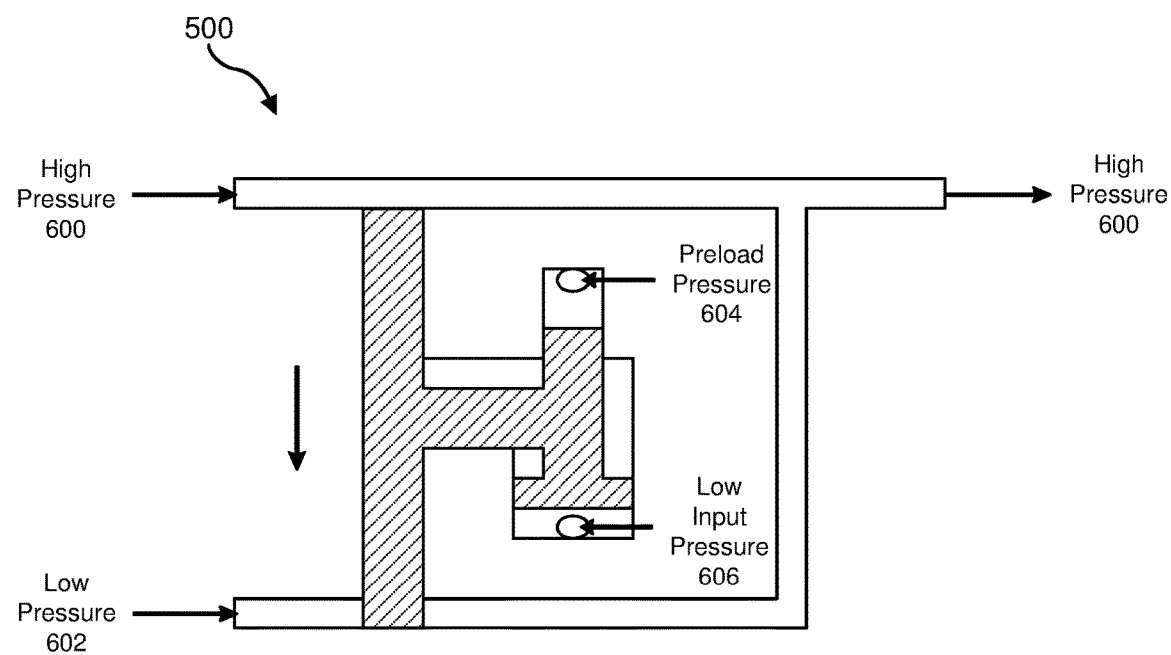
FIGS. 6A and 6B are schematic diagrams of the exemplary complementary fluidic valve of FIGS. 5A and 5B configured as an inverter, according to at least one embodiment of the present disclosure.
Figure 6B:
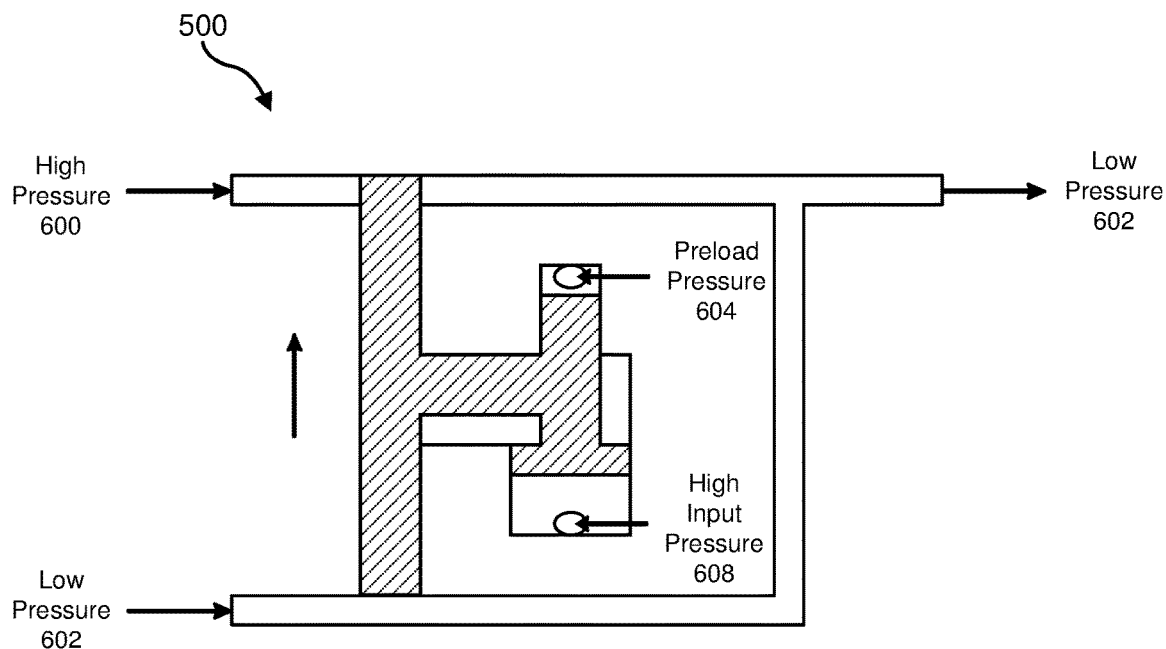

Fluidic valve 500 in FIG. 5 may be configured to perform various functions and/or operations based on how fluid pressures are applied to inlet ports 502 and 504 and control ports 506 and 508. For example, as shown in FIGS. 6A and 6B, fluidic valve 500 may be configured to perform a binary inverter operation by applying (1) a high pressure 600 to inlet port 502, (2) a low pressure 602 to inlet port 504, (3) a preload pressure 604 (e.g., high pressure 600) to control port 506, and an input fluid to control port 508. As shown in FIG. 6A, if the input fluid has a low input pressure 606 (e.g., a pressure lower than that of preload pressure 604), then high pressure 600 will be output at outlet port 510. Conversely, if the input fluid has a high input pressure 608 (e.g., a pressure higher than that of preload pressure 604), then low pressure 602 will be output at outlet port 510, as shown in FIG. 6B. FIG. 7 illustrates an inverter truth table 700 that may represent the functionality of fluidic valve 500 when configured as shown in FIGS. 6A and 6B.

Figure 8A:
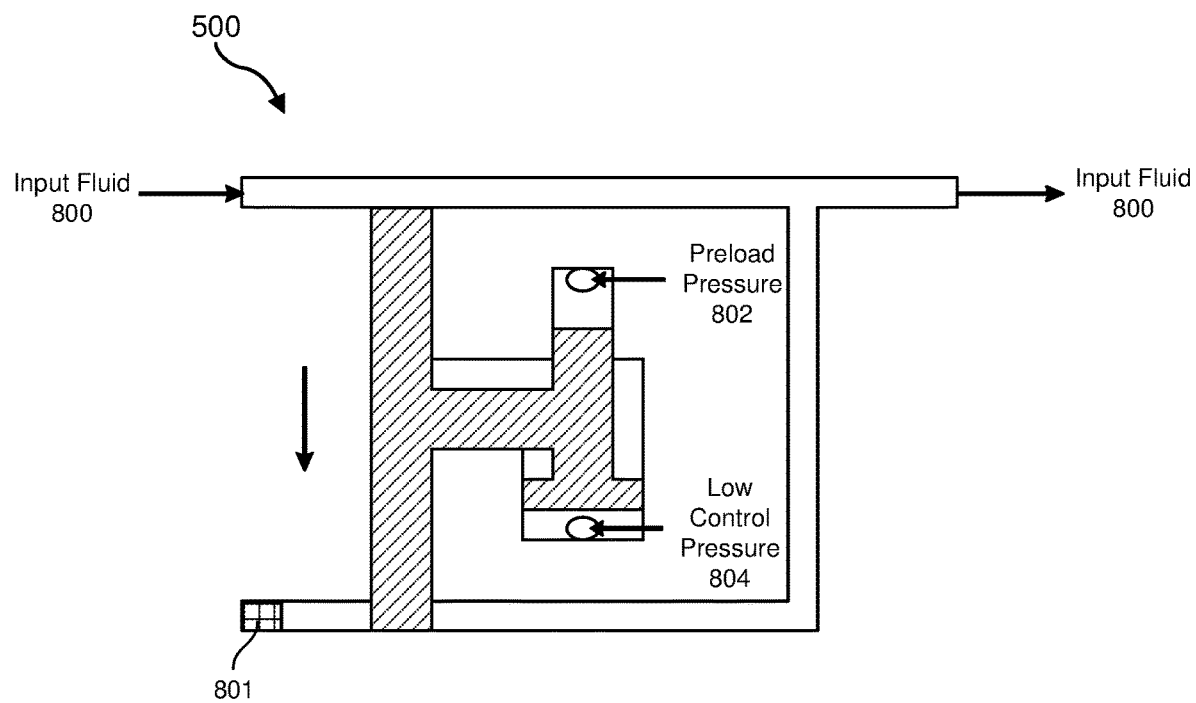
FIGS. 8A and 8B are schematic diagrams of the exemplary complementary fluidic valve of FIGS. 5A and 5B configured as a normally open valve, according to at least one embodiment of the present disclosure.
Figure 8B:
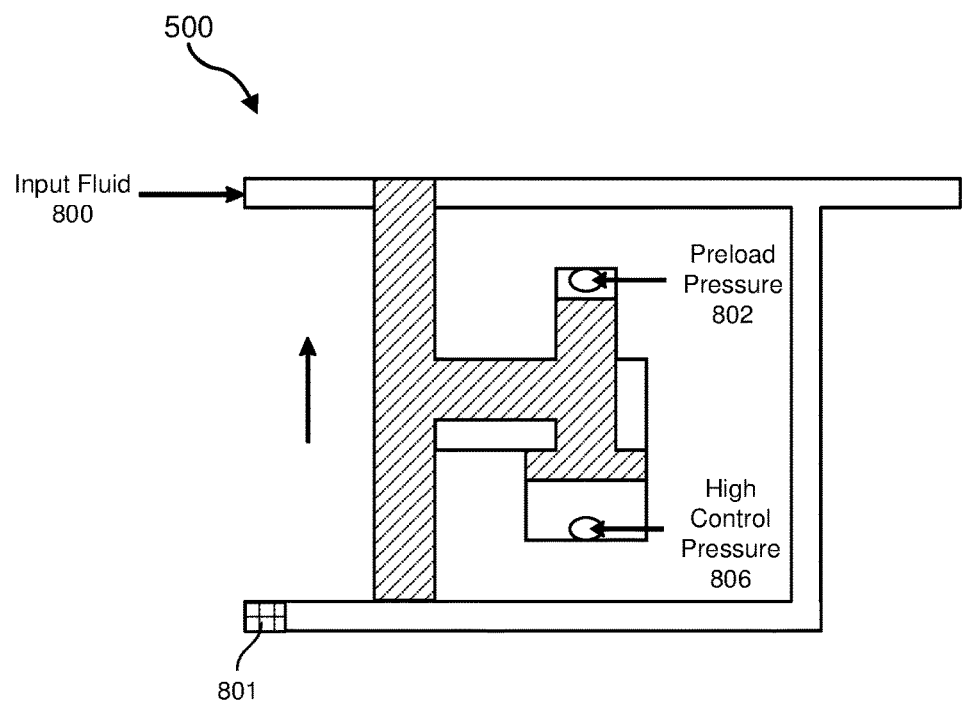

In some examples, fluidic valve 500 may be configured to act as a normally open valve (e.g., a valve that is open when a control pressure is low and closed when the control pressure is high). For example, as shown in FIGS. 8A and 8B, fluidic valve 500 may be configured to act as a normally open valve by blocking inlet port 504 with blockage 801 and by applying (1) an input fluid 800 to inlet port 502, (2) a preload pressure 802 (e.g., a high pressure) to control port 506, and a control fluid to control port 508. As shown in FIG. 8A, if the control fluid has a low control pressure 804 (e.g., a pressure lower than that of preload pressure 802), then input fluid 800 will be output at outlet port 510. Conversely, if the control fluid has a high control pressure 806 (e.g., a pressure higher than that of preload pressure 802), then no fluid will be output at outlet port 510, as shown in FIG. 8B.

Figure 9A:
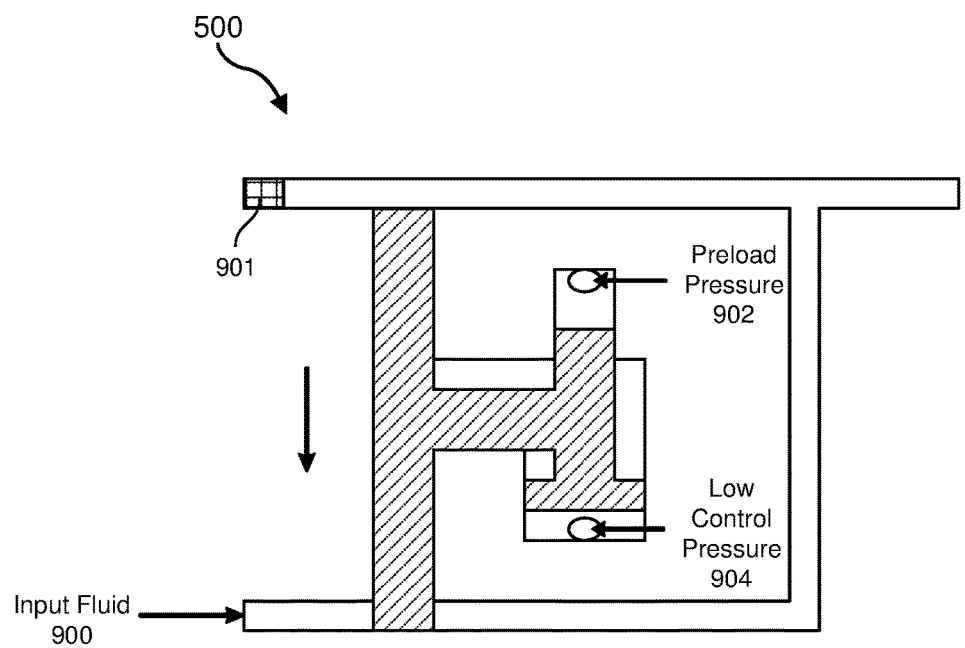
FIGS. 9A and 9B are schematic diagrams of the exemplary complementary fluidic valve of FIGS. 5A and 5B configured as a normally closed valve, according to at least one embodiment of the present disclosure.
Figure 9B:
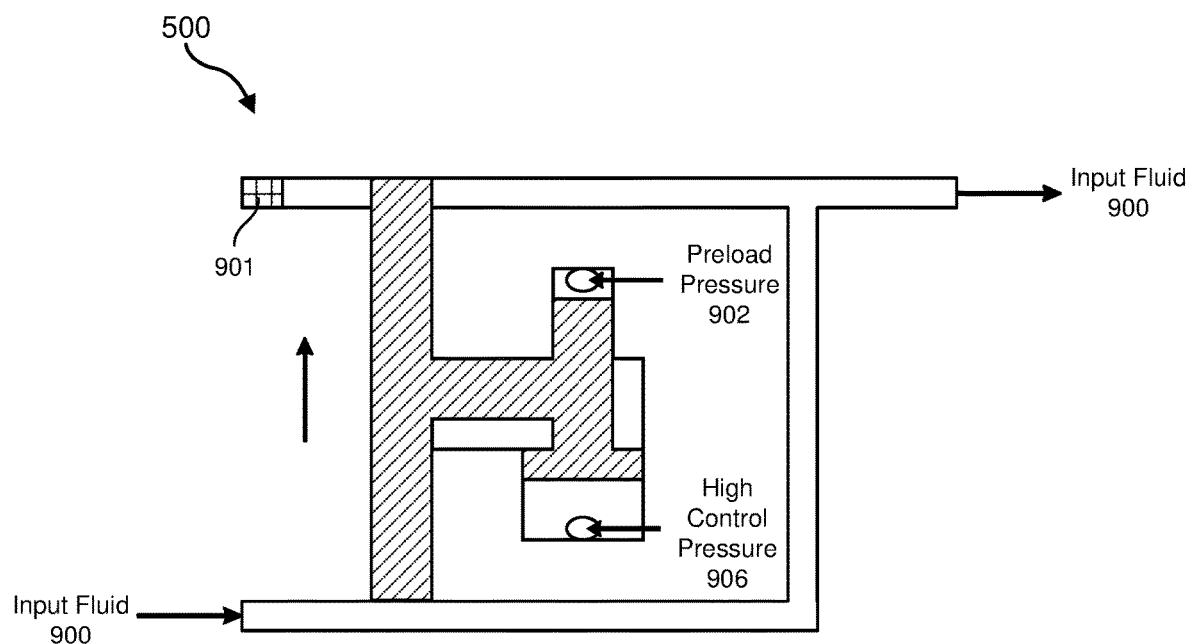

In some examples, fluidic valve 500 may be configured to act as a normally closed valve (e.g., a valve that is closed when a control pressure is low and open when the control pressure is high). For example, as shown in FIGS. 9A and 9B, fluidic valve 500 may be configured to act as a normally closed valve by blocking inlet port 502 with blockage 901 and by applying (1) an input fluid 900 to inlet port 504, (2) a preload pressure 902 (e.g., a high pressure) to control port 506, and a control fluid to control port 508. As shown in FIG. 9A, if the control fluid has a low control pressure 904 (e.g., a pressure lower than that of preload pressure 902), then no fluid will be output at outlet port 510. Conversely, if the control fluid has a high control pressure 906 (e.g., a pressure higher than that of preload pressure 902), then input fluid 900 will be output at outlet port 510, as shown in FIG. 9B.

Figure 10A:
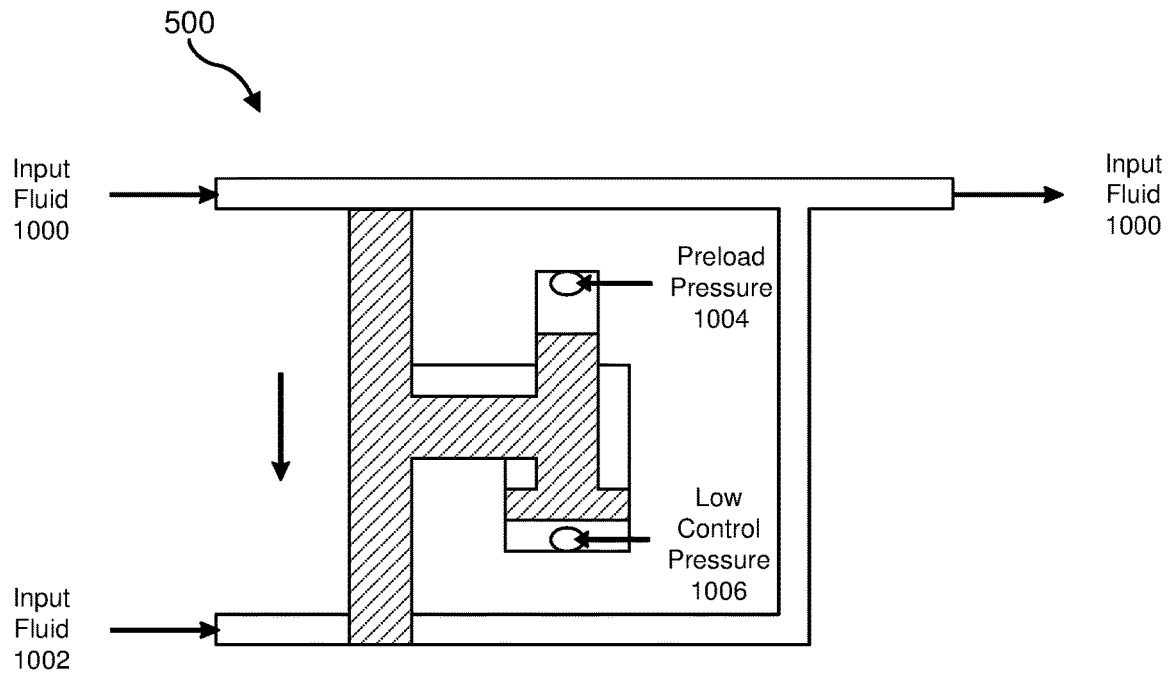
FIGS. 10A and 10B are schematic diagrams of the exemplary complementary fluidic valve of FIGS. 5A and 5B configured as a three-way valve, according to at least one embodiment of the present disclosure.
Figure 10B:
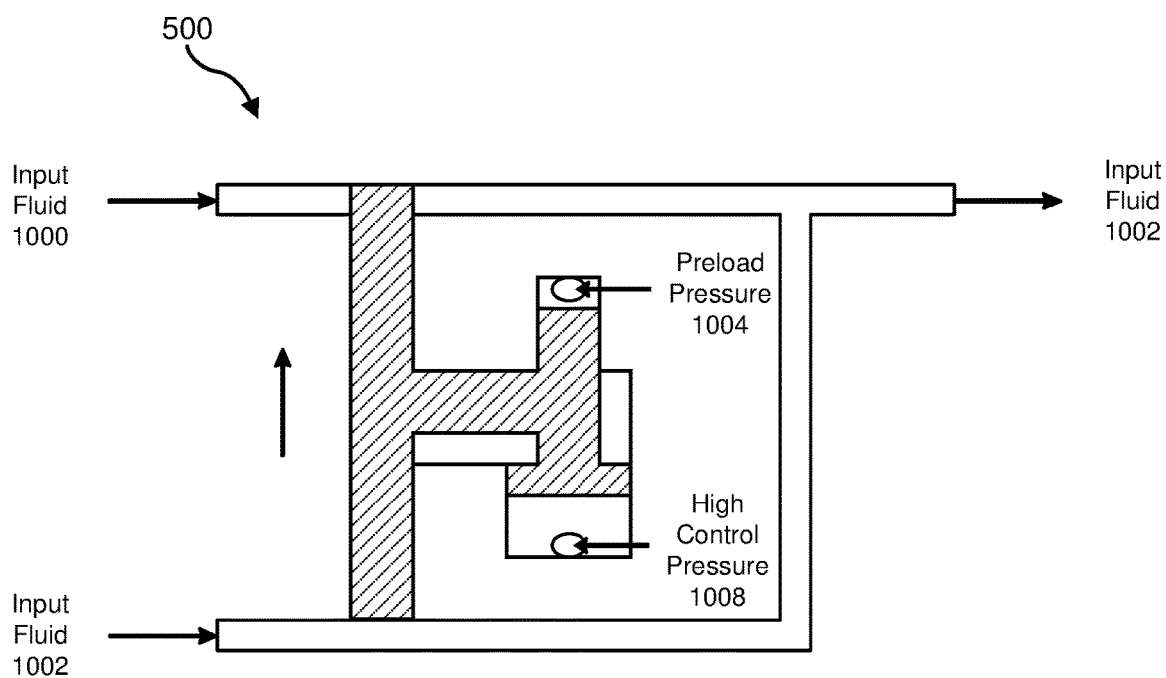

In some examples, fluidic valve 500 may be configured to act as a three-way valve (e.g., a valve that is selective between a first input fluid path and a second input fluid path). For example, as shown in FIGS. 10A and 10B, fluidic valve 500 may be configured to act as a three-way valve by applying (1) an input fluid 1000 to inlet port 502, (2) an input fluid 1002 to inlet port 504, (3) a preload pressure 1004 (e.g., a high pressure) to control port 506, and (4) a control fluid to control port 508. As shown in FIG. 10A, if the control fluid has a low control pressure 1006 (e.g., a pressure lower than that of preload pressure 1004), then input fluid 1000 will be output at outlet port 510. Conversely, if the control fluid has a high control pressure 1008 (e.g., a pressure higher than that of preload pressure 1004), then input fluid 1002 will be output at outlet port 510, as shown in FIG. 10B.

Figure 11:
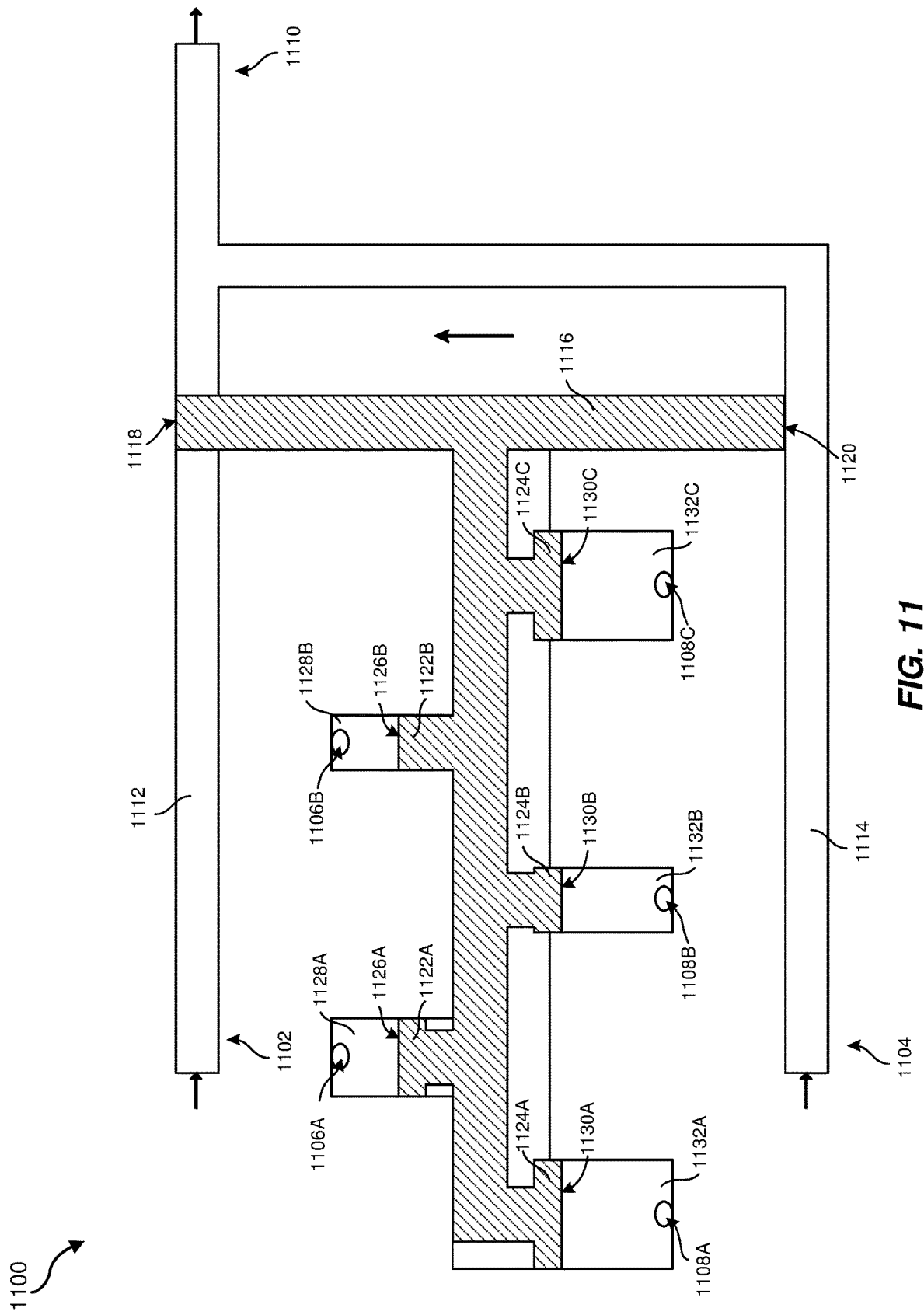
FIGS. 11 and 12 are schematic diagrams of another exemplary complementary fluidic valve, according to at least one embodiment of the present disclosure.
Figure 12:
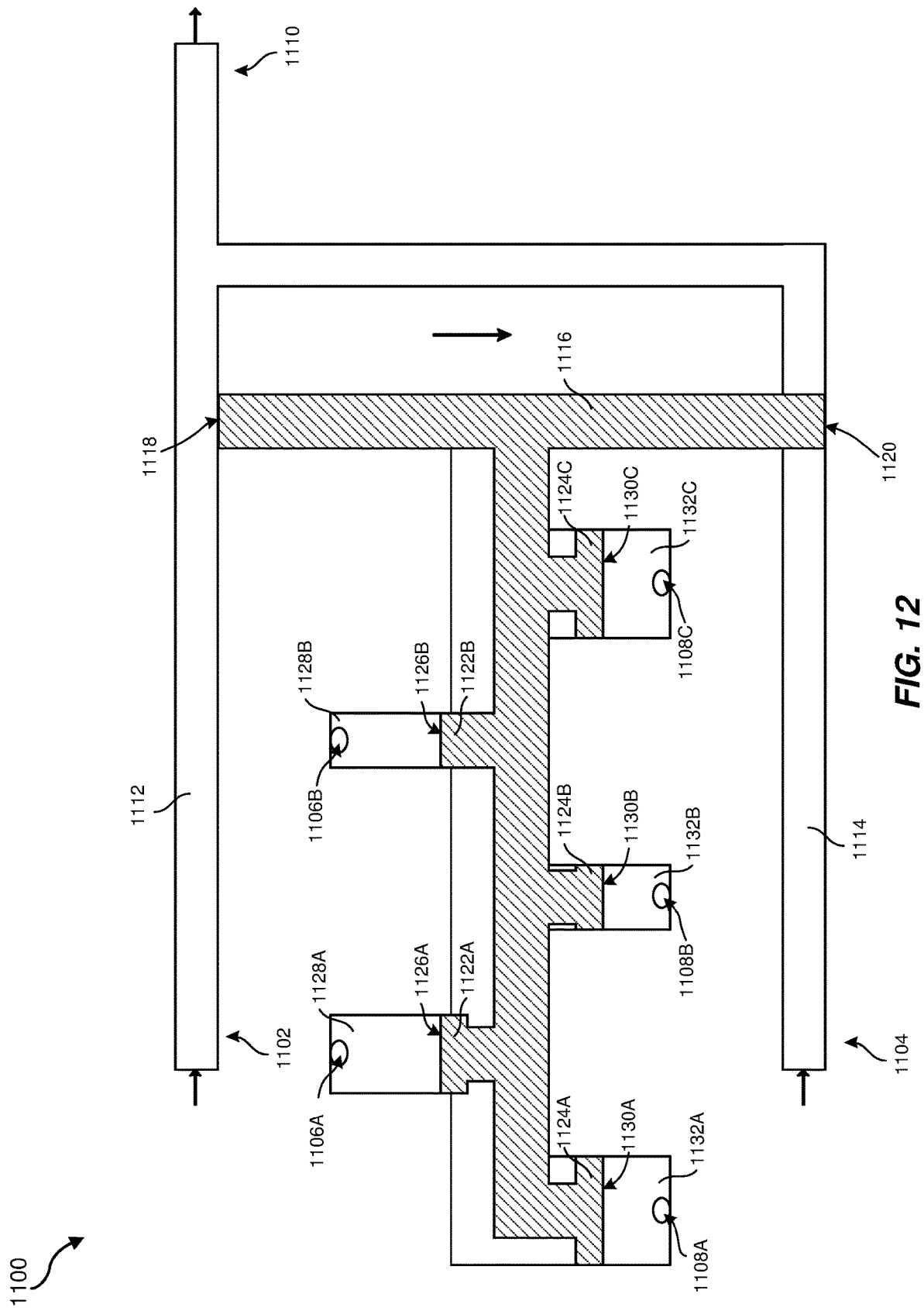

In some examples, a complementary fluidic valve may include a piston with more than two opposing piston heads. FIGS. 11 and 12 are schematic diagrams illustrating two positions of an exemplary fluidic valve 1100. As shown, fluidic valve 1100 may include an inlet port 1102, an inlet port 1104, two upper control ports 1106A-B, three lower control ports 1108A-C, an outlet port 1110, a fluid channel 1112 configured to convey fluid from inlet port 1102 to outlet port 1110, a fluid channel 1114 configured to convey fluid from inlet port 1104 to outlet port 1110, and a piston 1116. In some examples, piston 1116 may be formed from a single piece of a substantially rigid material (e.g., a rigid plastic, metal, or glass). Alternatively, piston 1116 may be formed from a substantially rigid composite part. Piston 1116 may include a restricting gate transmission element 1118 configured to block or restrict fluid channel 1112 when piston 1116 is in the position illustrated in FIG. 11 and unblock fluid channel 1112 when piston 1116 is in the position illustrated in FIG. 12. Piston 1116 may also include a restricting gate transmission element 1120 configured to block or restrict fluid channel 1114 when piston 1116 is in the position illustrated in FIG. 12 and unblock fluid channel 1114 when piston 1116 is in the position illustrated in FIG. 11.

Piston 1116 may include upper piston heads 1122A-B that complement or oppose lower piston heads 1124A-C. Piston head 1122A may have a controlling gate transmission element 1126A configured to interface with a control pressure 1128A from control port 1106A that, when applied to controlling gate transmission element 1126A forces piston 1116 towards the position illustrated in FIG. 12. Similarly, piston head 1122B may have a controlling gate transmission element 1126B configured to interface with a control pressure 1128B from control port 1106B that, when applied to controlling gate transmission element 1126B forces piston 1116 towards the position illustrated in FIG. 12. As shown, piston head 1124A may have a controlling gate transmission element 1130A configured to interface with a control pressure 1132A from control port 1108A that, when applied to controlling gate transmission element 1130A forces piston 1116 towards the position illustrated in FIG. 11, piston head 1124B may have a controlling gate transmission element 1130B configured to interface with a control pressure 1132B from control port 1108B that, when applied to controlling gate transmission element 1130B forces piston 1116 towards the position illustrated in FIG. 11, and piston head 1124C may have a controlling gate transmission element 1130C configured to interface with a control pressure 1132C from control port 1108C that, when applied to controlling gate transmission element 1130C forces piston 1116 towards the position illustrated in FIG. 11. As shown in FIGS. 11 and 12, each of controlling gate transmission elements 1126A-B and 1130A-C may have different surface areas. In some examples, the relative surface areas of controlling gate transmission elements 1126A-B and 1130A-C may be configured such that specific pressure differences between the pressures applied to control ports 1106A-B and 1108A-C trigger movement of piston 1116 between the positions illustrated in FIGS. 11 and 12.

Figure 13:
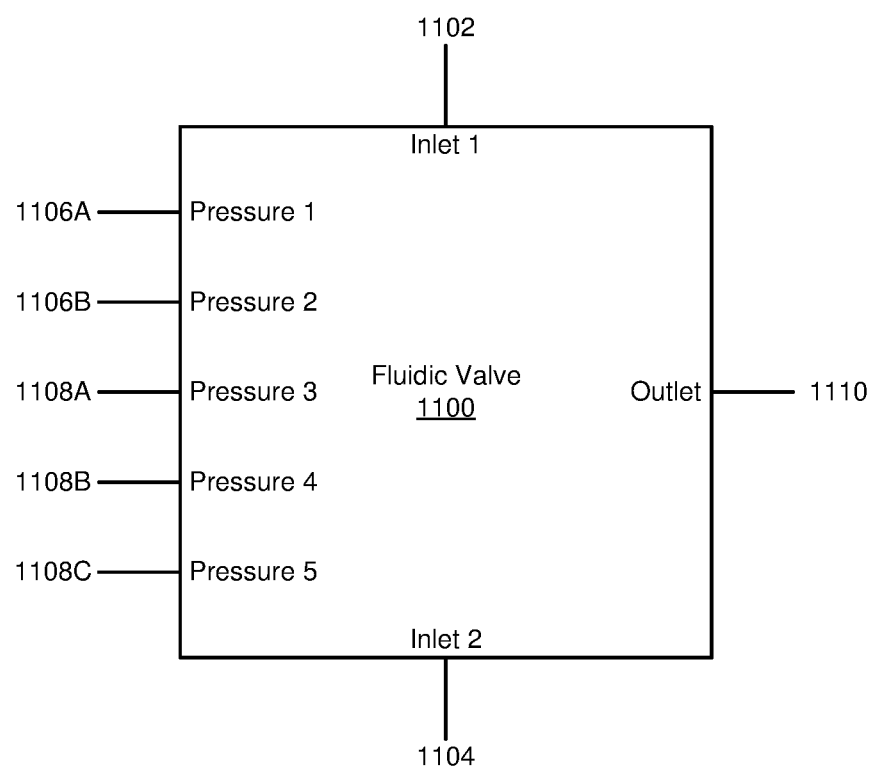
FIG. 13 is a block diagram of the complementary fluidic valve of FIGS. 11 and 12, according to at least one embodiment of the present disclosure.
Figure 14:
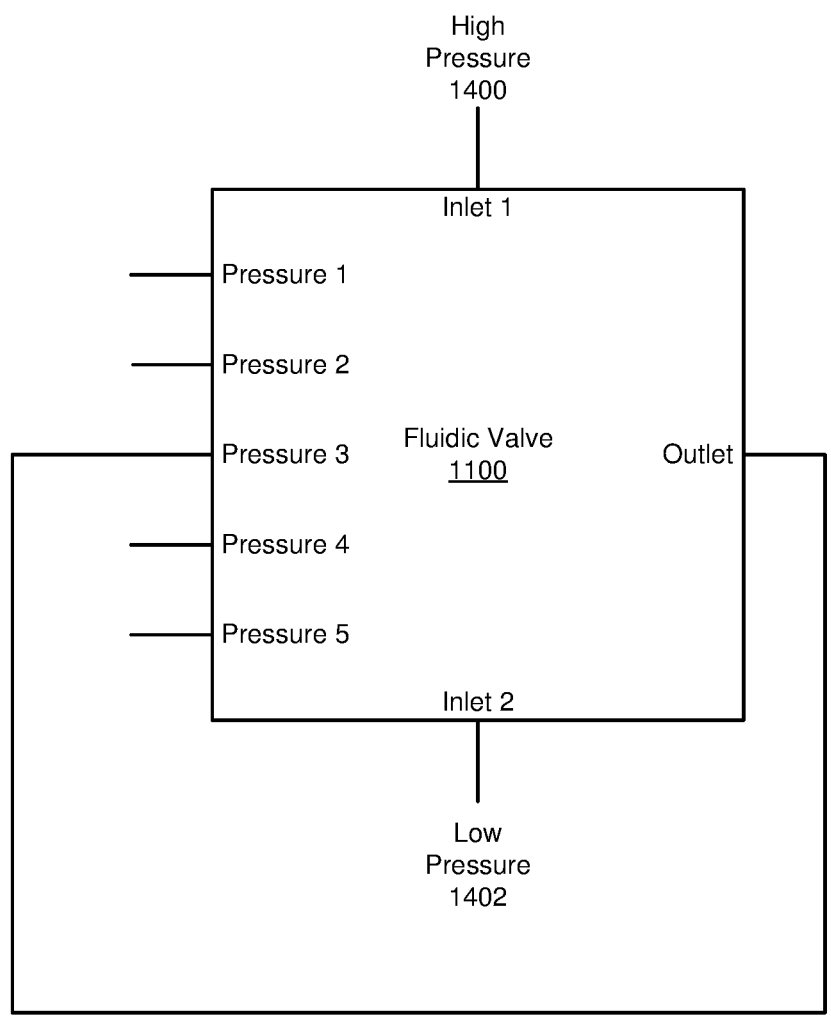
FIG. 14 is a diagram of an exemplary feedback configuration of the complementary fluidic valve of FIGS. 11 and 12, according to at least one embodiment of the present disclosure.

Fluidic valve 1100 may be configured to perform various functions and/or operations based on how fluid pressures are applied to inlet ports 1102 and 1104 and control ports 1106A-B and 1108A-C. FIG. 13 is a block diagram of fluidic valve 1100, and FIG. 14 is a block diagram of fluidic valve 1100 in a feedback configuration. In this configuration, outlet port 1110 may be fed back into control port 1108A. When connected in the feedback configuration shown in FIG. 14, fluidic valve 1100 may act as a pressure adder/subtractor with the relative contributions of each control pressure (e.g., pressures 1-5) depending on the relative area of the controlling gate transmission element to which it is applied and the direction its force is applied to piston 1116. In the example shown in FIG. 14, a high pressure 1400 may be applied at inlet port 1102 and a low pressure 1402 (e.g., atmospheric pressure) may be applied to inlet port 1104. If outlet port 1110 is connected to control port 1108A, adding pressure to control ports 1106A-B will tend to open restricting gate transmission element 1118 and close restricting gate transmission element 1120, thus increasing the pressure at outlet 1110. This increased pressure may then be fed back to control port 1108A and may push up harder on piston 1116 until equilibrium is reached and all forces balance. In contrast, if pressure is added to control ports 1108B-C, the pressure will tend to close restricting gate transmission element 1118 and open restricting gate transmission element 1120, decreasing the pressure at outlet 1110. The decreased pressure may then be fed back to control port 1108A and push up less hard on piston 1116 until equilibrium is again restored.

Figure 15:
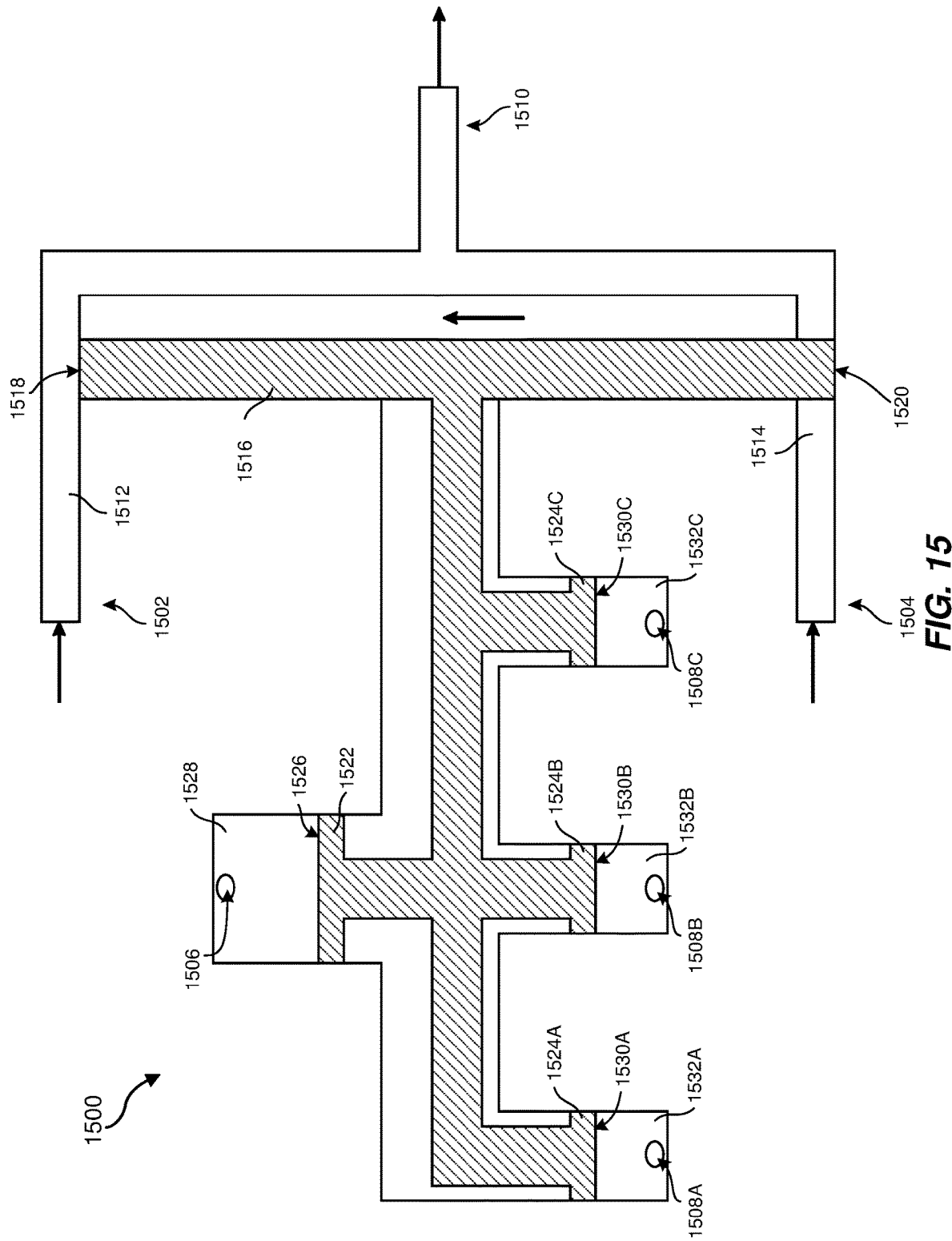
FIGS. 15 and 16 are schematics of another exemplary complementary fluidic valve, according to at least one embodiment of the present disclosure.
Figure 16:
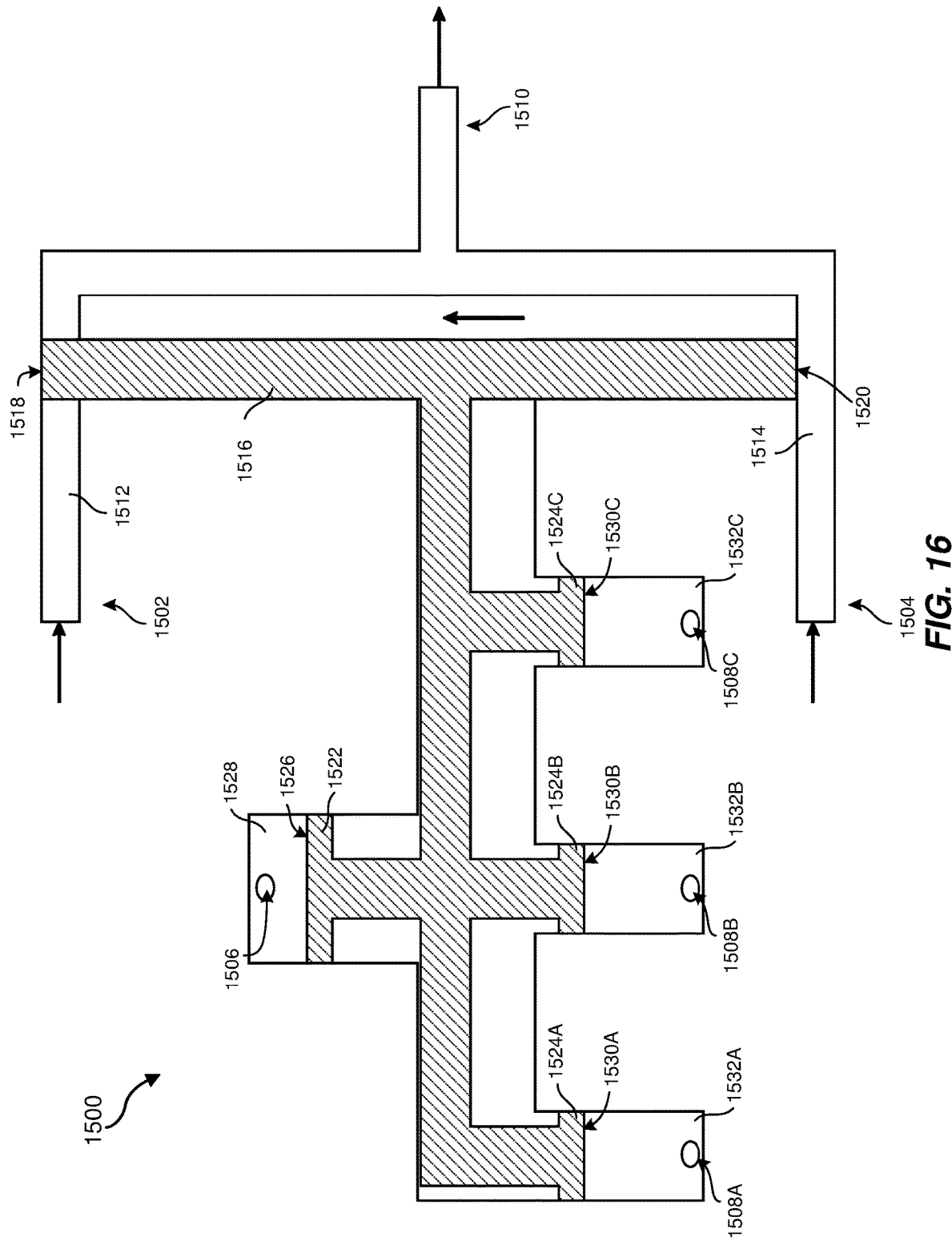

FIGS. 15 and 16 are schematic diagrams illustrating two positions of an exemplary fluidic valve 1500. As shown, fluidic valve 1500 may include an inlet port 1502, an inlet port 1504, one upper control port 1506, three lower control ports 1508A-C, an outlet port 1510, a fluid channel 1512 configured to convey fluid from inlet port 1502 to outlet port 1510, a fluid channel 1514 configured to convey fluid from inlet port 1504 to outlet port 1510, and a piston 1516. In some examples, piston 1516 may be formed from a single piece of a substantially rigid material (e.g., a rigid plastic, metal, or glass). Alternatively, piston 1516 may be formed from a substantially rigid composite part. Piston 1516 may include a restricting gate transmission element 1518 configured to block or restrict fluid channel 1512 when piston 1516 is in the position illustrated in FIG. 16 and unblock fluid channel 1512 when piston 1516 is in the position illustrated in FIG. 15. Piston 1516 may also include a restricting gate transmission element 1520 configured to block or restrict fluid channel 1514 when piston 1516 is in the position illustrated in FIG. 15 and unblock fluid channel 1514 when piston 1516 is in the position illustrated in FIG. 16.

Piston 1516 may include an upper piston head 1522 that complements or opposes lower piston heads 1524A-C. Piston head 1522 may have a controlling gate transmission element 1526 configured to interface with a control pressure 1528 from control port 1506 that, when applied to controlling gate transmission element 1526 forces piston 1516 towards the position illustrated in FIG. 15. As shown, piston head 1524A may have a controlling gate transmission element 1530A configured to interface with a control pressure 1532A from control port 1508A that, when applied to controlling gate transmission element 1530A forces piston 1516 towards the position illustrated in FIG. 16, piston head 1524B may have a controlling gate transmission element 1530B configured to interface with a control pressure 1532B from control port 1508B that, when applied to controlling gate transmission element 1530B forces piston 1516 towards the position illustrated in FIG. 16, and piston head 1524C may have a controlling gate transmission element 1530C configured to interface with a control pressure 1532C from control port 1508C that, when applied to controlling gate transmission element 1530C forces piston 1516 towards the position illustrated in FIG. 16.

As shown in FIGS. 15 and 16, controlling gate transmission element 1526 may have a surface area that is greater than that of controlling gate transmission elements 1530A-C, which in this example are shown having the same surface areas. In some examples, the relative surface areas of controlling gate transmission elements 1526 and 1530A-C may be configured such that specific pressure differences between the pressures applied to control ports 1506 and 1508A-C trigger movement of piston 1516 between the positions illustrated in FIGS. 15 and 16. In one example, the surface area of controlling gate transmission element 1526 may be two and a half times greater than the individual surface areas of controlling gate transmission elements 1530A-C. As such, movement of piston 1516 from the position illustrated in FIG. 15 to the position illustrated in FIG. 16 may require a fluid pressure at each of control ports 1508A-C that is greater than that at control port 1506. For example, if the surface area of controlling gate transmission element 1526 is equal to 5, the surface areas of controlling gate transmission elements 1530A-C are each equal to 2, and a maximum pressure is applied at control port 1506, then piston 1516 will only move from the position shown in FIG. 15 to the position shown in FIG. 16 if maximum pressures are applied to each of control ports 1508A-C. In this way, fluidic valve 1500 may be configured to perform a greater-than-or-equal-to three operation.

Figure 17:
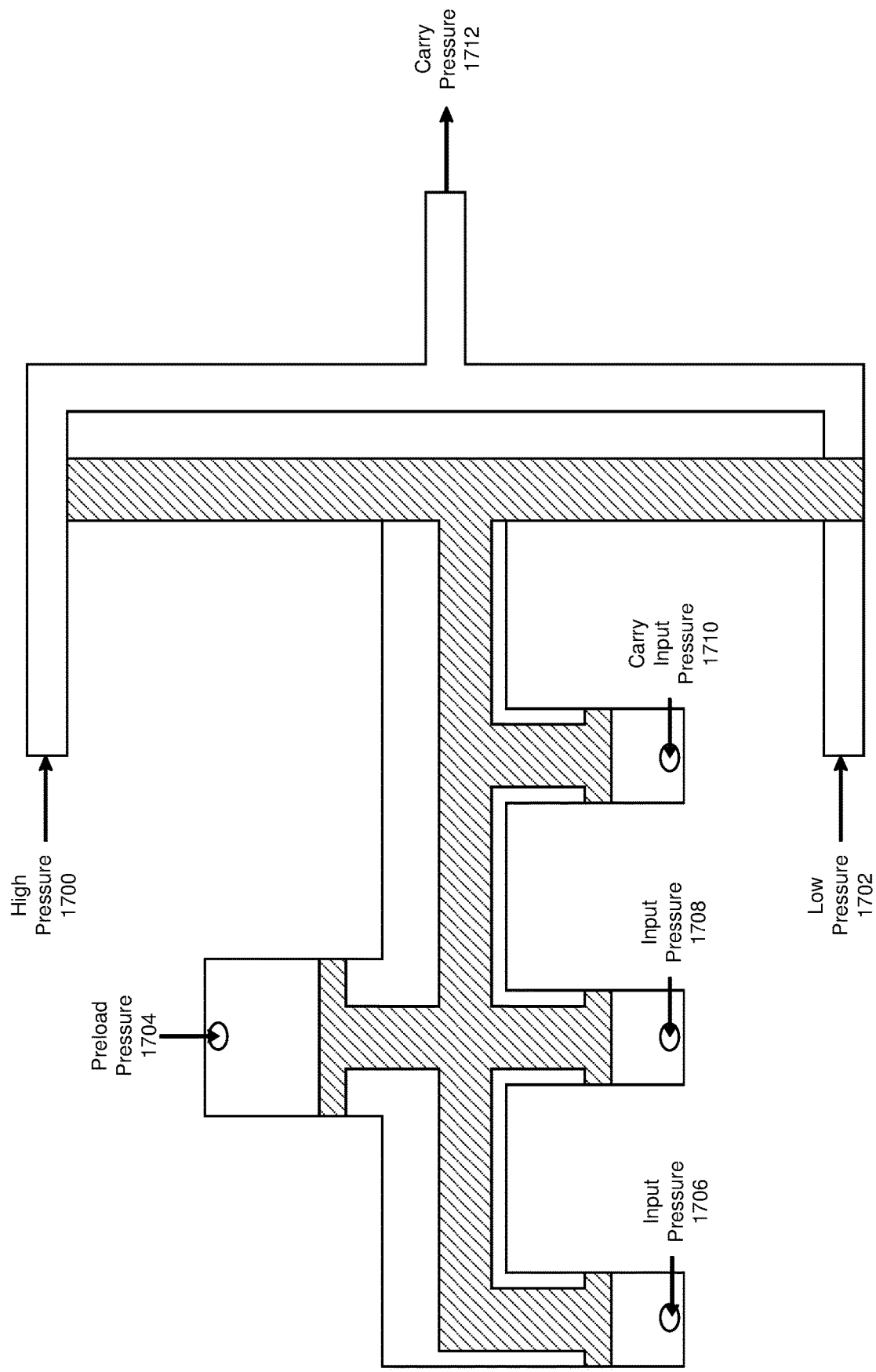
FIG. 17 is a schematic diagram of an exemplary complementary fluidic valve configured to perform a sum operation, according to at least one embodiment of the present disclosure.

Fluidic valve 1500 may be configured to perform various other functions and/or operations based on how fluid pressures are applied to inlet ports 1502 and 1504 and control ports 1506 and 1508A-C and the relative surface areas of controlling gate transmission elements 1526 and 1530A-C. For example, as shown in FIG. 17, fluidic valve 1500 may be configured to perform a carry operation for a full adder. In this example, a high pressure 1700 may be applied to inlet port 1502, a low pressure 1702 may be applied to inlet port 1504, a preload pressure 1704 (e.g., high pressure 1700) may be applied to control port 1506, a first input pressure 1706 may be applied to control port 1508A, a second input pressure 1708 may be applied to control port 1508B, and a carry input pressure 1710 may be applied to control port 1508C. In this example, if the surface area of controlling gate transmission element 1526 is one and a half times greater than that of each of controlling gate transmission elements 1530A-C, then carry pressure 1712 will be high only when two or more of first input pressure 1706, second input pressure 1708, and carry input pressure 1710 are also high, as shown in truth table 2000 in FIG. 20. In this figure, input A may correspond to first input pressure 1706, input B may correspond to second input pressure 1708, input $C_{IN}$ may correspond to carry input pressure 1710, and output $C_{OUT}$ may correspond to carry pressure 1712.

Figure 18:
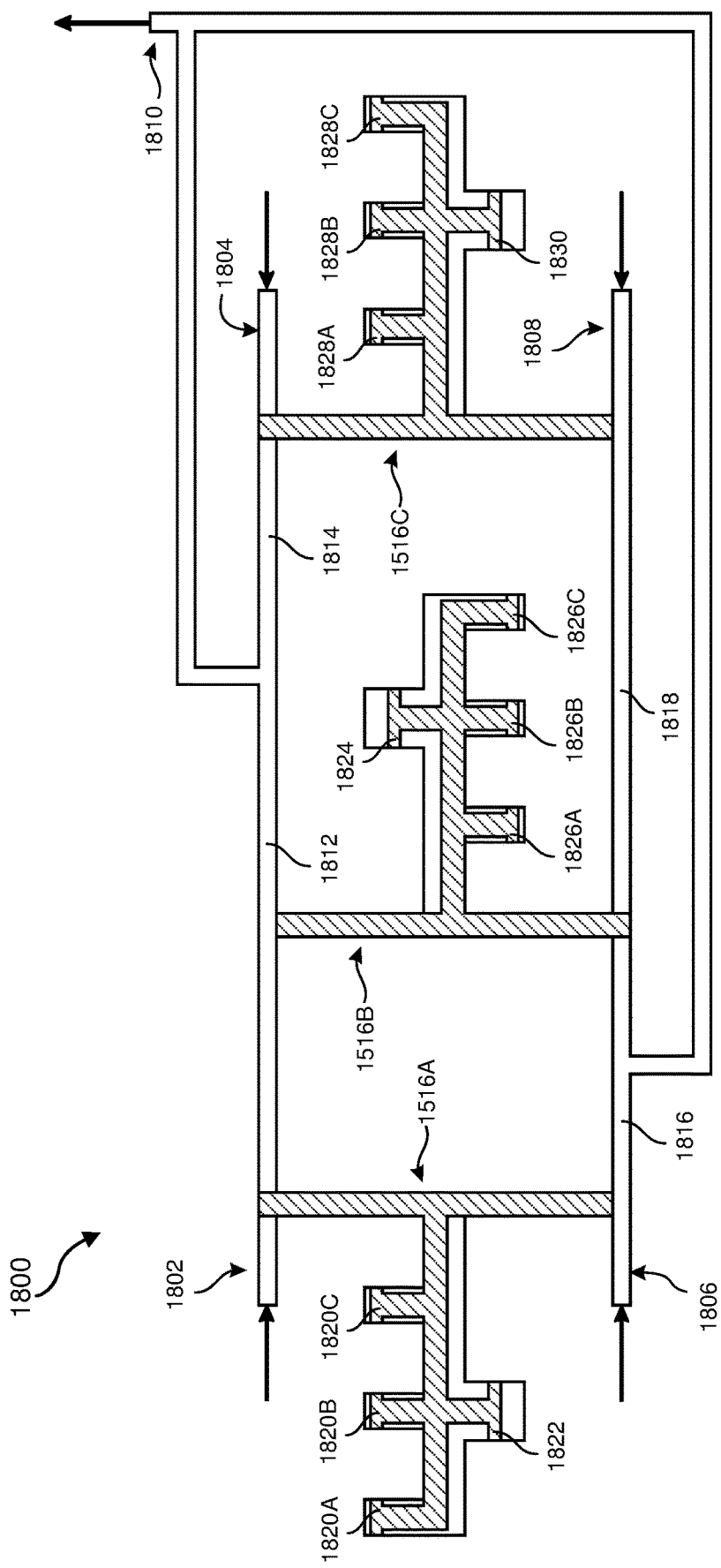
FIGS. 18 and 19 are schematic diagrams of an exemplary complementary fluidic system configured to perform a carry operation, according to at least one embodiment of the present disclosure.
Figure 19:
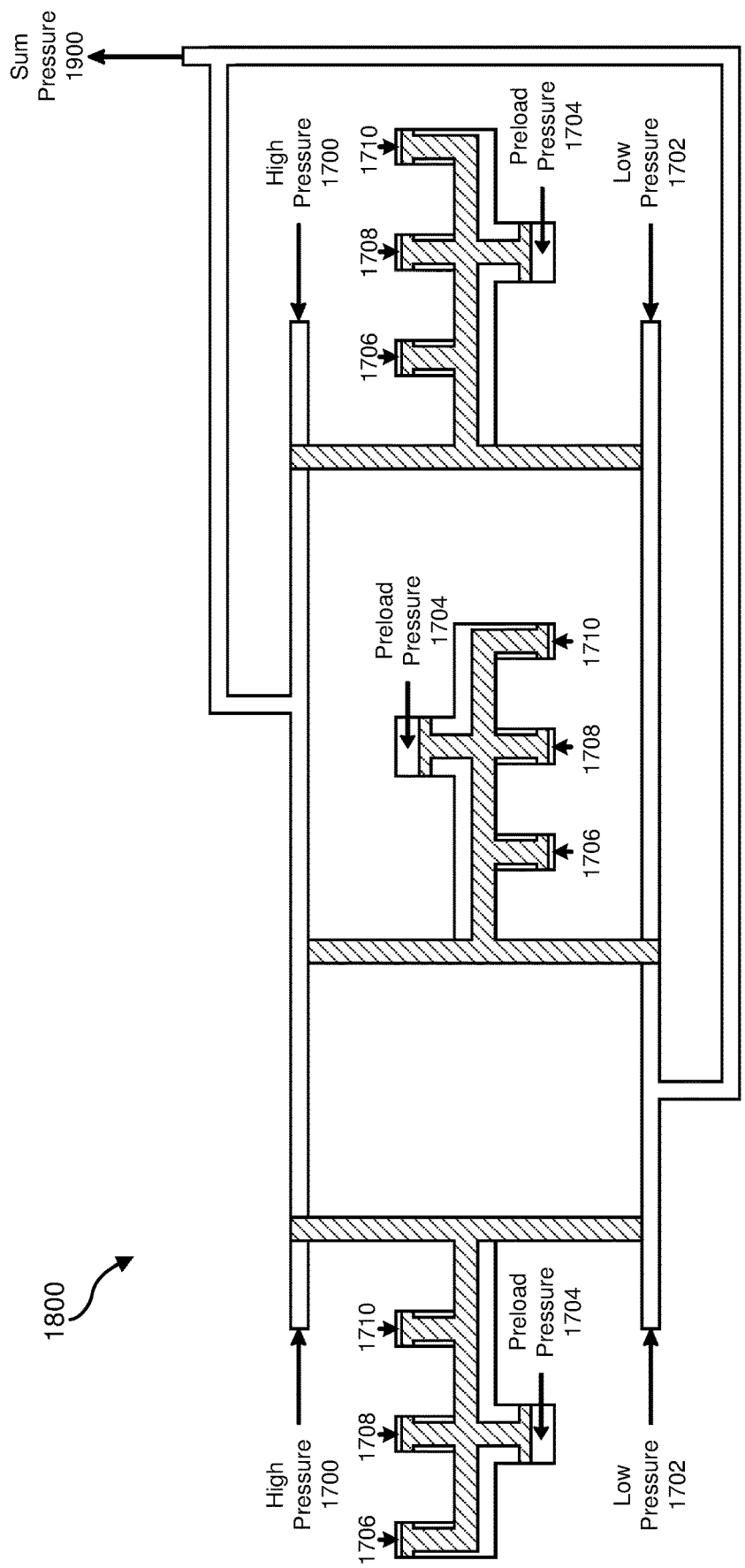

FIGS. 18 and 19 illustrate a fluidic system 1800 configured to perform a sum operation for a full adder. As shown in FIG. 18, several instances of piston 1516 (e.g., pistons 1516A-C) may be combined in a single system to perform a sum operation for a full adder. In this example, fluidic system 1800 may include an inlet port 1802, an inlet port 1804, an inlet port 1806, an inlet port 1808, and an outlet port 1810. Fluidic system 1800 may also include a fluid channel 1812 configured to convey fluid from inlet port 1802 to outlet port 1010, a fluid channel 1814 configured to convey fluid from inlet port 1804 to outlet port 1010, a fluid channel 1816 configured to convey fluid from inlet port 1806 to outlet port 1010, and a fluid channel 1818 configured to convey fluid from inlet port 1808 to outlet port 1010. In this example, piston 1516A may be configured to block either of fluid channels 1812 or 1816, piston 1516B may be configured to block either of fluid channels 1812 or 1818, and piston 1516C may be configured to block either of fluid channels 1814 or 1818. In this example, the relative surface areas of each of controlling gate transmission elements 1820A-C, 1826A-C, and 1828A-C may be two times greater than the surface area of controlling gate transmission element 1822. In addition, controlling gate transmission element 1824 may have a surface area three times greater than the surface area of controlling gate transmission element 1822, and controlling gate transmission element 1830 may have a surface area five times greater than the surface area of controlling gate transmission element 1822.

In order to configure fluidic system 1800 to perform a sum operation of a full adder, high pressure 1700 may be applied to inlet ports 1802 and 1804, low pressure 1702 may be applied to inlet ports 1806 and 1808, preload pressure 1704 may be applied to the control ports of controlling gate transmission elements 1822, 1824, and 1830. In addition, first input pressure 1706 may be applied to the control ports of controlling gate transmission elements 1820A, 1826A, and 1828A. Similarly, second input pressure 1708 may be applied to the control ports of controlling gate transmission elements 18206, 1826B, and 1828B. Lastly, carry input pressure 1710 may be applied to the control ports of controlling gate transmission elements 1820C, 1826C, and 1828C. In this example, sum pressure 1900 will be high only when one or three of first input pressure 1706, second input pressure 1708, and carry input pressure 1710 are also high, as shown in truth table 2000 in FIG. 20.

The complementary fluidic valves and systems described herein may be constructed in any suitable manner. In some examples, some or all of the fluidic valves and systems described herein may be constructed as single units. Alternatively, some or all of the fluidic valves described herein may be composable fluidic devices that may be coupled together to form the described composite fluidic systems.

FIGS. 21-28 illustrate various views of a fluidic-valve device 2100 according to at least one embodiment of the present disclosure. In some examples, fluidic-valve device 2100 in FIGS. 21-28 may represent one way in which fluidic valves 300, 400, and/or 500 may be constructed and configured. As shown in FIG. 21, fluidic-valve device 2100 may have a multilayer structure. In this example, fluidic-valve device 2100 may include six rigid or semi-rigid layers 2102-2112 sandwiched together and compressed by fasteners 2114. In some examples, layers 2104, 2106, 2108, and 2110 may be made of a substantially rigid material (e.g., plastic or glass), and layers 2102 and 2112 may be made of a more rigid material (e.g., a rigid metal) and may provide additional structural stiffness to fluidic-valve device 2100, especially when fluidic-valve device 2100 is under pressure. As shown, fluidic-valve device 2100 may also include one or more spacers or shims (e.g., shims 2116). In some examples, shims 2116 may be constructed from a substantially rigid or incompressible material and be configured to ensure a specific distance exists between layers 2104 and 2106 or layers 2106 and 2108, respectively. As shown in FIG. 22, layer 2102 may include various opening and access channels (e.g., access channels 2202 and 2204) to which fluid connections may be made and/or through which fluid connections may be routed to layer 2104.

As shown in FIG. 23, layer 2104 may include an inlet port 2302, an outlet port 2304, and a control port 2306. Layer 2104 may also include a bottom face 2308 having a passthrough port 2310, a gate fluid channel 2312, and a controlling gate terminal 2314. In this example, a fluid channel 2316 may connect inlet port 2302 with gate fluid channel 2312, a fluid channel 2318 may connect control port 2306 with controlling gate terminal 2314, a fluid channel 2320 may connect outlet port 2304 and passthrough port 2310, and a fluid channel 2321 may connect fluid channel 2320 to gate fluid channel 2312.

Figure 24A:
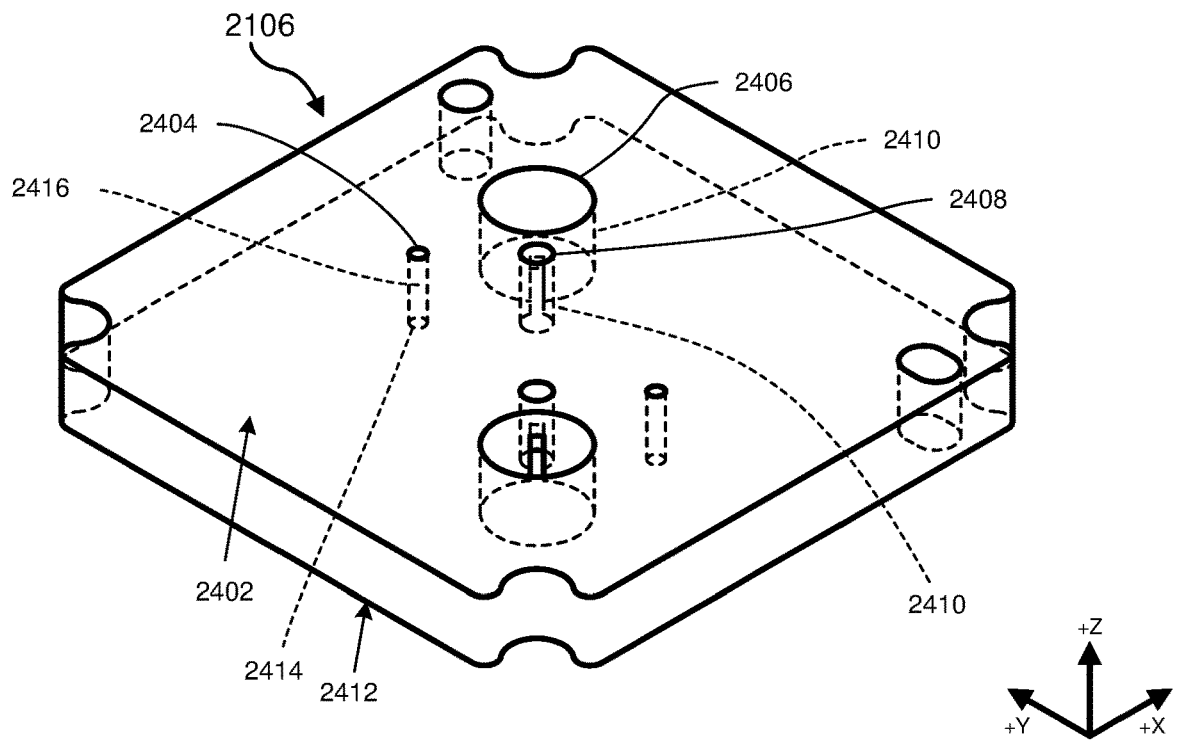
FIG. 24A is a partially transparent perspective view of an exemplary layer of the fluidic-valve device of FIG. 21, according to at least one embodiment of the present disclosure.
Figure 24B:
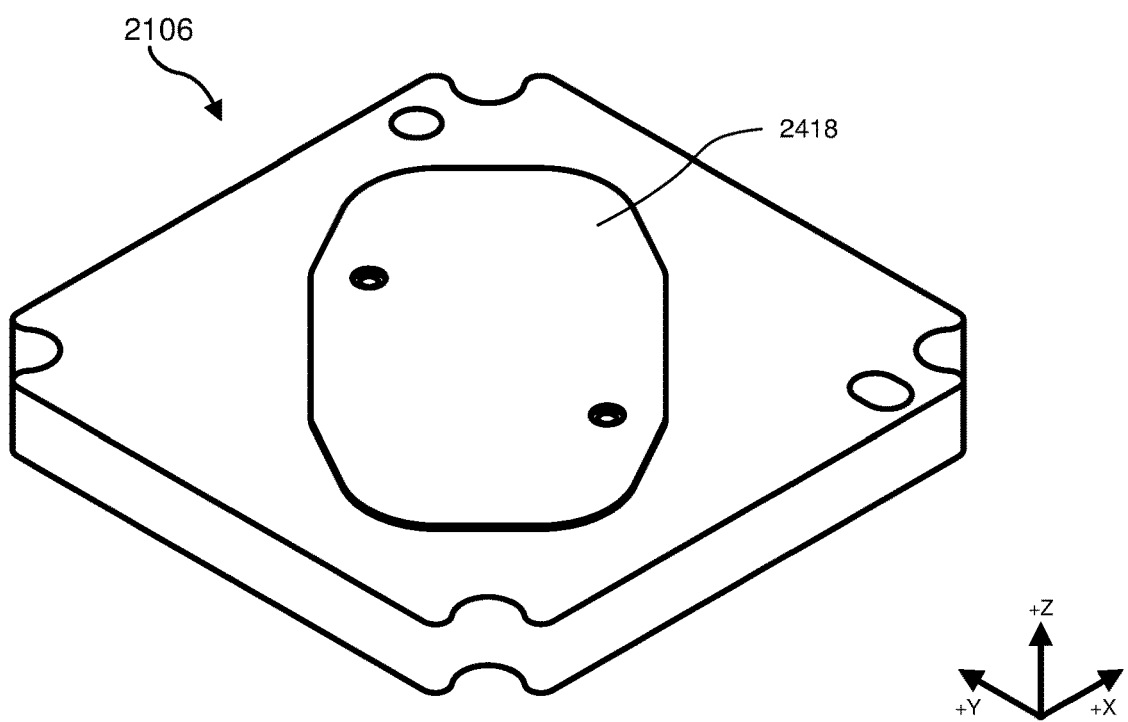
FIG. 24B is a perspective view of the layer of FIG. 24A with an exemplary membrane, according to at least one embodiment of the present disclosure.
Figure 25A:
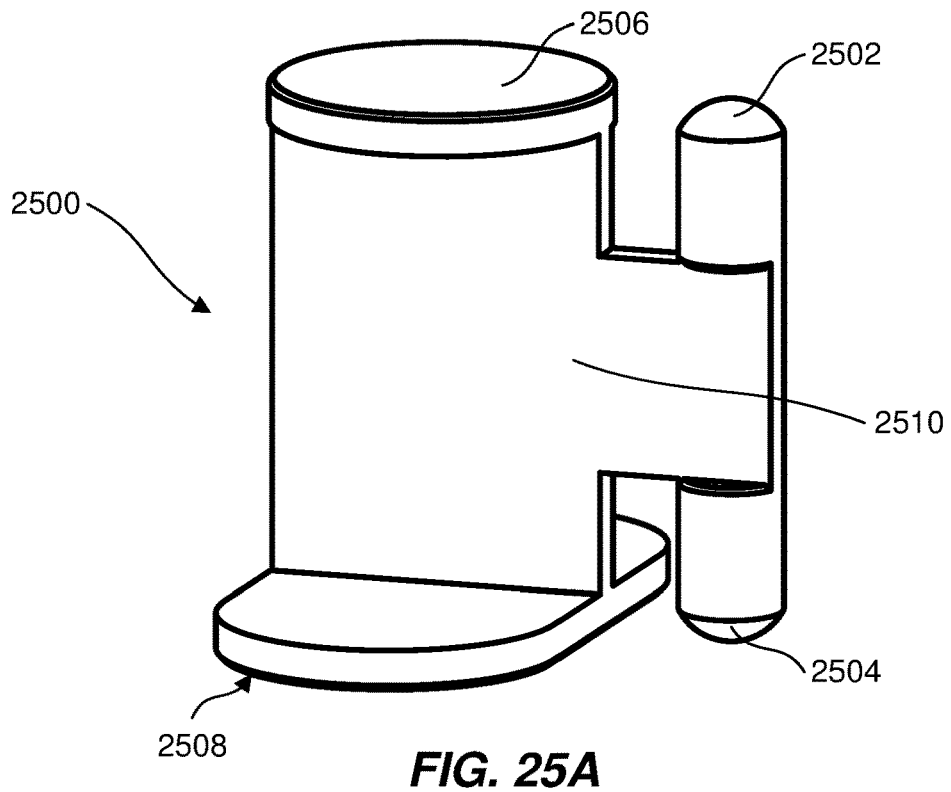
FIGS. 25A and 25B are perspective views of an exemplary piston of the fluidic-valve device of FIG. 21, according to at least one embodiment of the present disclosure.
Figure 25B:
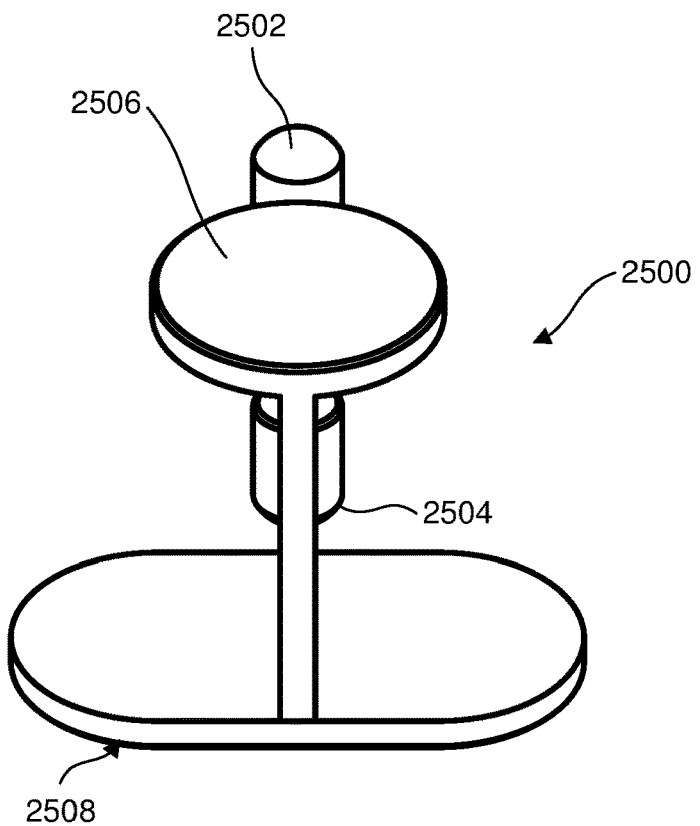

As shown in FIGS. 24A and 24B, layer 2106 may include a top face 2402 having a passthrough opening 2404 (which may be aligned with passthrough opening 2310), a controlling-gate-terminal opening 2406 (which may be aligned with controlling gate terminal 2314, and a restricting-gate-terminal opening 2408 (which may be aligned with gate fluid channel 2312). In addition, layer 2106 may include a piston chamber 2410 for housing a piston 2500 as shown in FIGS. 25A and 25B. As shown, layer 2106 may further include a bottom face 2412 having a passthrough port 2414. In this example, a fluid channel 2416 may connect passthrough port 2404 to passthrough port 2414. In some examples, a flexible seal or membrane 2418 may be configured to provide a fluid barrier between controlling gate terminal 2314 and/or gate fluid channel 2312 and piston chamber 2410.

As shown in FIGS. 25A and 25B, piston 2500 may include a restricting gate transmission element 2502 for restricting gate fluid channel 2312, a restricting gate transmission element 2504 for restricting a gate fluid channel 2710 (as shown in FIG. 27), a controlling gate transmission element 2506 for interfacing with a fluid pressure applied to controlling gate terminal 2314, and a controlling gate transmission element 2508 for interfacing with a fluid pressure applied to a controlling gate terminal 2712 (as shown in FIG. 27). In this example, restricting gate transmission element 2502, restricting gate transmission element 2504, controlling gate transmission element 2506, and controlling gate transmission element 2508 may be connected by a rigid connection member 2510. In this example, restricting gate transmission element 2502 may have a spherical surface for engaging with the walls of gate fluid channel 2312, and restricting gate transmission element 2504 may have a spherical surface for engaging with the walls of gate fluid channel 2710. In other embodiments, restricting gate transmission element 2502, gate fluid channel 2312, restricting gate transmission element 2504, and gate fluid channel 2710 may have other compatible shapes and configurations.

Figure 26A:
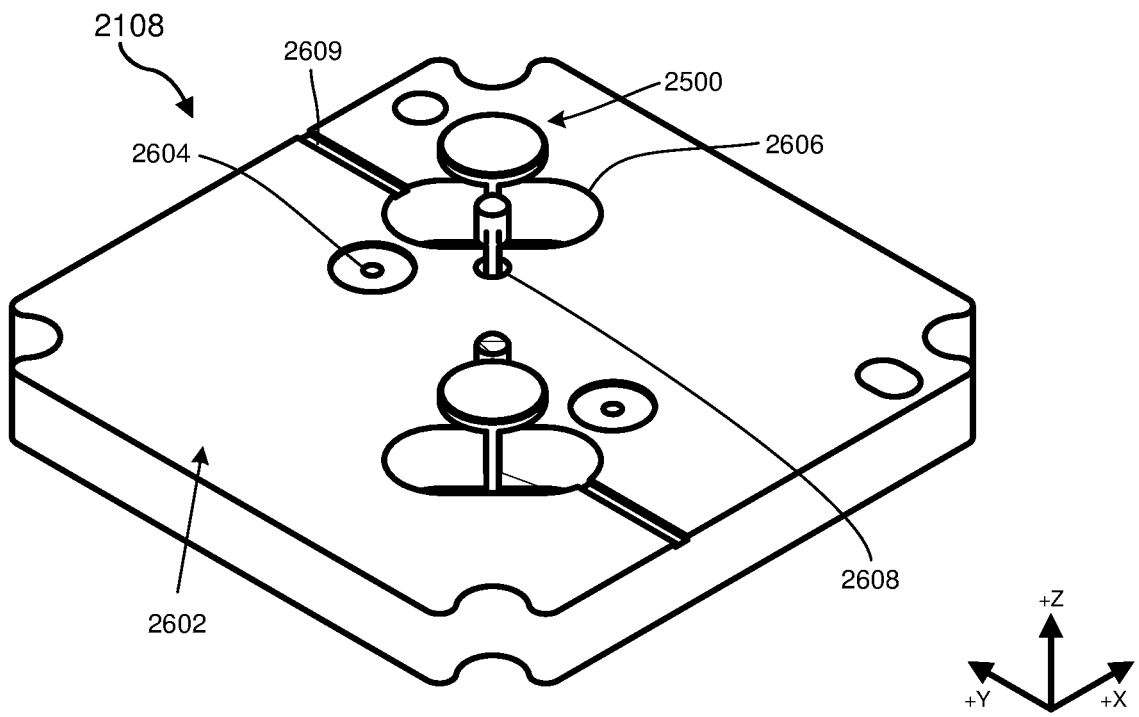
FIG. 26A is a perspective view of an exemplary layer of the fluidic-valve device of FIG. 21 having two exemplary pistons, according to at least one embodiment of the present disclosure.
Figure 26B:
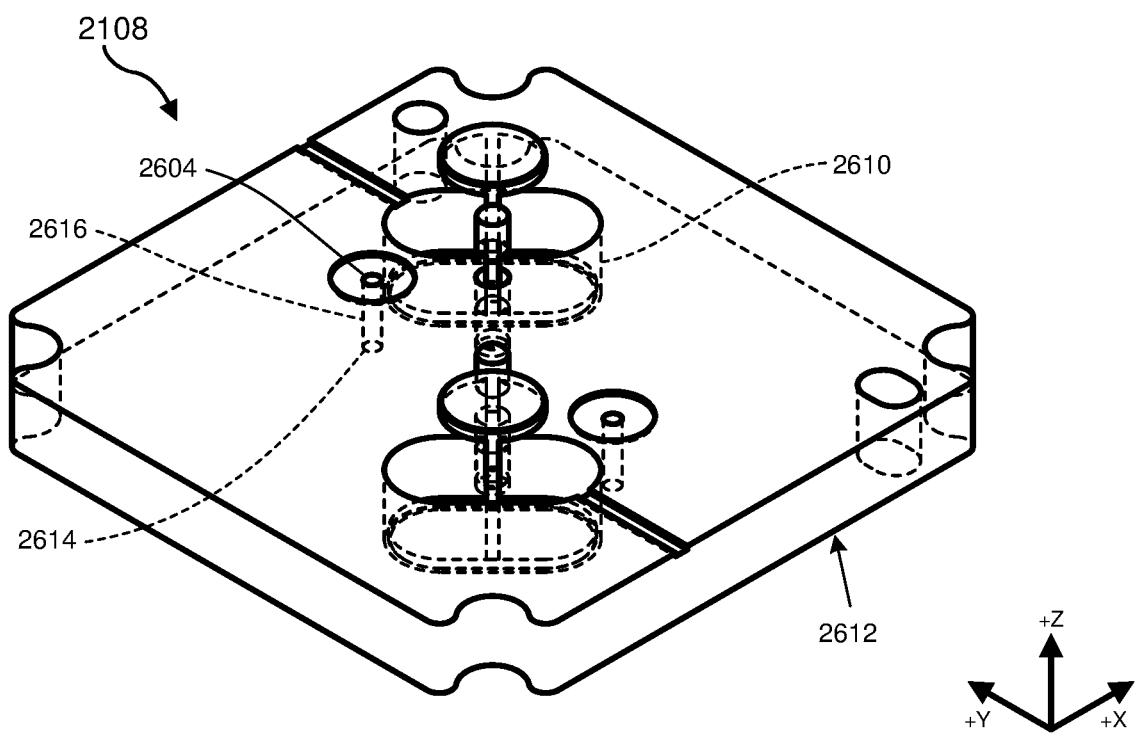
FIG. 26B is a partially transparent perspective view of the layer of FIG. 26A with two exemplary pistons, according to at least one embodiment of the present disclosure.
Figure 27A:
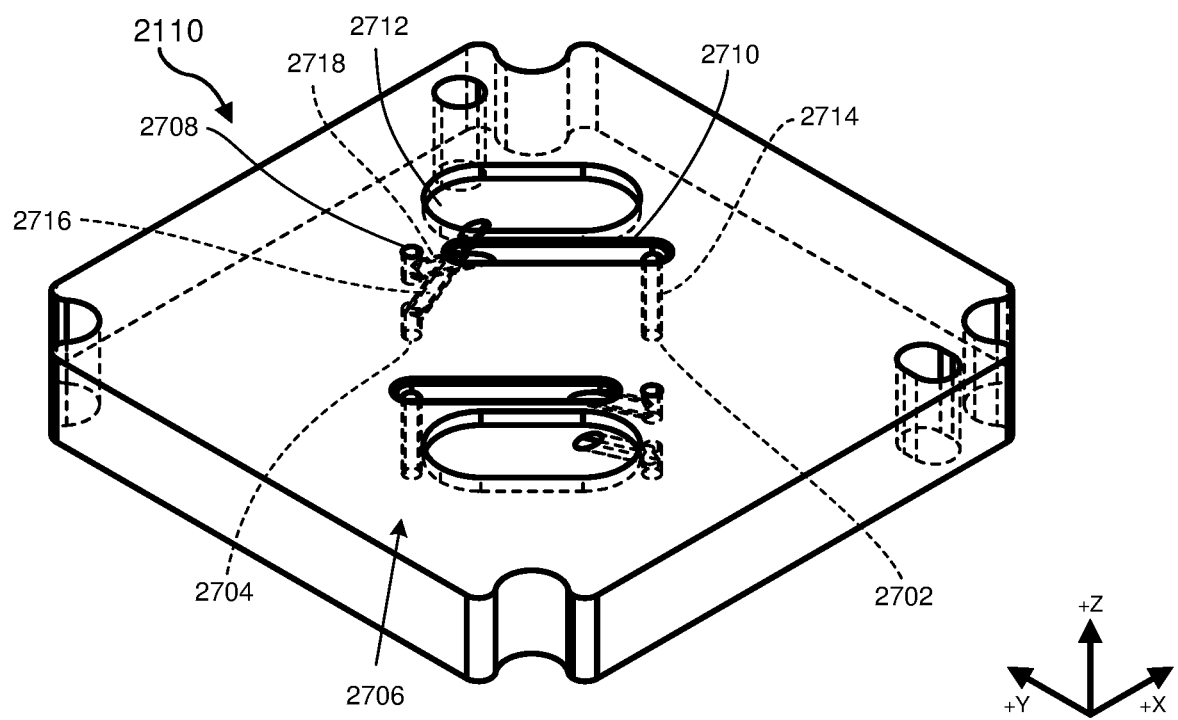
FIG. 27A is a partially transparent perspective view of an exemplary layer of the fluidic-valve device of FIG. 21, according to at least one embodiment of the present disclosure.
Figure 27B:
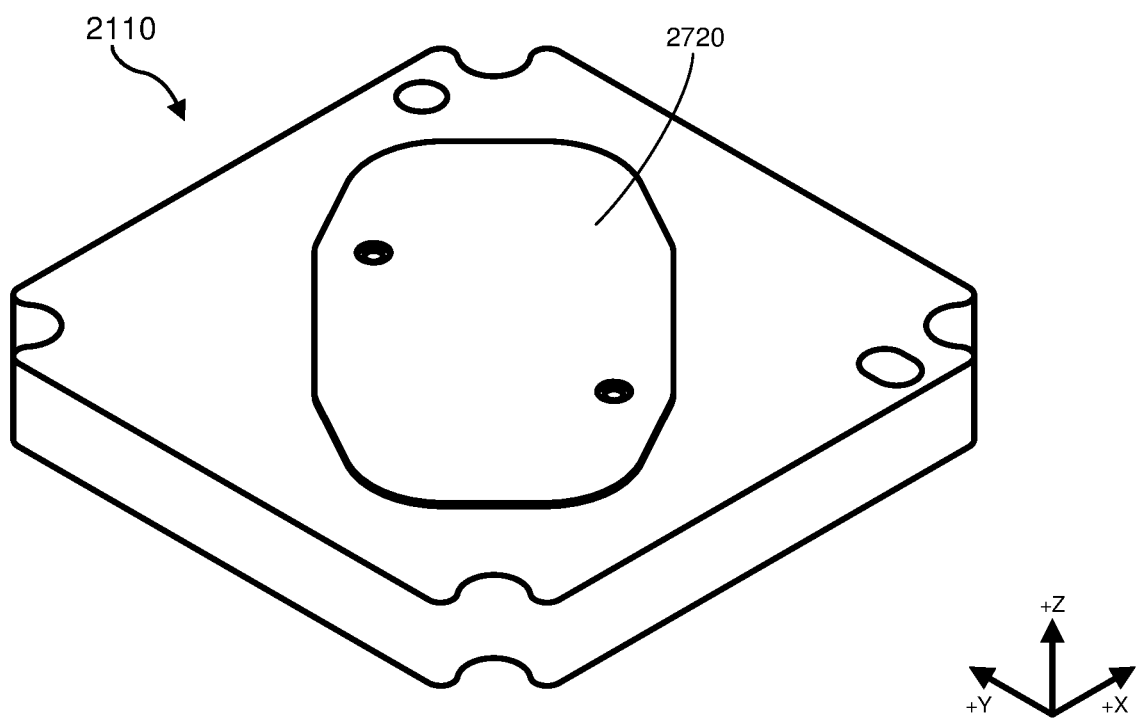
FIG. 27B is a perspective view of the layer of FIG. 27A with an exemplary membrane, according to at least one embodiment of the present disclosure.

As shown in FIGS. 26A and 26B, layer 2108 may include a top face 2602 having a passthrough opening 2604 (which may be aligned with passthrough opening 2414), a controlling-gate-terminal opening 2606, a restricting-gate-terminal opening 2608, and an interstitial-pressure channel 2609. In addition, layer 2108 may include a piston chamber 2610 for housing piston 2500. As shown, layer 2108 may further include a bottom face 2612 having a passthrough port 2614. In this example, a fluid channel 2616 may connect passthrough port 2604 to passthrough port 2614. As shown in FIGS. 27A and 27B, layer 2110 may include an inlet port 2702 and a control port 2704. Layer 2110 may also include a face 2706 having a passthrough port 2708, a gate fluid channel 2710, and a controlling gate terminal 2712. In this example, a fluid channel 2714 may connect inlet port 2702 with gate fluid channel 2710, a fluid channel 2716 may connect control port 2704 with controlling gate terminal 2712, a fluid channel 2718 may connect passthrough port 2708 with gate fluid channel 2710. In some examples, a flexible seal or membrane 2720 may be configured to provide a fluid barrier between controlling gate terminal 2712 and/or gate fluid channel 2710 and piston chamber 2610. As shown in FIG. 28, layer 2112 may include various opening and access channels (e.g., access channels 2802 and 2804) to which fluid connections may be made and/or through which fluid connections may be routed to layer 2110.

Figure 29:
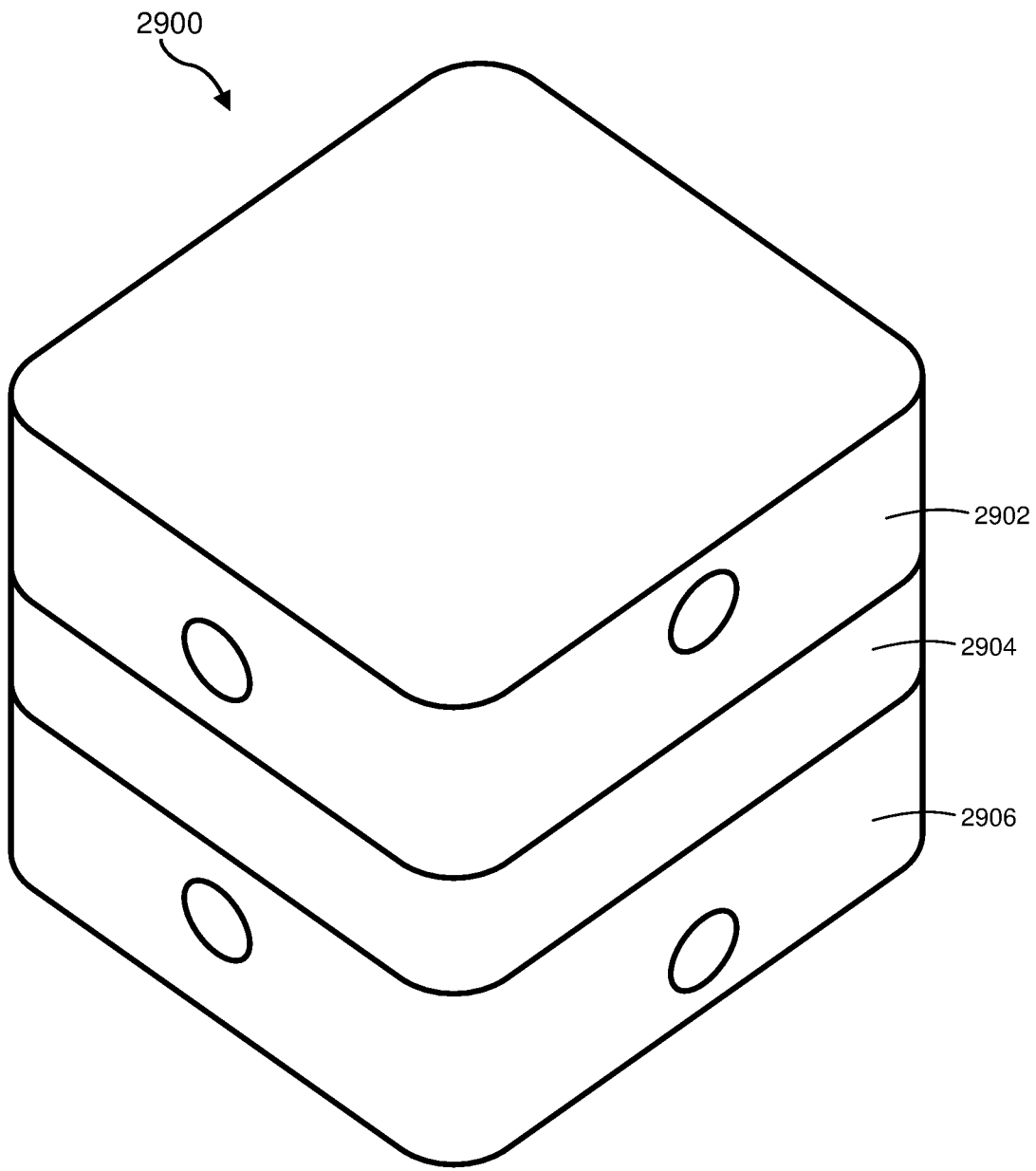
FIG. 29 is a perspective view of an exemplary fluidic-valve device, according to at least one embodiment of the present disclosure.

FIGS. 29-38 illustrate various views of a fluidic-valve device 2900 according to at least one embodiment of the present disclosure. In some examples, fluidic-valve device 2900 in FIGS. 29-38 may represent one way in which fluidic valves 300, 400, and/or 500 may be constructed and configured. As shown in FIG. 29, fluidic-valve device 2900 may have a multilayer structure. In this example, fluidic-valve device 2900 may include three rigid or semi-rigid layers 2902-2906. In some examples, layers 2902, 2904, and 2906 may be made of a substantially rigid material (e.g., plastic or glass) and/or may be sandwiched between additional layers of a more rigid material (e.g., a rigid metal) that may provide additional structural stiffness to fluidic-valve device 2900, especially when fluidic-valve device 2900 is under pressure.

Figure 30:
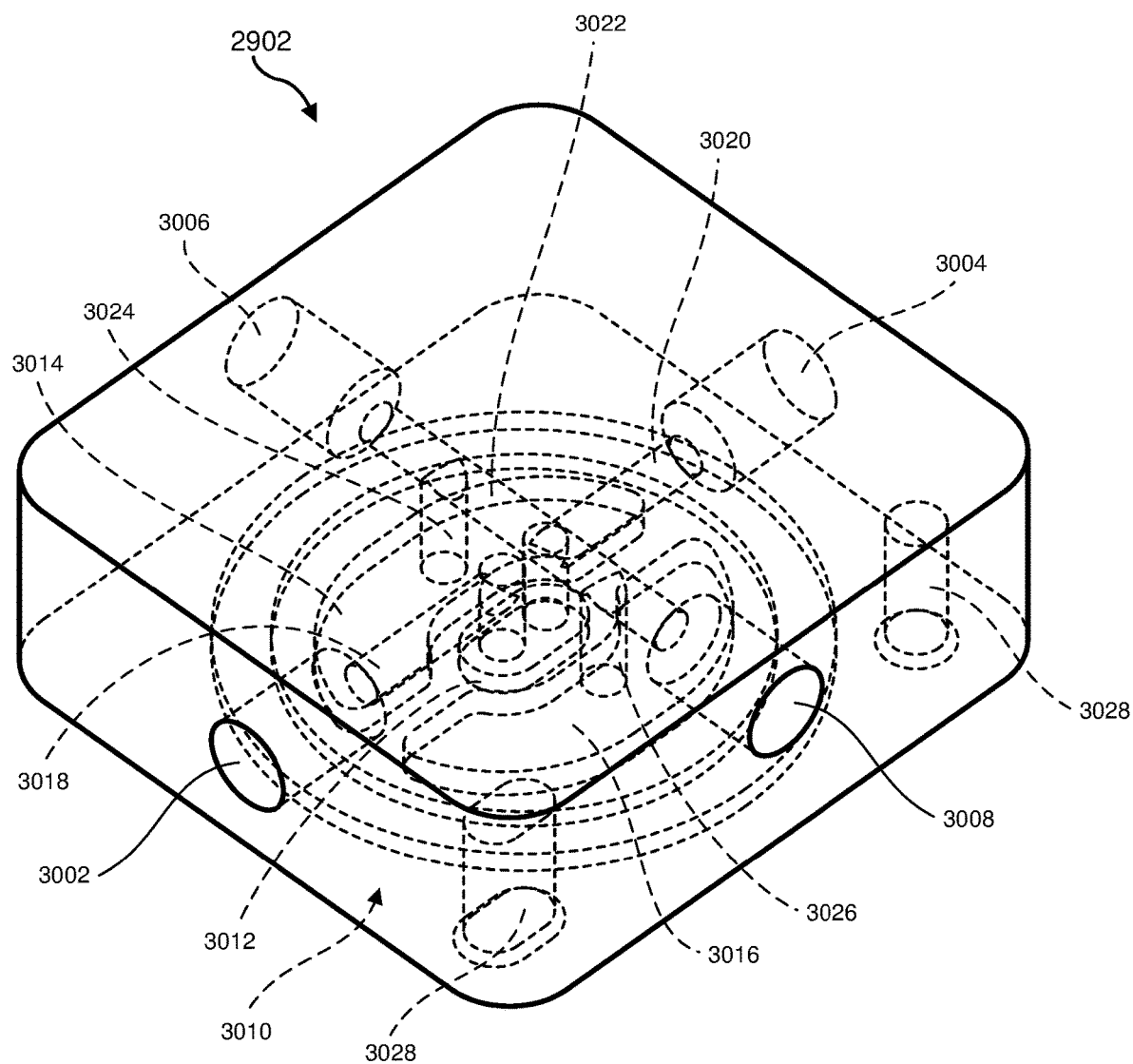
FIG. 30 is a partially transparent perspective view of an exemplary layer of the fluidic-valve device of FIG. 29, according to at least one embodiment of the present disclosure.
Figure 31:
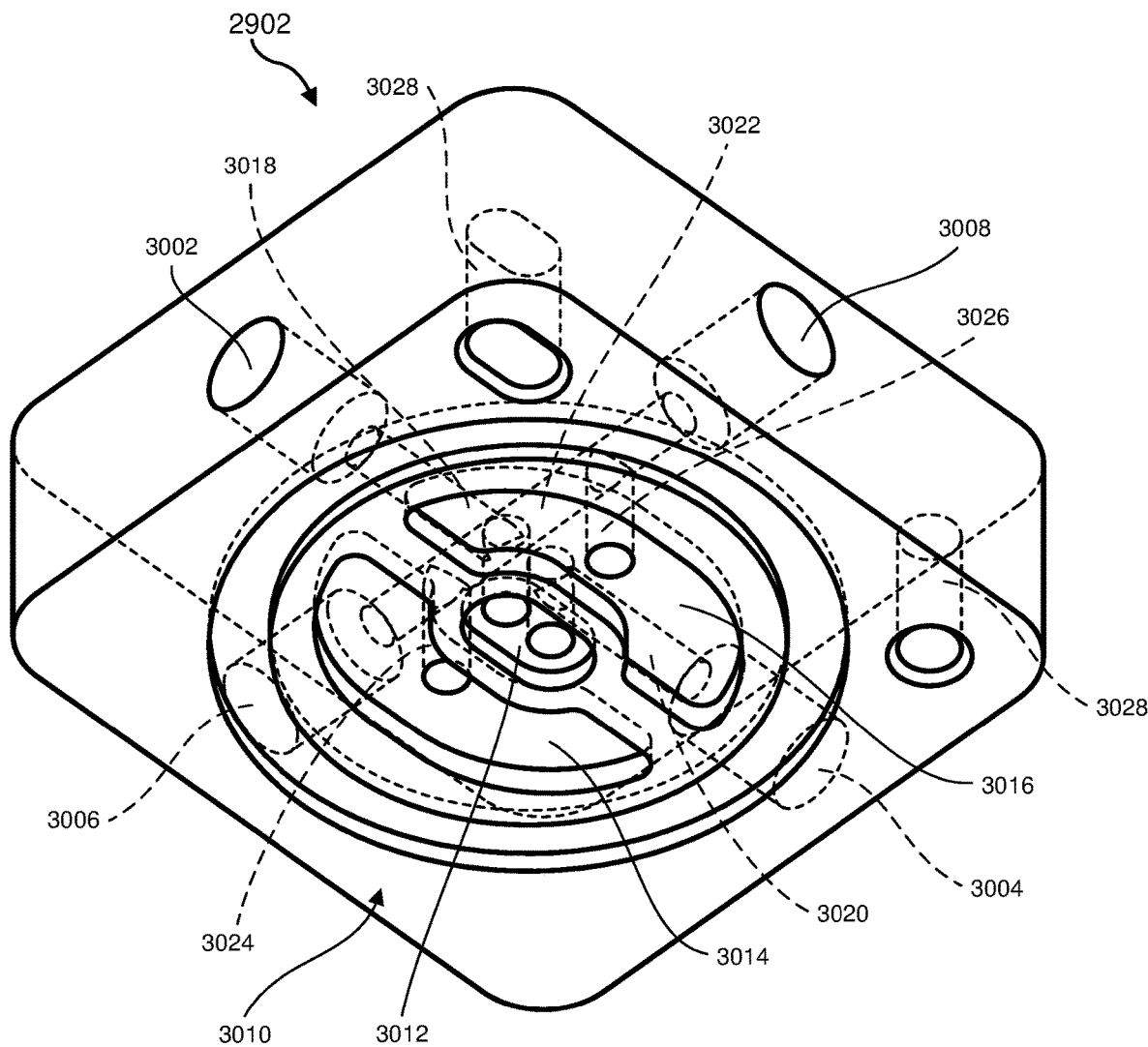
FIG. 31 is another partially transparent perspective view of the exemplary layer of FIG. 30, according to at least one embodiment of the present disclosure.

As shown in FIGS. 30 and 31, layer 2902 may include an inlet port 3002, an outlet port 3004, a control port 3006, and a control port 3008. A bottom face 3010 of layer 2902 may include a gate fluid channel 3012, a controlling gate terminal 3014, and a controlling gate terminal 3016. In this example, a fluid channel 3018 may connect inlet port 3002 with gate fluid channel 3012, a fluid channel 3020 may connect outlet port 3004 with gate fluid channel 3012, a fluid channel 3022 may connect control port 3006 with control port 3008, and fluid channels 3024 and 3026 may connect controlling gate terminals 3014 and 3016 with fluid channel 3022. As shown in FIGS. 30 and 31, layer 2902 may further include one or more alignment openings 3028 configured to accept alignment pins for maintaining alignment of layers 2902-2906.

Figure 33:
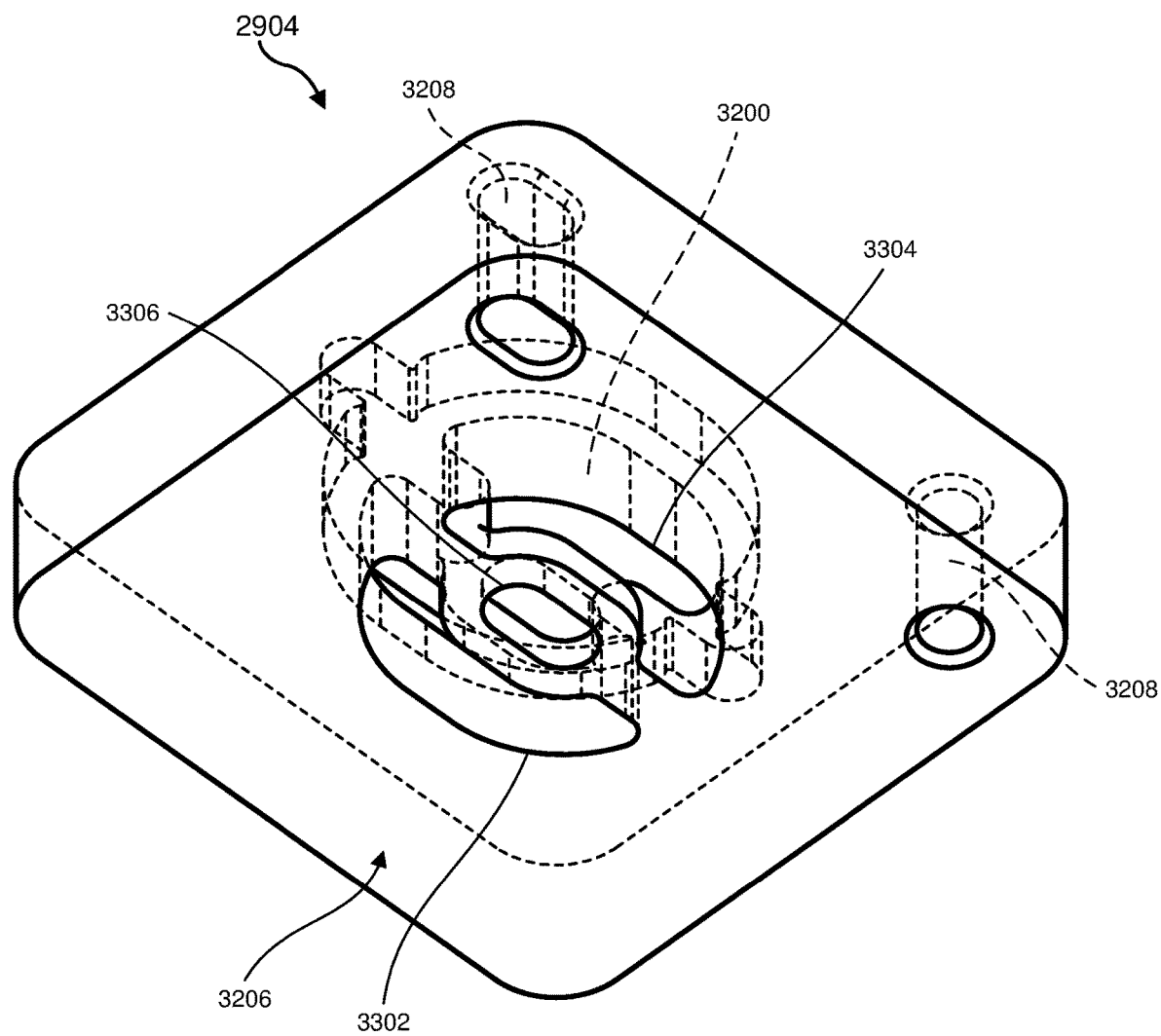
FIG. 33 is another partially transparent perspective view of the exemplary layer of FIG. 32, according to at least one embodiment of the present disclosure.
Figure 34:
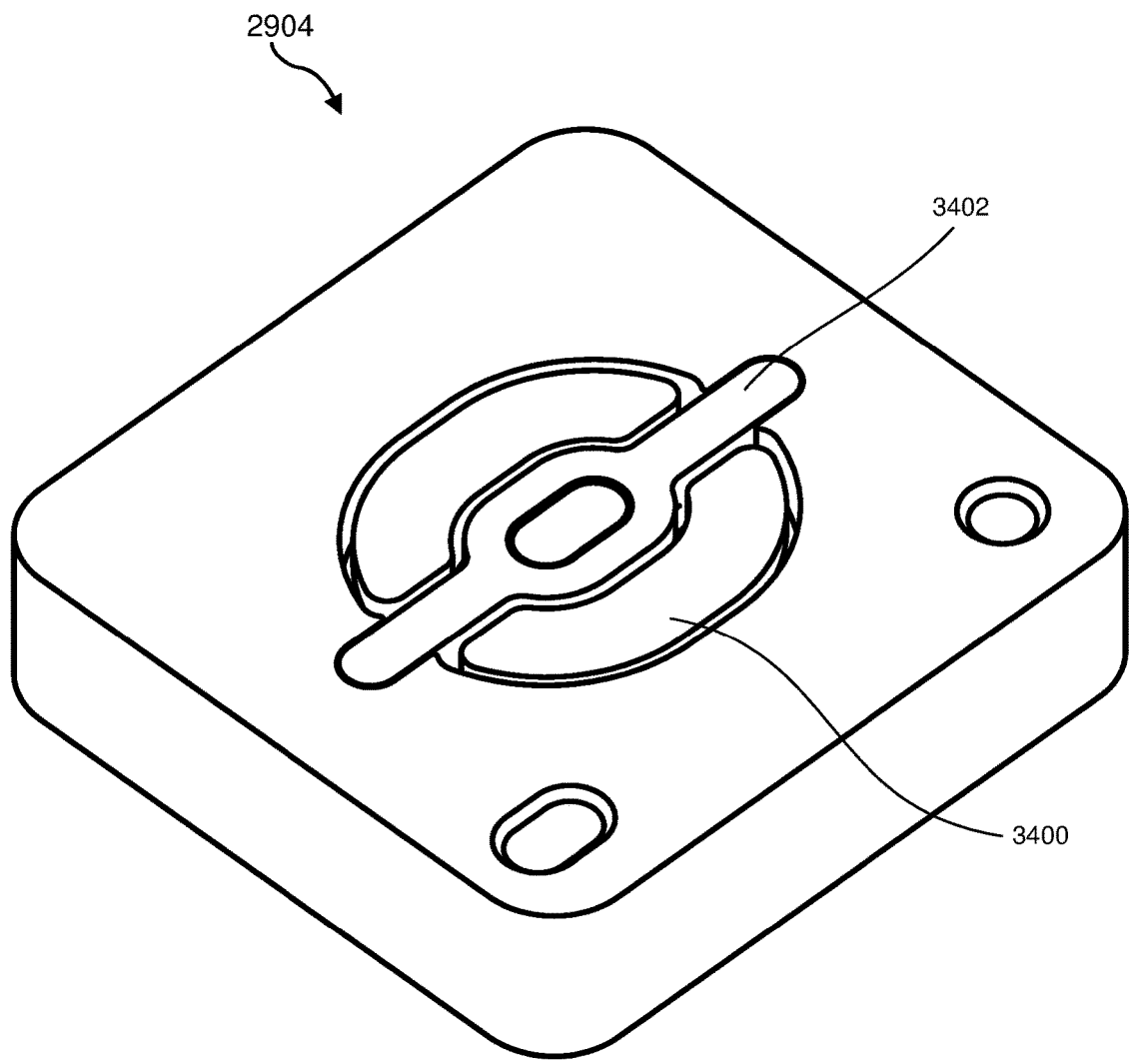
FIG. 34 is a perspective view of an exemplary piston and an exemplary piston support disposed within the exemplary layer of FIG. 32, according to at least one embodiment of the present disclosure.

As shown in FIGS. 32-34, layer 2904 may include a piston chamber 3200 for housing a piston 3400. A top face 3202 of layer 2904 may include a piston-chamber opening 3204 (which may be aligned with gate fluid channel 3012, controlling gate terminal 3014, and controlling gate terminal 3016), and a bottom face 3206 of layer 2904 may include a controlling-gate-terminal opening 3302 (which may be aligned with a controlling gate terminal 3814 shown in FIG.

Figure 35:
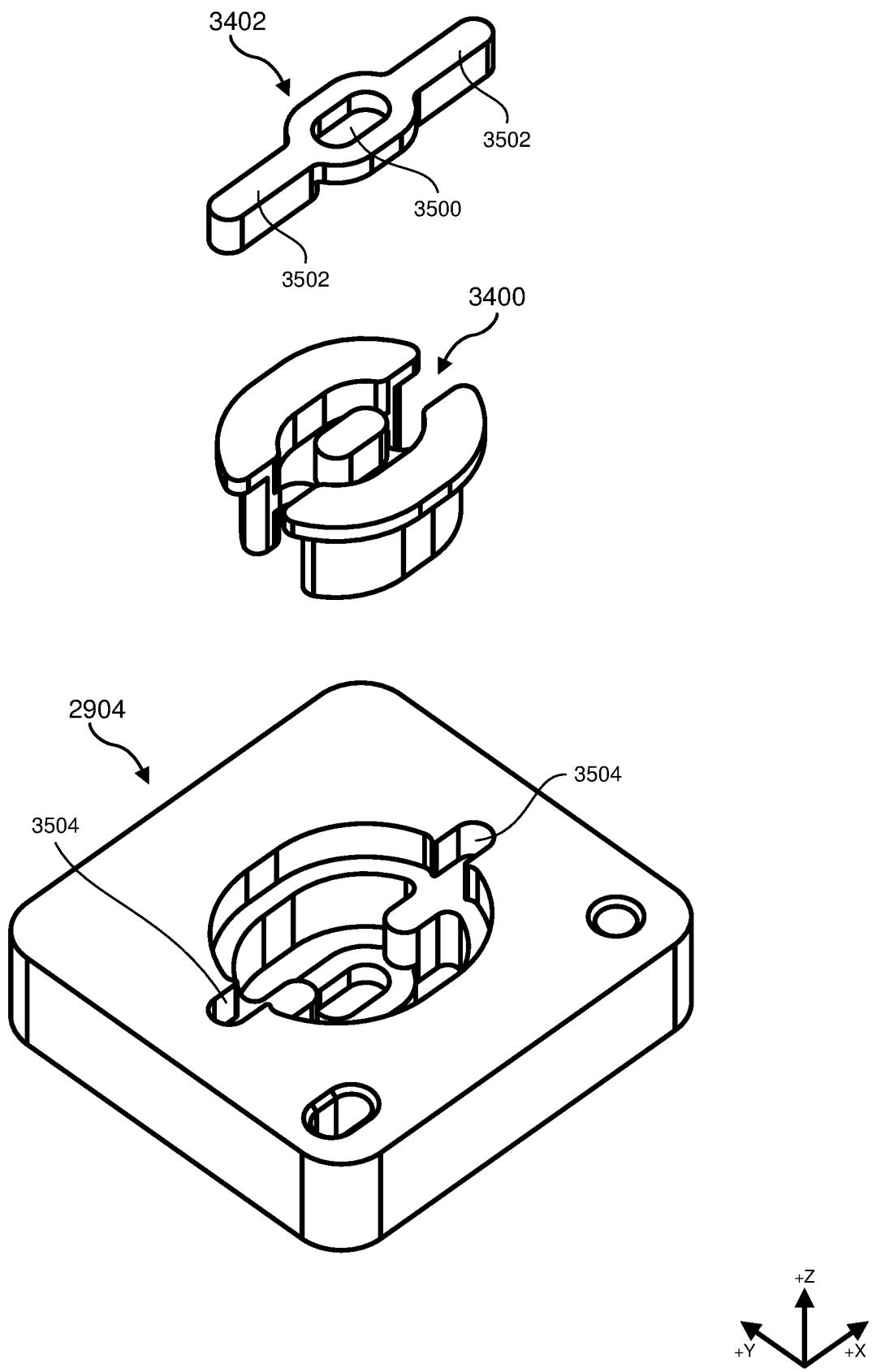
FIG. 35 is an exploded view of the exemplary piston, the exemplary piston support, and the exemplary layer illustrated in FIG. 34, according to at least one embodiment of the present disclosure.
Figure 38:
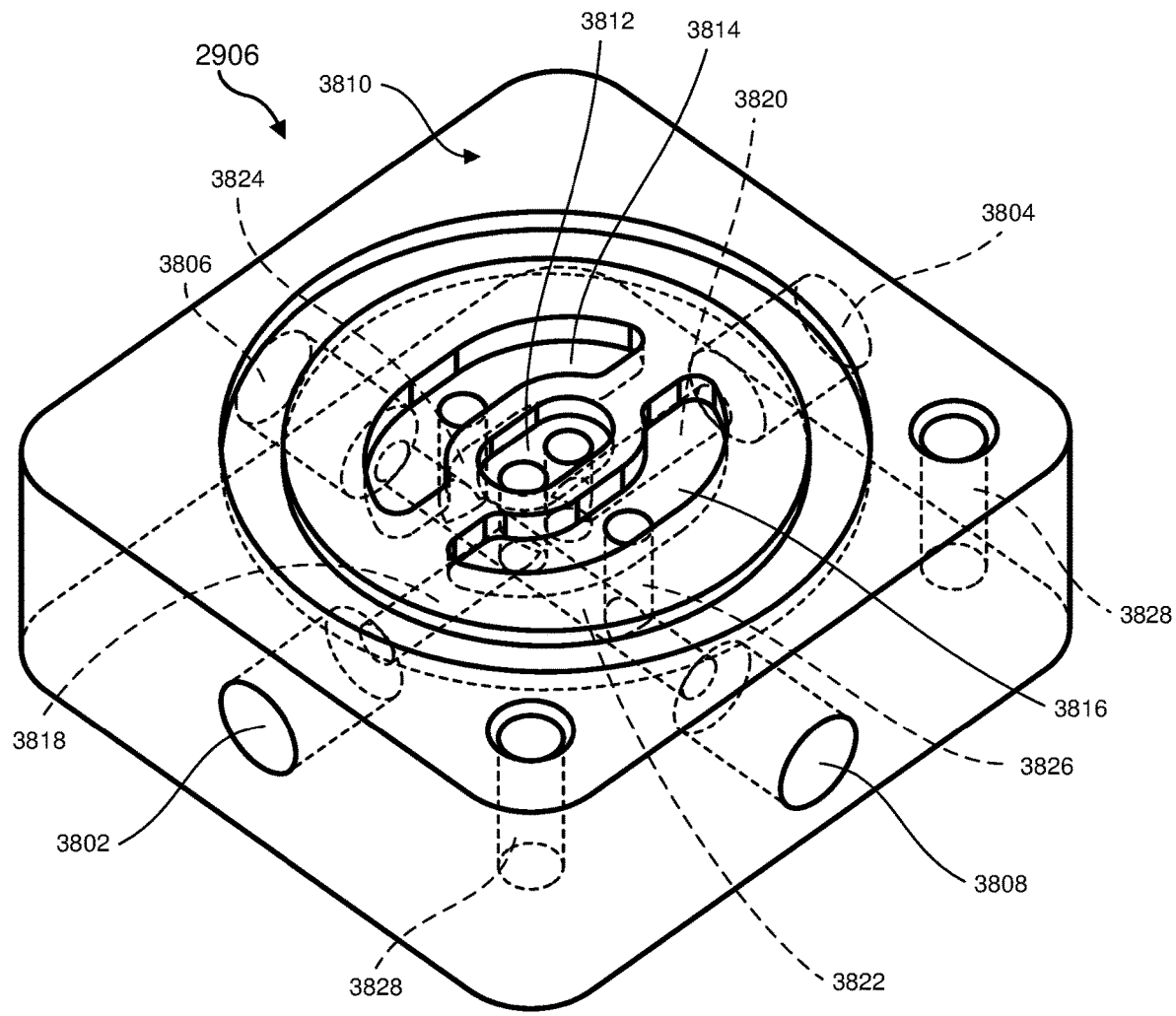
FIG. 38 is a partially transparent perspective view of an exemplary layer of the fluidic-valve device of FIG. 29, according to at least one embodiment of the present disclosure.

38), a controlling-gate-terminal opening 3304 (which may be aligned with a controlling gate terminal 3816 shown in FIG. 38), and a restricting-gate-terminal opening 3306 (which may be aligned with a gate fluid channel 3812 shown in FIG. 38). Layer 2904 may further include one or more alignment openings 3208 configured to accept alignment pins for maintaining alignment of layers 2902-2906. A piston support 3402 may position piston 3400 within piston chamber 3200 and may act as a stop against upward movement of piston 3400. As shown in FIG. 35, piston support 3402 may include an opening 3500 shaped to accept a restricting gate transmission element 3602 of piston 3400, and arms 3502 for indexing with notches 3504 of layer 2904.

Figure 36A:
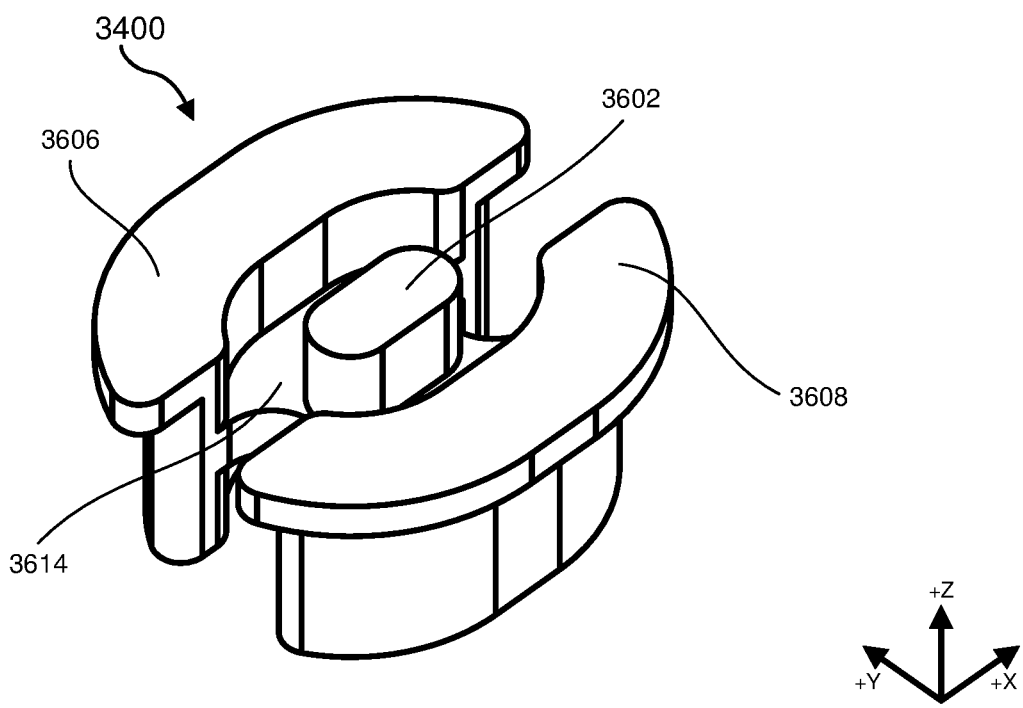
FIGS. 36A and 36B are perspective views of the exemplary piston of FIG. 34, according to at least one embodiment of the present disclosure.
Figure 36B:
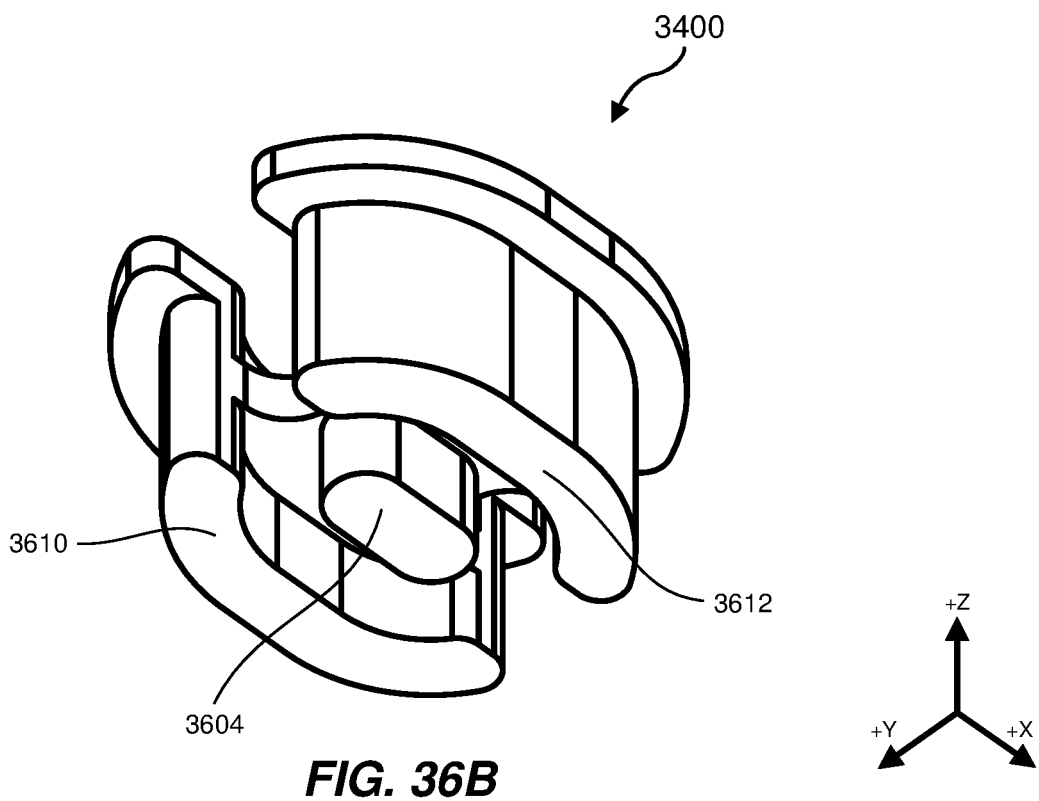

As shown in FIGS. 36A and 36B, piston 3400 may include restricting gate transmission element 3602 for restricting gate fluid channel 3012, a restricting gate transmission element 3604 for restricting a gate fluid channel 3812 (as shown in FIG. 38), controlling gate transmission elements 3606 and 3608 for interfacing with a fluid pressure applied to controlling gate terminals 3014 and 3016, and controlling gate transmission elements 3610 and 3612 for interfacing with a fluid pressure applied to controlling gate terminals 3814 and 3816 (as shown in FIG. 38). In this example, restricting gate transmission element 3602, restricting gate transmission element 3604, controlling gate transmission element 3606, and controlling gate transmission element 3608 may be connected by a rigid connection member 3614. In this example, restricting gate transmission element 3602 may be shaped to substantially fit within the walls of gate fluid channel 3012, and restricting gate transmission element 3604 may be shaped to substantially fit within the walls of gate fluid channel 3812. In other embodiments, restricting gate transmission element 3602, gate fluid channel 3012, restricting gate transmission element 3604, and gate fluid channel 3812 may have other compatible shapes and configurations. In some embodiments, controlling gate transmission elements 3606 and 3608 may be sized and shaped to substantially fit within the walls of controlling gate terminals 3014 and 3016, and controlling gate transmission elements 3610 and 3612 may be sized and shaped to substantially fit within the walls of controlling gate terminals 3814 and 3816. As shown, the surface areas of controlling gate transmission elements 3606 and 3608 may be greater than the surface areas of controlling gate transmission elements 3610 and 3612.

Figure 37A:
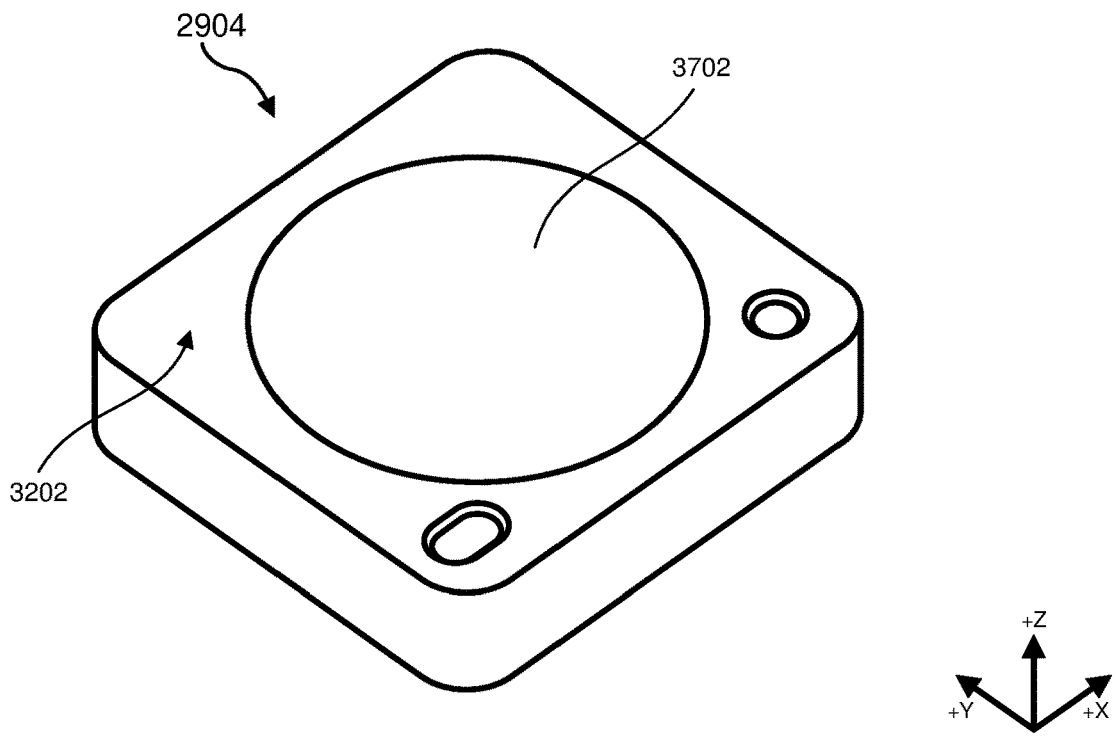
FIG. 37A is a perspective view of the exemplary layer of FIG. 32 with an exemplary membrane, according to at least one embodiment of the present disclosure.
Figure 37B:
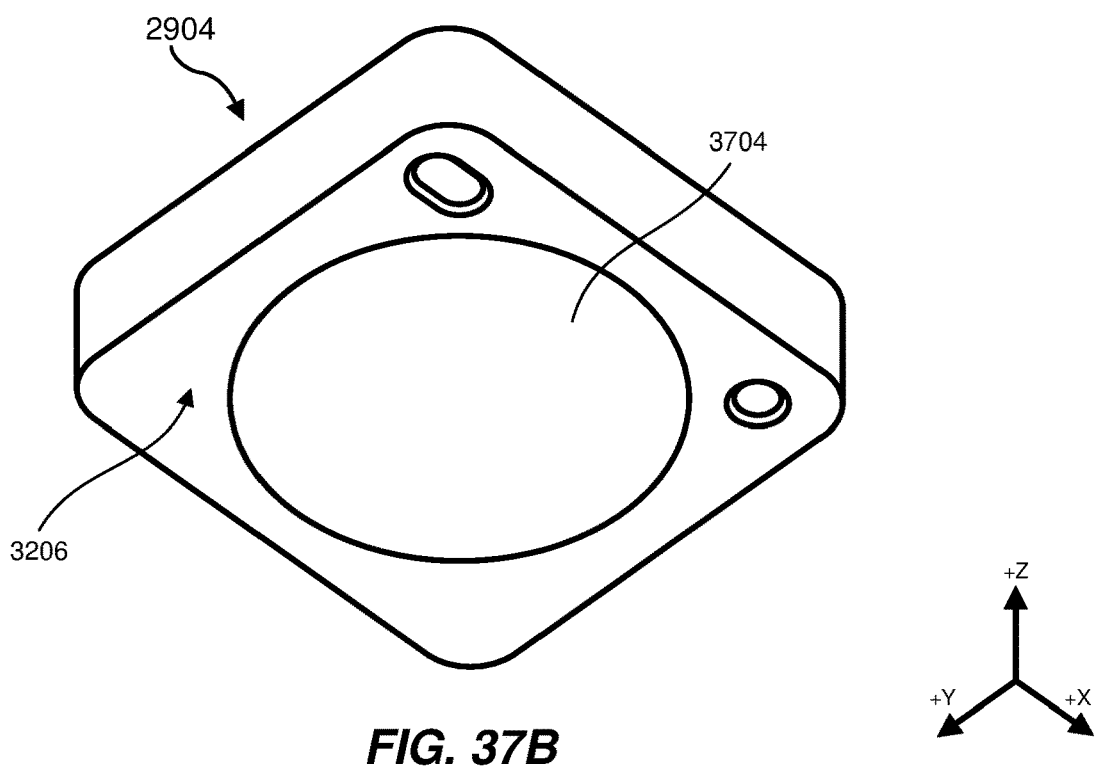
FIG. 37B is a perspective view of the exemplary layer of FIG. 32 with another exemplary membrane, according to at least one embodiment of the present disclosure.

In some examples, piston 3400 may have a thickness substantially equal to the thickness of layer 2904. As shown in FIG. 37A, a flexible seal or membrane 3702 may be configured to provide a fluid barrier between piston-chamber opening 3204 and gate fluid channel 3012, controlling gate terminal 3014, and controlling gate terminal 3016. Membrane 3702 may also supply a downward force to piston 3400 when stretched. As shown in FIG. 37B, a flexible seal or membrane 3704 may be configured to provide a fluid barrier between controlling-gate-terminal opening 3302, controlling-gate-terminal opening 3304, and restricting-gate-terminal opening 3306 and gate fluid channel 3812, controlling gate terminal 3814, and controlling gate terminal 3816. Membrane 3704 may also supply an upward force to piston 3400 when stretched.

As shown in FIG. 38, layer 2906 may include an inlet port 3802, an outlet port 3804, a control port 3806, and a control port 3808. Layer 2906 may also include a top face 3810 having a gate fluid channel 3812, a controlling gate terminal 3814, and a controlling gate terminal 3816. In this example, a fluid channel 3818 may connect inlet port 3802 with gate fluid channel 3812, a fluid channel 3820 may connect outlet port 3804 with gate fluid channel 3812, a fluid channel 3822 may connect control port 3806 with control port 3808, and fluid channels 3824 and 3826 may connect controlling gate terminals 3814 and 3816 with fluid channel 3822. As shown in FIGS. 38, layer 2906 may further include one or more alignment openings 3828 configured to accept alignment pins for maintaining alignment of layers 2902-2906.

Figure 39:
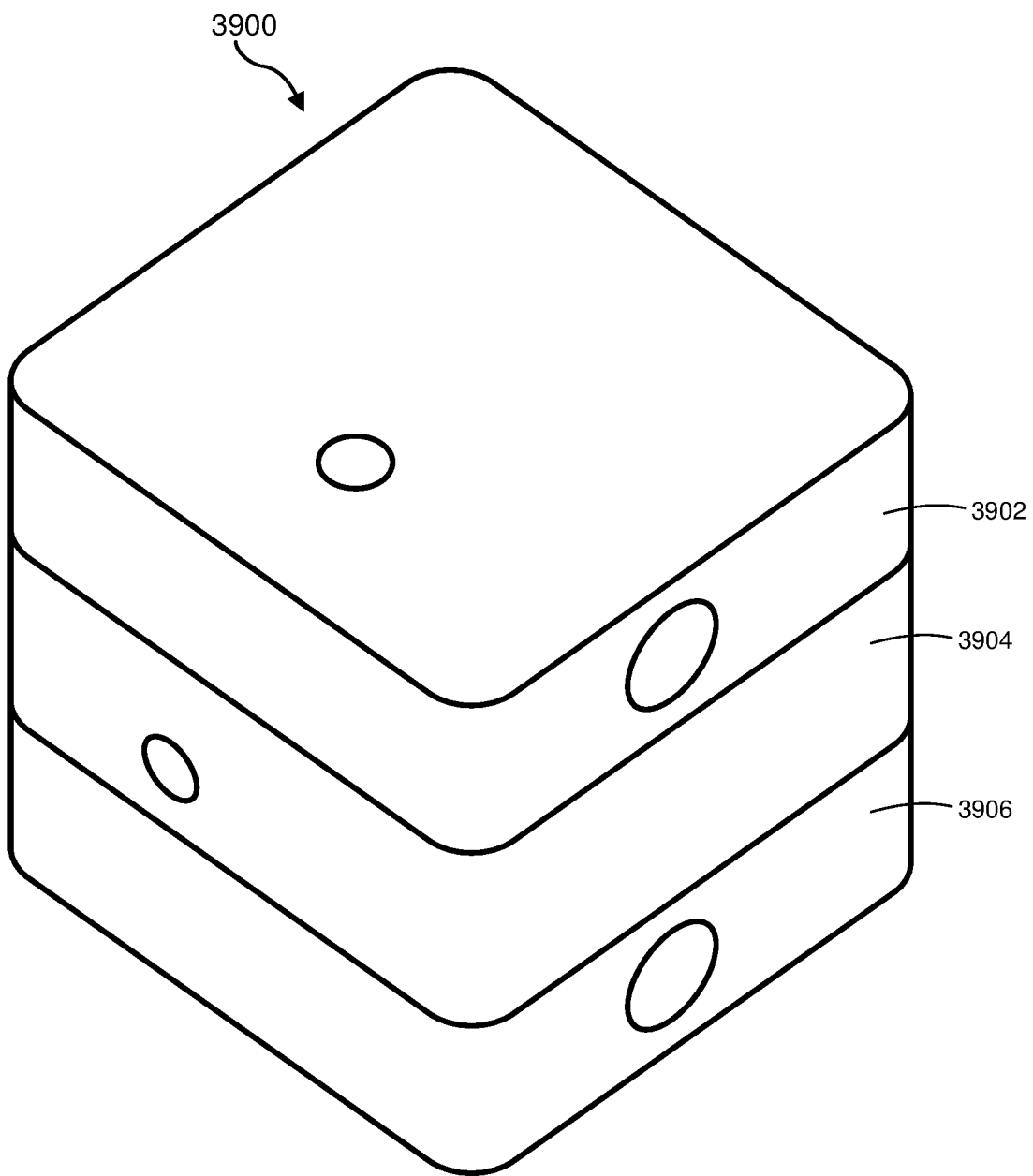
FIG. 39 is a perspective view of an exemplary fluidic-valve device, according to at least one embodiment of the present disclosure.

FIGS. 39-48 illustrate various views of a fluidic-valve device 3900 according to at least one embodiment of the present disclosure. In some examples, fluidic-valve device 3900 in FIGS. 39-48 may represent one way in which fluidic valves 300, 400, and/or 500 may be constructed and configured. As shown in FIG. 39, fluidic-valve device 3900 may have a multilayer structure. In this example, fluidic-valve device 3900 may include three rigid or semi-rigid layers 3902-3906. In some examples, layers 3902, 3904, and 3906 may be made of a substantially rigid material (e.g., plastic or glass) and/or may be sandwiched between additional layers of a more rigid material (e.g., a rigid metal) that may provide additional structural stiffness to fluidic-valve device 3900, especially when fluidic-valve device 3900 is under pressure.

Figure 40:
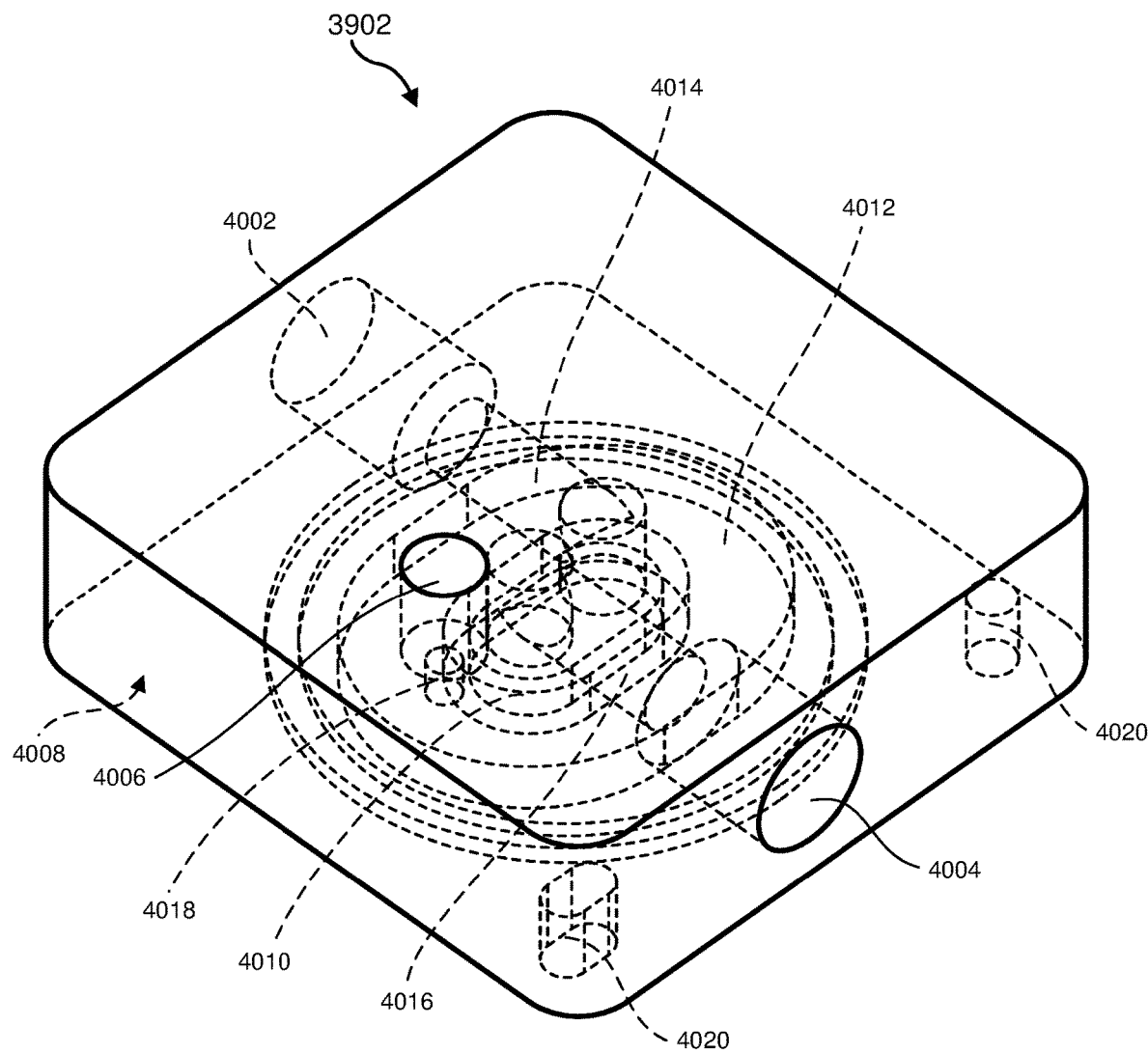
FIG. 40 is a partially transparent perspective view of an exemplary layer of the fluidic-valve device of FIG. 39, according to at least one embodiment of the present disclosure.
Figure 41:
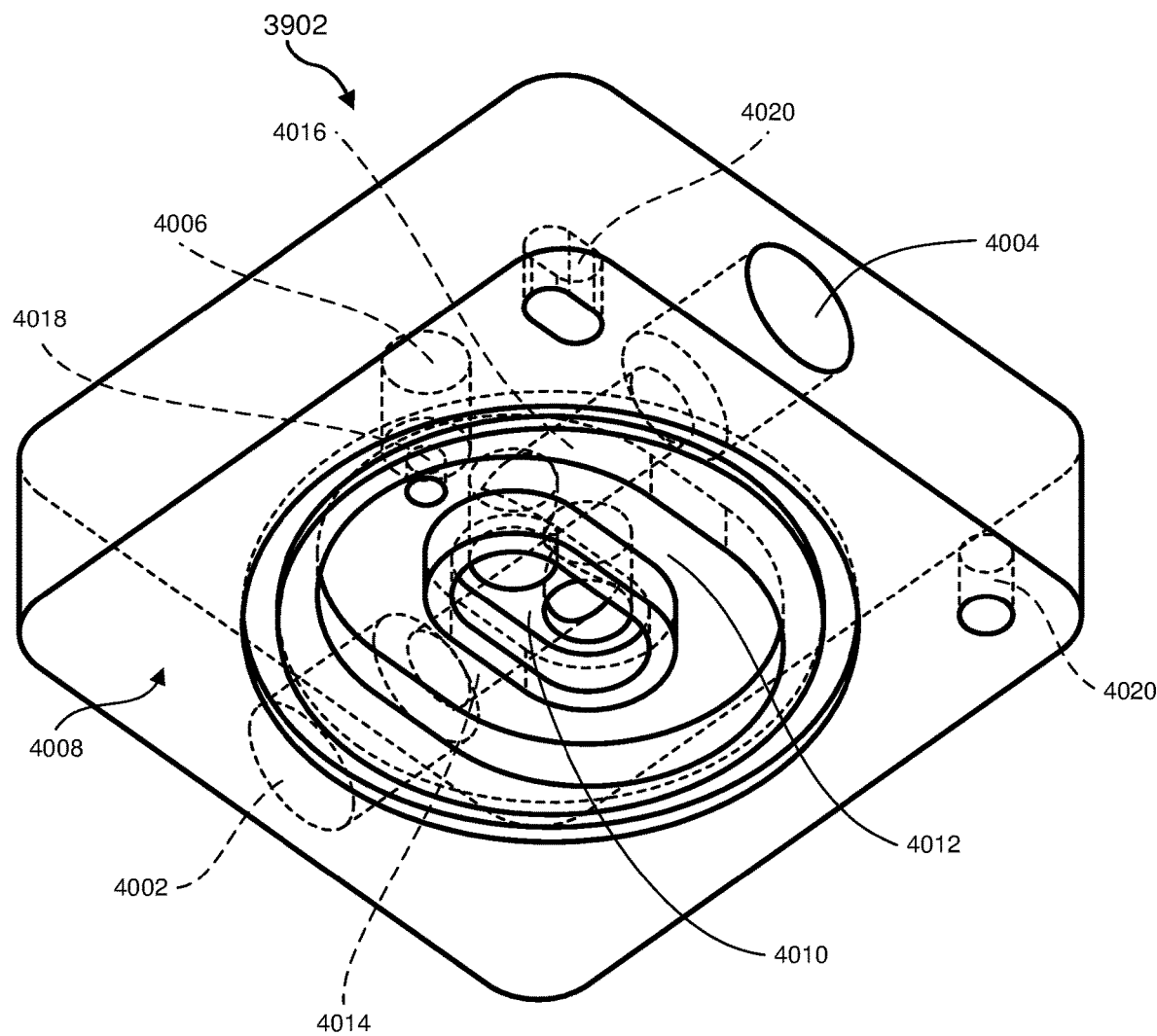
FIG. 41 is another partially transparent perspective view of the exemplary layer of FIG. 40, according to at least one embodiment of the present disclosure.

As shown in FIGS. 40 and 41, layer 3902 may include an inlet port 4002, an outlet port 4004, and a control port 4006. A bottom face 4008 of layer 3902 may include a gate fluid channel 4010 and a controlling gate terminal 4012. In this example, a fluid channel 4014 may connect inlet port 4002 with gate fluid channel 4010, a fluid channel 4016 may connect outlet port 4004 with gate fluid channel 4010, and a fluid channel 4018 may connect control port 4006 to controlling gate terminal 4012. As shown in FIGS. 40 and 41, layer 3902 may further include one or more alignment openings 4020 configured to accept alignment pins for maintaining alignment of layers 3902-3906.

Figure 43:
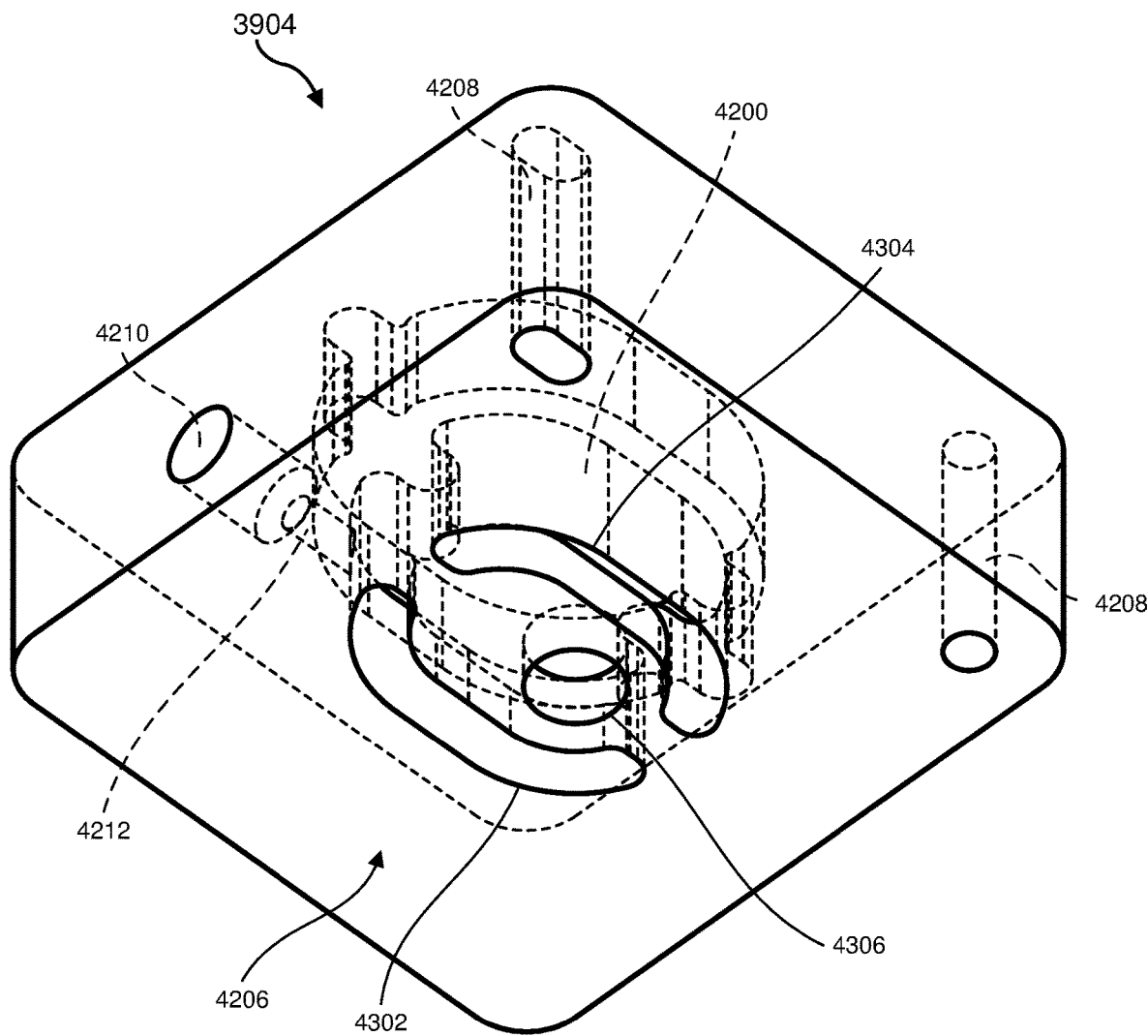
FIG. 43 is another partially transparent perspective view of the exemplary layer of FIG. 42, according to at least one embodiment of the present disclosure.
Figure 44:
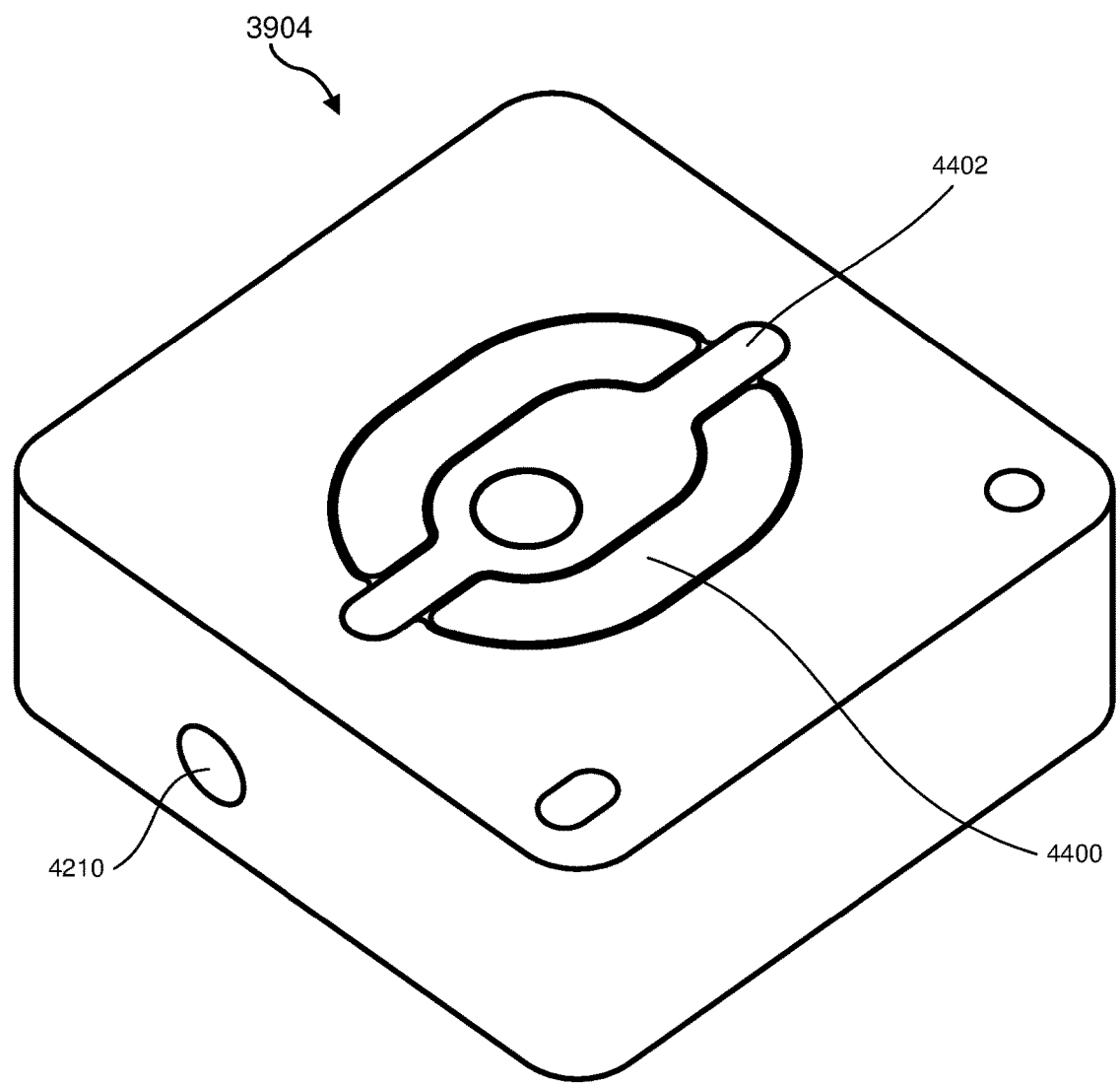
FIG. 44 is a perspective view of an exemplary piston and an exemplary piston support disposed within the exemplary layer of FIG. 42, according to at least one embodiment of the present disclosure.
Figure 45:
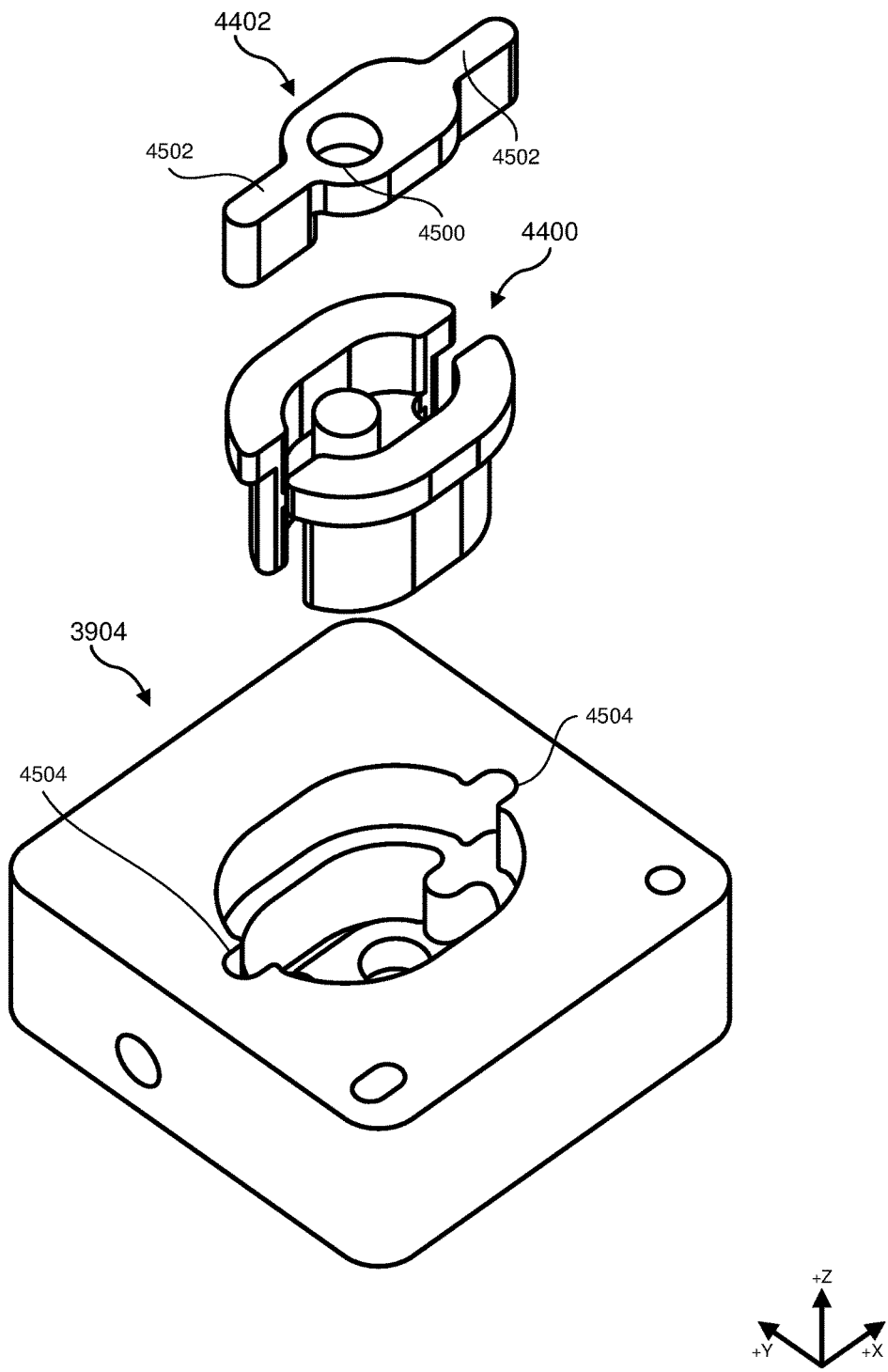
FIG. 45 is an exploded view of the exemplary piston, the exemplary piston support, and the exemplary layer illustrated in FIG. 44, according to at least one embodiment of the present disclosure.

As shown in FIGS. 42-44, layer 3904 may include a piston chamber 4200 for housing a piston 4400. A top face 4202 of layer 3904 may include a piston-chamber opening 4204 (which may be aligned with gate fluid channel 4010 and controlling gate terminal 4012), and a bottom face 4206 of layer 3904 may include a controlling-gate-terminal opening 4302 (which may be aligned with a controlling gate terminal 4812 shown in FIG. 48), a controlling-gate-terminal opening 4304 (which may be aligned with controlling gate terminal 4812 shown in FIG. 48), and a restricting-gate-terminal opening 4306 (which may be aligned with a gate fluid channel 4810 shown in FIG. 48). Layer 3904 may also include one or more alignment openings 4208 configured to accept alignment pins for maintaining alignment of layers 3902-3906, and an interstitial-pressure inlet/outlet 4210 connected to piston-chamber 4200 by a fluid channel 4212. A piston support 4402 may position piston 4400 within piston chamber 4200 and may act as a stop against upward movement of piston 4400. As shown in FIG. 45, piston support 4402 may include an opening 4500 shaped to accept a restricting gate transmission element 4602 of piston 4400, and arms 4502 for indexing with notches 4504 of layer 3904.

Figure 46A:
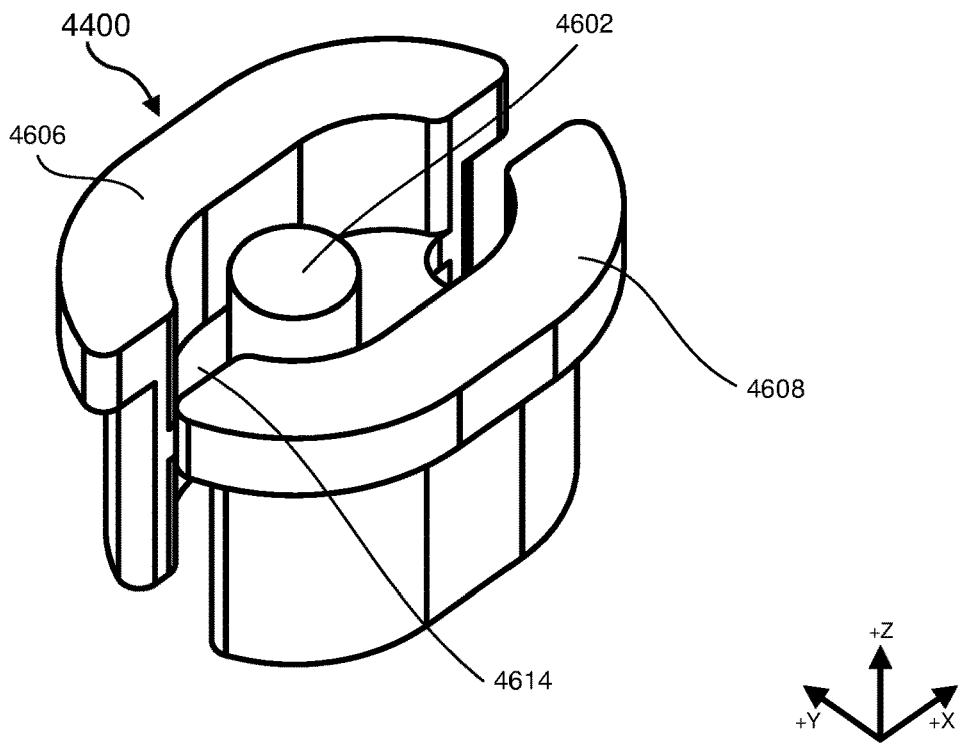
FIGS. 46A and 46B are perspective views of the exemplary piston of FIG. 44, according to at least one embodiment of the present disclosure.
Figure 46B:
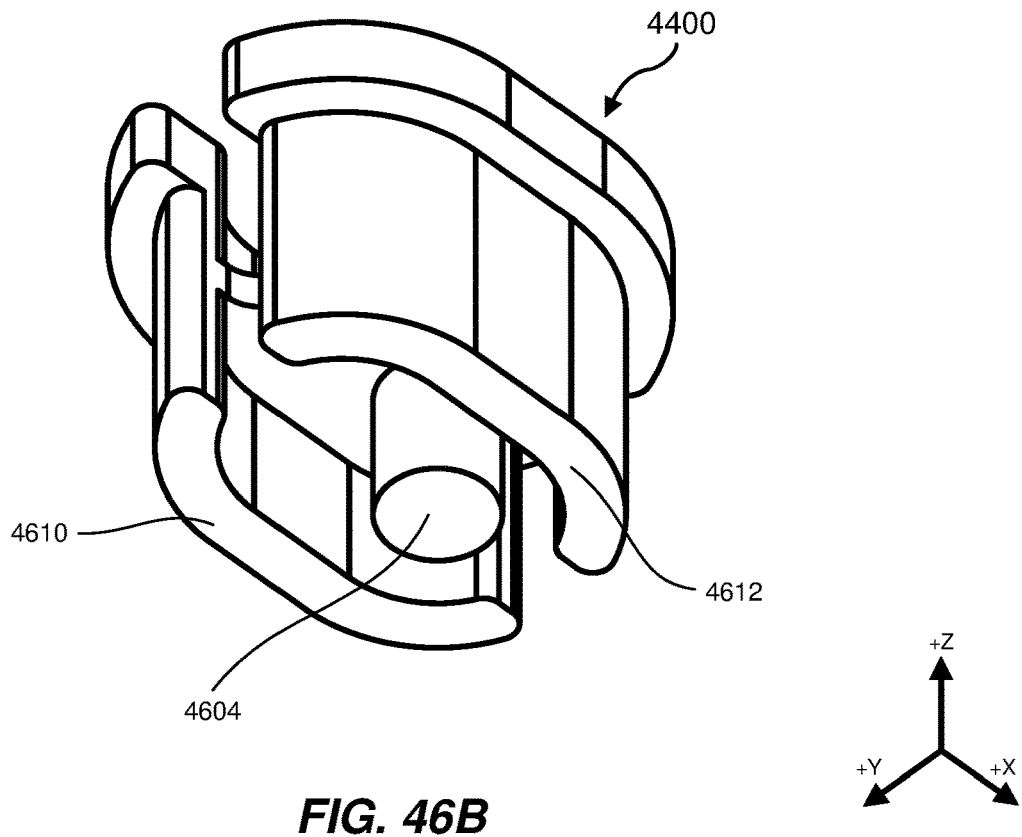
Figure 48:
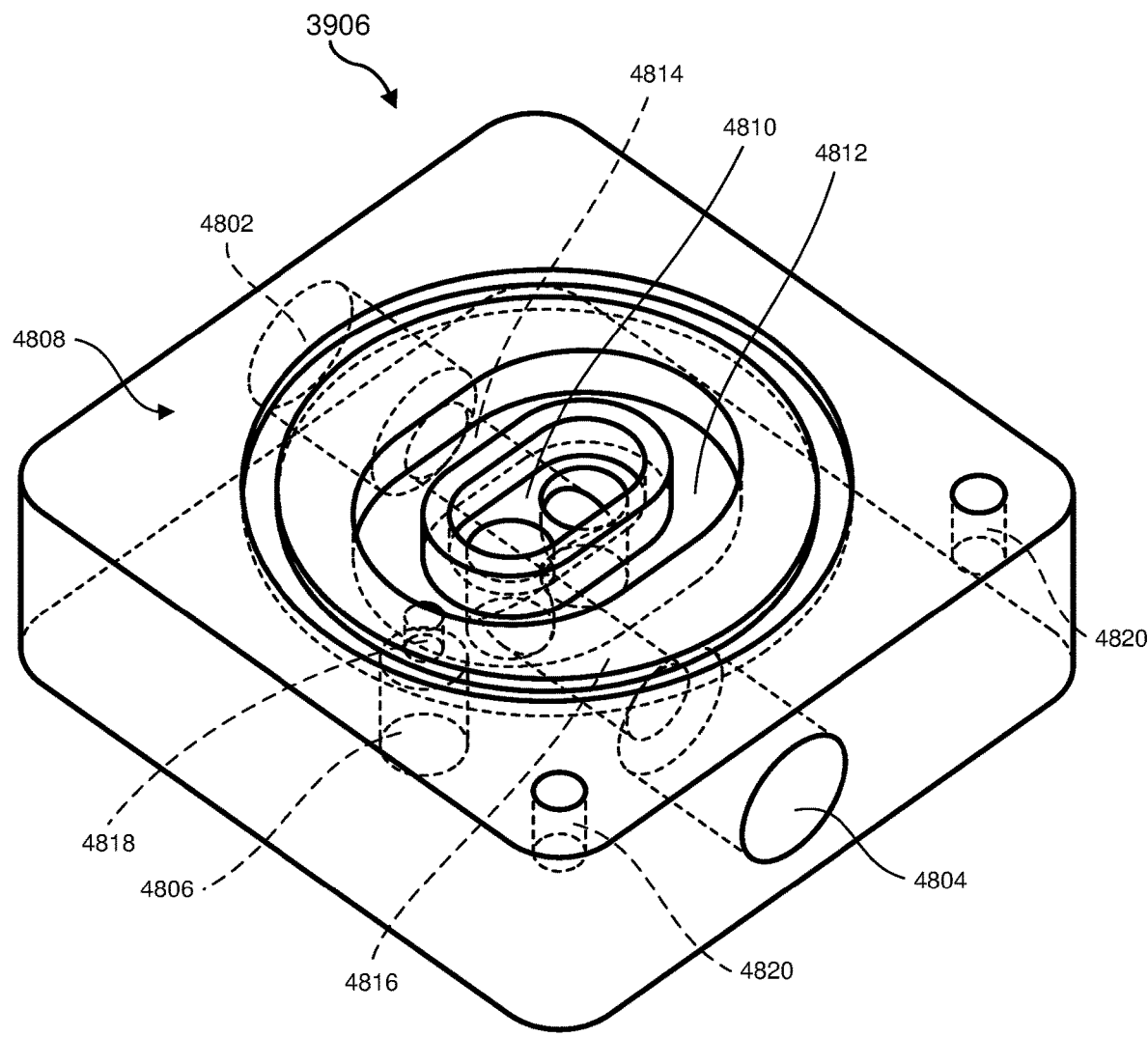
FIG. 48 is a partially transparent perspective view of an exemplary layer of the fluidic-valve device of FIG. 39, according to at least one embodiment of the present disclosure.

As shown in FIGS. 46A and 46B, piston 4400 may include restricting gate transmission element 4602 for restricting gate fluid channel 4010, a restricting gate transmission element 4604 for restricting a gate fluid channel 4810 (as shown in FIG. 48), controlling gate transmission elements 4606 and 4608 for interfacing with a fluid pressure applied to controlling gate terminal 4012, and controlling gate transmission elements 4610 and 4612 for interfacing with a fluid pressure applied to controlling gate terminal 4812 (as shown in FIG. 48). In this example, restricting gate transmission element 4602, restricting gate transmission element 4604, controlling gate transmission element 4606, and controlling gate transmission element 4608 may be connected by a rigid connection member 4614. In this example, restricting gate transmission element 4602 may be shaped to substantially fit within the walls of gate fluid channel 4010, and restricting gate transmission element 4604 may be shaped to substantially fit within the walls of gate fluid channel 4810. In other embodiments, restricting gate transmission element 4602, gate fluid channel 4010, restricting gate transmission element 4604, and gate fluid channel 4810 may have other compatible shapes and configurations. In some embodiments, controlling gate transmission elements 4606 and 4608 may be sized and shaped to substantially fit within the walls of controlling gate terminal 4012, and controlling gate transmission elements 4610 and 4612 may be sized and shaped to substantially fit within the walls of controlling gate terminal 4812. As shown, the surface areas of controlling gate transmission elements 4606 and 4608 may be greater than the surface areas of controlling gate transmission elements 4610 and 4612.

Figure 47A:
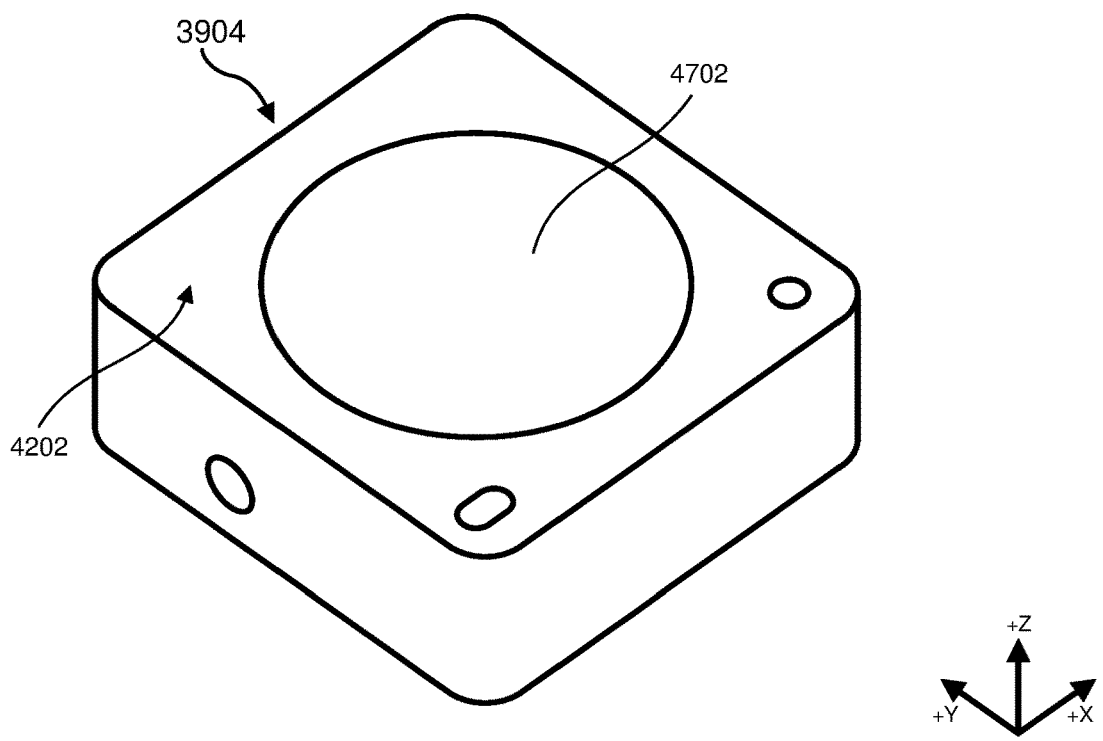
FIG. 47A is a perspective view of the exemplary layer of FIG. 42 with an exemplary membrane, according to at least one embodiment of the present disclosure.
Figure 47B:
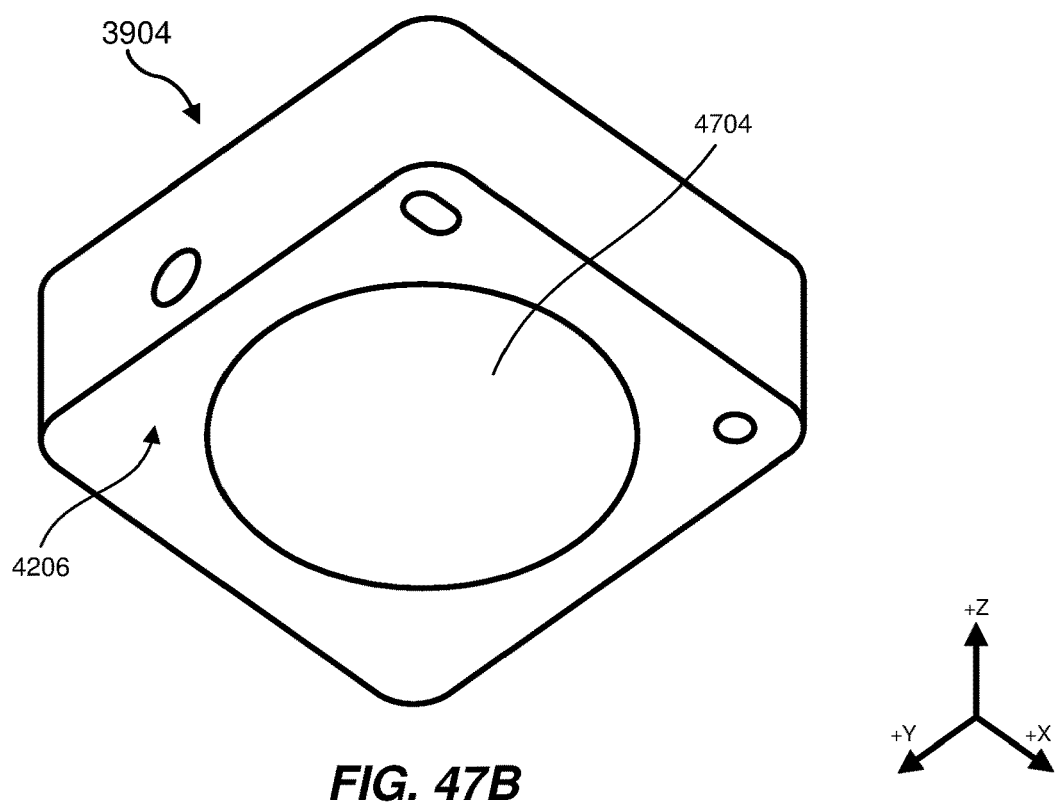
FIG. 47B is a perspective view of the exemplary layer of FIG. 42 with another exemplary membrane, according to at least one embodiment of the present disclosure.

In some examples, piston 4400 may have a thickness substantially equal to the thickness of layer 3904. As shown in FIG. 47A, a flexible seal or membrane 4702 may be configured to provide a fluid barrier between piston-chamber opening 4204 and gate fluid channel 4010 and controlling gate terminal 4012. Membrane 4702 may also supply a downward force to piston 4400 when stretched. As shown in FIG. 47B, a flexible seal or membrane 4704 may be configured to provide a fluid barrier between controlling-gate-terminal opening 4302, controlling-gate-terminal opening 4304, and restricting-gate-terminal opening 4306 and gate fluid channel 4810 and controlling gate terminal 4812. Membrane 4704 may also supply an upward force to piston 4400 when stretched.

As shown in FIG. 48, layer 3906 may include an inlet port 4802, an outlet port 4804, and a control port 4806. Layer 3906 may also include a top face 4808 having a gate fluid channel 4810 and a controlling gate terminal 4812. In this example, a fluid channel 4814 may connect inlet port 4802 with gate fluid channel 4810, a fluid channel 4816 may connect outlet port 4804 with gate fluid channel 4810, and a fluid channel 4818 may connect control port 4806 with controlling gate terminal 4812. As shown in FIGS. 48, layer 3906 may further include one or more alignment openings 4820 configured to accept alignment pins for maintaining alignment of layers 3902-3906.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 4900 in FIG. 49. Other artificial reality systems may include a NED that also provides visibility into the real world (e.g., augmented-reality system 5000 in FIG. 50) or that visually immerses a user in an artificial reality (e.g., virtual-reality system 5100 in FIG. 51). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 49:
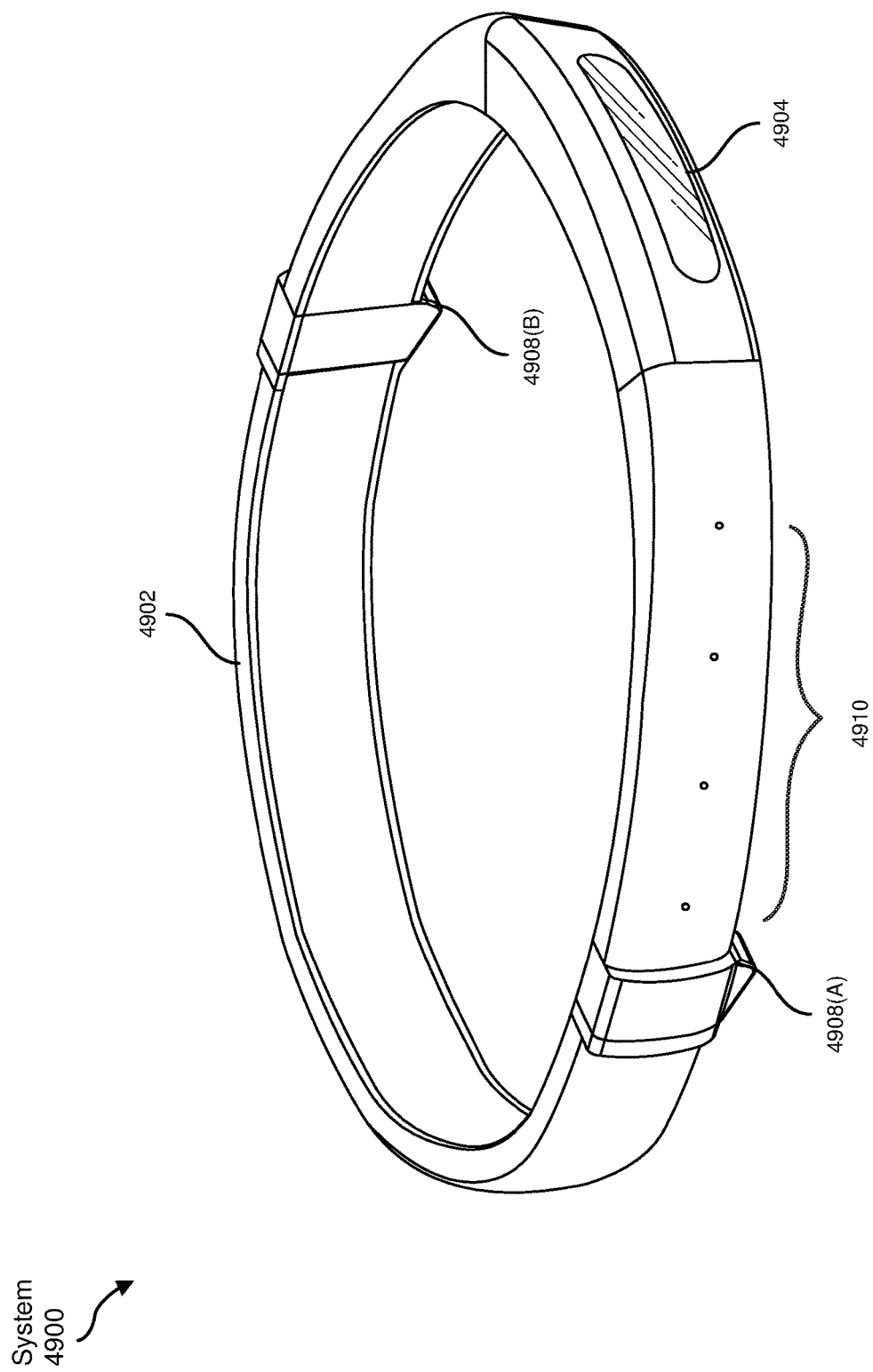
FIG. 49 is an illustration of an exemplary artificial-reality headband that may be used in connection with embodiments of this disclosure.

Turning to FIG. 49, augmented-reality system 4900 generally represents a wearable device dimensioned to fit about a body part (e.g., a head) of a user. As shown in FIG. 49, system 4900 may include a frame 4902 and a camera assembly 4904 that is coupled to frame 4902 and configured to gather information about a local environment by observing the local environment. Augmented-reality system 4900 may also include one or more audio devices, such as output audio transducers 4908(A) and 4908(B) and input audio transducers 4910. Output audio transducers 4908(A) and 4908(B) may provide audio feedback and/or content to a user, and input audio transducers 4910 may capture audio in a user's environment.

As shown, augmented-reality system 4900 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 4900 may not include a NED, augmented-reality system 4900 may include other types of screens or visual feedback devices (e.g., a display screen integrated into a side of frame 4902).

Figure 50:
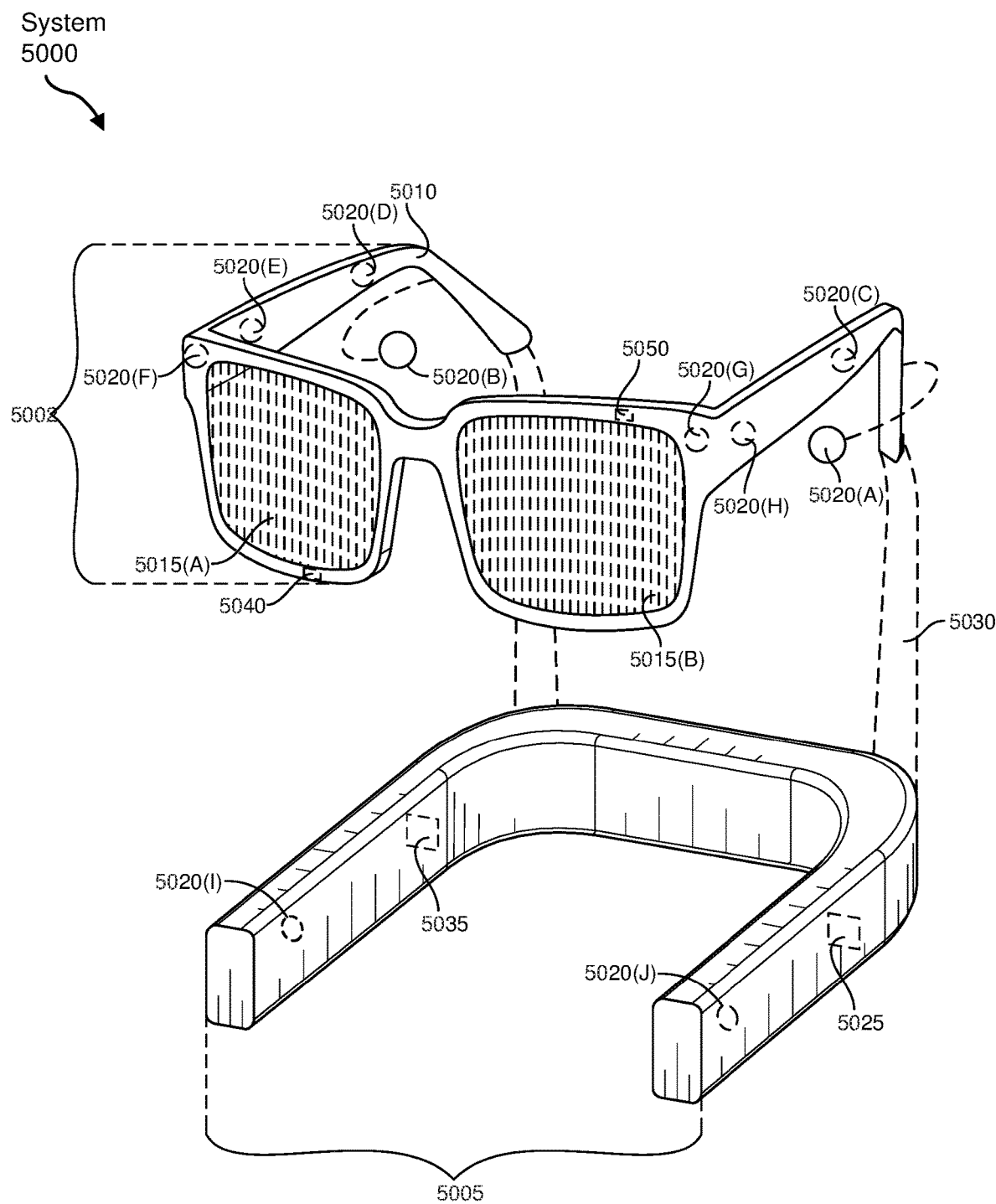
FIG. 50 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 50, augmented-reality system 5000 may include an eyewear device 5002 with a frame 5010 configured to hold a left display device 5015(A) and a right display device 5015(B) in front of a user's eyes. Display devices 5015(A) and 5015(B) may act together or independently to present an image or series of images to a user. While augmented-reality system 5000 includes two displays, embodiments of this disclosure may be implemented in augmented-reality systems with a single NED or more than two NEDs.

In some embodiments, augmented-reality system 5000 may include one or more sensors, such as sensor 5040. Sensor 5040 may generate measurement signals in response to motion of augmented-reality system 5000 and may be located on substantially any portion of frame 5010. Sensor 5040 may represent a position sensor, an inertial measurement unit (IMU), a depth camera assembly, or any combination thereof. In some embodiments, augmented-reality system 5000 may or may not include sensor 5040 or may include more than one sensor. In embodiments in which sensor 5040 includes an IMU, the IMU may generate calibration data based on measurement signals from sensor 5040. Examples of sensor 5040 may include, without limitation, accelerometers, gyroscopes, magnetometers, other suitable types of sensors that detect motion, sensors used for error correction of the IMU, or some combination thereof.

Augmented-reality system 5000 may also include a microphone array with a plurality of acoustic transducers 5020(A)-5020(J), referred to collectively as acoustic transducers 5020. Acoustic transducers 5020 may be transducers that detect air pressure variations induced by sound waves. Each acoustic transducer 5020 may be configured to detect sound and convert the detected sound into an electronic format (e.g., an analog or digital format). The microphone array in FIG. 2 may include, for example, ten acoustic transducers: 5020(A) and 5020(B), which may be designed to be placed inside a corresponding ear of the user, acoustic transducers 5020(C), 5020(D), 5020(E), 5020(F), 5020(G), and 5020(H), which may be positioned at various locations on frame 5010, and/or acoustic transducers 5020(I) and 5020(J), which may be positioned on a corresponding neckband 5005.

In some embodiments, one or more of acoustic transducers 5020(A)-(F) may be used as output transducers (e.g., speakers). For example, acoustic transducers 5020(A) and/or 5020(B) may be earbuds or any other suitable type of headphone or speaker.

The configuration of acoustic transducers 5020 of the microphone array may vary. While augmented-reality system 5000 is shown in FIG. 50 as having ten acoustic transducers 5020, the number of acoustic transducers 5020 may be greater or less than ten. In some embodiments, using higher numbers of acoustic transducers 5020 may increase the amount of audio information collected and/or the sensitivity and accuracy of the audio information. In contrast, using a lower number of acoustic transducers 5020 may decrease the computing power required by the controller 5050 to process the collected audio information. In addition, the position of each acoustic transducer 5020 of the microphone array may vary. For example, the position of an acoustic transducer 5020 may include a defined position on the user, a defined coordinate on frame 5010, an orientation associated with each acoustic transducer, or some combination thereof.

Acoustic transducers 5020(A) and 5020(B) may be positioned on different parts of the user's ear, such as behind the pinna or within the auricle or fossa. Or, there may be additional acoustic transducers on or surrounding the ear in addition to acoustic transducers 5020 inside the ear canal. Having an acoustic transducer positioned next to an ear canal of a user may enable the microphone array to collect information on how sounds arrive at the ear canal. By positioning at least two of acoustic transducers 5020 on either side of a user's head (e.g., as binaural microphones), augmented-reality device 5000 may simulate binaural hearing and capture a 3D stereo sound field around about a user's head. In some embodiments, acoustic transducers 5020(A) and 5020(B) may be connected to augmented-reality system 5000 via a wired connection 5030, and in other embodiments, acoustic transducers 5020(A) and 5020(B) may be connected to augmented-reality system 5000 via a wireless connection (e.g., a Bluetooth connection). In still other embodiments, acoustic transducers 5020(A) and 5020(B) may not be used at all in conjunction with augmented-reality system 5000.

Acoustic transducers 5020 on frame 5010 may be positioned along the length of the temples, across the bridge, above or below display devices 5015(A) and 5015(B), or some combination thereof. Acoustic transducers 5020 may be oriented such that the microphone array is able to detect sounds in a wide range of directions surrounding the user wearing the augmented-reality system 5000. In some embodiments, an optimization process may be performed during manufacturing of augmented-reality system 5000 to determine relative positioning of each acoustic transducer 5020 in the microphone array.

In some examples, augmented-reality system 5000 may include or be connected to an external device (e.g., a paired device), such as neckband 5005. Neckband 5005 generally represents any type or form of paired device. Thus, the following discussion of neckband 5005 may also apply to various other paired devices, such as charging cases, smart watches, smart phones, wrist bands, other wearable devices, hand-held controllers, tablet computers, laptop computers and other external compute devices, etc.

As shown, neckband 5005 may be coupled to eyewear device 5002 via one or more connectors. The connectors may be wired or wireless and may include electrical and/or non-electrical (e.g., structural) components. In some cases, eyewear device 5002 and neckband 5005 may operate independently without any wired or wireless connection between them. While FIG. 50 illustrates the components of eyewear device 5002 and neckband 5005 in example locations on eyewear device 5002 and neckband 5005, the components may be located elsewhere and/or distributed differently on eyewear device 5002 and/or neckband 5005. In some embodiments, the components of eyewear device 5002 and neckband 5005 may be located on one or more additional peripheral devices paired with eyewear device 5002, neckband 5005, or some combination thereof. Furthermore, Pairing external devices, such as neckband 5005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 5000 may be provided by a paired device or shared between a paired device and an eyewear device, thus reducing the weight, heat profile, and form factor of the eyewear device overall while still retaining desired functionality. For example, neckband 5005 may allow components that would otherwise be included on an eyewear device to be included in neckband 5005 since users may tolerate a heavier weight load on their shoulders than they would tolerate on their heads. Neckband 5005 may also have a larger surface area over which to diffuse and disperse heat to the ambient environment. Thus, neckband 5005 may allow for greater battery and computation capacity than might otherwise have been possible on a stand-alone eyewear device. Since weight carried in neckband 5005 may be less invasive to a user than weight carried in eyewear device 5002, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 5005 may be communicatively coupled with eyewear device 5002 and/or to other devices. These other devices may provide certain functions (e.g., tracking, localizing, depth mapping, processing, storage, etc.) to augmented-reality system 5000. In the embodiment of FIG. 50, neckband 5005 may include two acoustic transducers (e.g., 5020(I) and 5020(J)) that are part of the microphone array (or potentially form their own microphone subarray). Neckband 5005 may also include a controller 5025 and a power source 5035.

Acoustic transducers 5020(I) and 5020(J) of neckband 5005 may be configured to detect sound and convert the detected sound into an electronic format (analog or digital). In the embodiment of FIG. 50, acoustic transducers 5020(I) and 5020(J) may be positioned on neckband 5005, thereby increasing the distance between the neckband acoustic transducers 5020(I) and 5020(J) and other acoustic transducers 5020 positioned on eyewear device 5002. In some cases, increasing the distance between acoustic transducers 5020 of the microphone array may improve the accuracy of beamforming performed via the microphone array. For example, if a sound is detected by acoustic transducers 5020(C) and 5020(D) and the distance between acoustic transducers 5020(C) and 5020(D) is greater than, e.g., the distance between acoustic transducers 5020(D) and 5020(E), the determined source location of the detected sound may be more accurate than if the sound had been detected by acoustic transducers 5020(D) and 5020(E).

Controller 5025 of neckband 5005 may process information generated by the sensors on 5005 and/or augmented-reality system 5000. For example, controller 5025 may process information from the microphone array that describes sounds detected by the microphone array. For each detected sound, controller 5025 may perform a direction-of-arrival (DOA) estimation to estimate a direction from which the detected sound arrived at the microphone array. As the microphone array detects sounds, controller 5025 may populate an audio data set with the information. In embodiments in which augmented-reality system 5000 includes an inertial measurement unit, controller 5025 may compute all inertial and spatial calculations from the IMU located on eyewear device 5002. A connector may convey information between augmented-reality system 5000 and neckband 5005 and between augmented-reality system 5000 and controller 5025. The information may be in the form of optical data, electrical data, wireless data, or any other transmittable data form. Moving the processing of information generated by augmented-reality system 5000 to neckband 5005 may reduce weight and heat in eyewear device 5002, making it more comfortable to the user.

Power source 5035 in neckband 5005 may provide power to eyewear device 5002 and/or to neckband 5005. Power source 5035 may include, without limitation, lithium ion batteries, lithium-polymer batteries, primary lithium batteries, alkaline batteries, or any other form of power storage. In some cases, power source 5035 may be a wired power source. Including power source 5035 on neckband 5005 instead of on eyewear device 5002 may help better distribute the weight and heat generated by power source 5035.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 5100 in FIG. 51, that mostly or completely covers a user's field of view. Virtual-reality system 5100 may include a front rigid body 5102 and a band 5104 shaped to fit around a user's head. Virtual-reality system 5100 may also include output audio transducers 5106(A) and 5106(B). Furthermore, while not shown in FIG. 51, front rigid body 5102 may include one or more electronic elements, including one or more electronic displays, one or more inertial measurement units (IMUs), one or more tracking emitters or detectors, and/or any other suitable device or system for creating an artificial reality experience.

Artificial reality systems may include a variety of types of visual feedback mechanisms. For example, display devices in augmented-reality system 5100 and/or virtual-reality system 5100 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 5000 and/or virtual-reality system 5100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 4900, augmented-reality system 5000, and/or virtual-reality system 5100 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 49 and 51, output audio transducers 4908(A), 4908(B), 5106(A), and 5106(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 4910 may include condenser microphones, dynamic microphones, ribbon microphones, and/or any other type or form of input transducer. In some embodiments, a single transducer may be used for both audio input and audio output.

Figure 51:
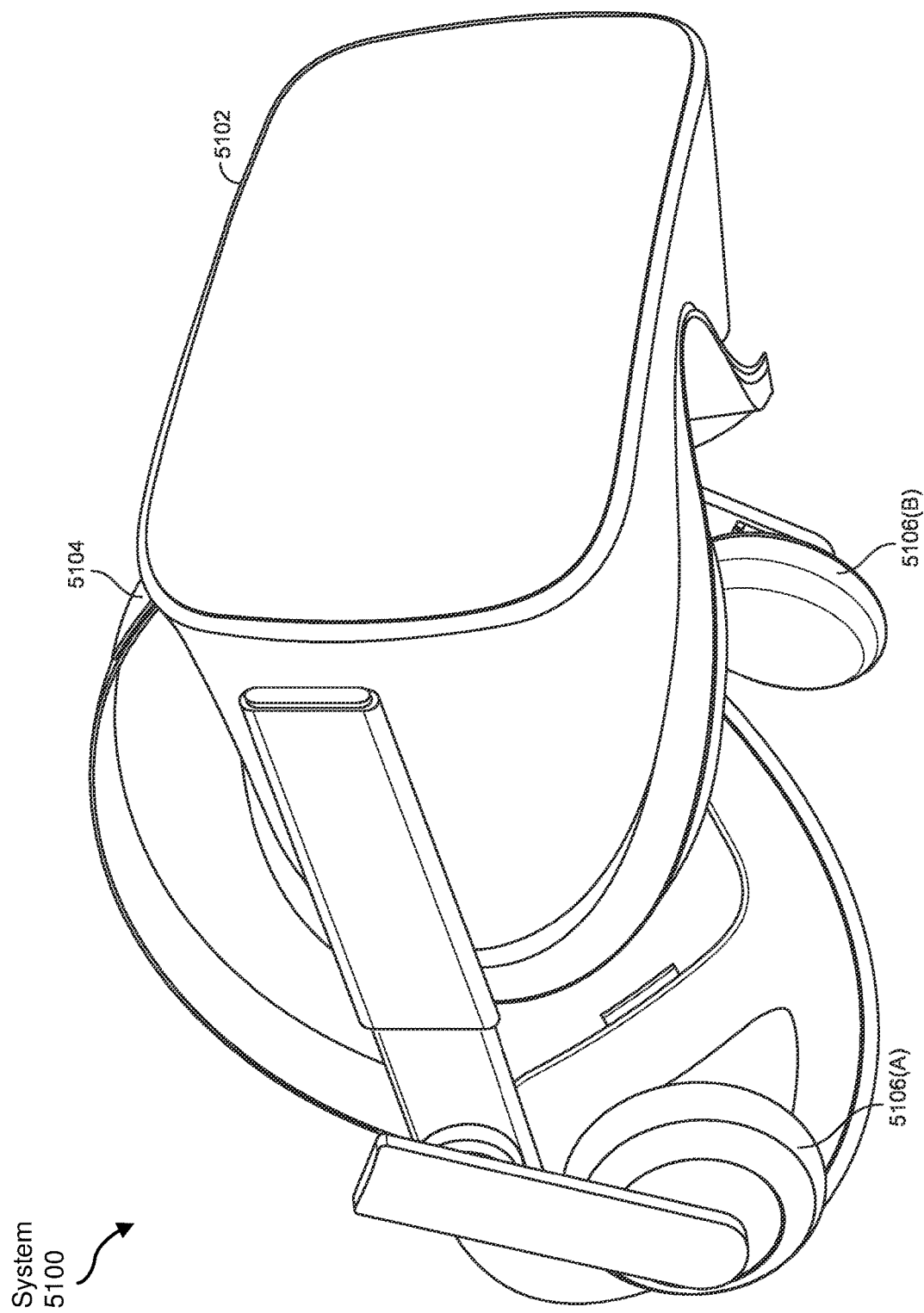
FIG. 51 is an illustration of an exemplary virtual-reality headset that may be used in connection with embodiments of this disclosure.

While not shown in FIGS. 49-51, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 4900, 5000, and 5100 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 52:
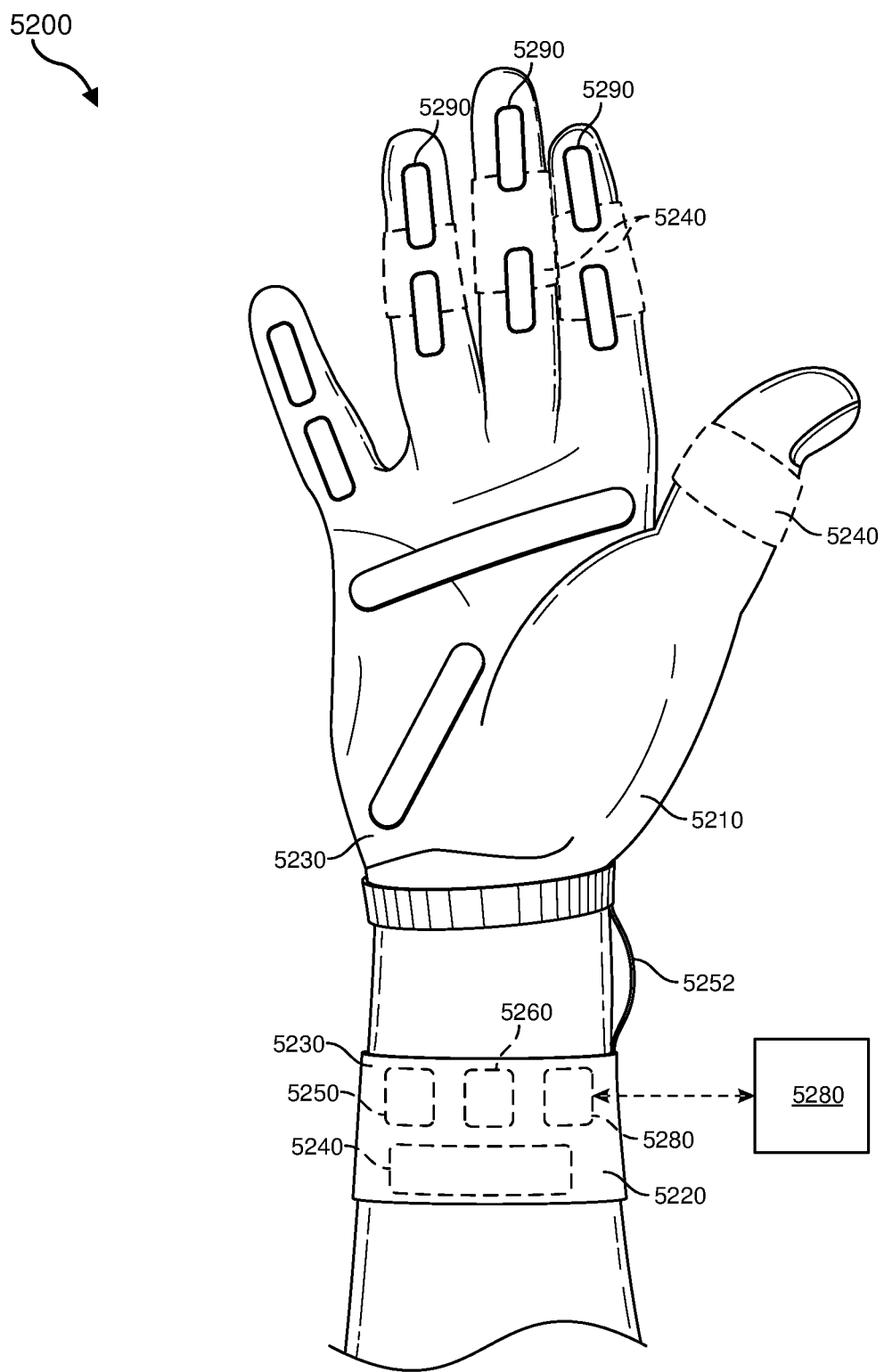
FIG. 52 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 52 illustrates a vibrotactile system 5200 in the form of a wearable glove (haptic device 5210) and wristband (haptic device 5220). Haptic device 5210 and haptic device 5220 are shown as examples of wearable devices that include a flexible, wearable textile material 5230 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 5240 may be positioned at least partially within one or more corresponding pockets formed in textile material 5230 of vibrotactile system 5200. Vibrotactile devices 5240 may be positioned in locations to provide a vibrating sensation (e.g., haptic feedback) to a user of vibrotactile system 5200. For example, vibrotactile devices 5240 may be positioned to be against the user's finger(s), thumb, or wrist, as shown in FIG. 52. Vibrotactile devices 5240 may, in some examples, be sufficiently flexible to conform to or bend with the user's corresponding body part(s).

A power source 5250 (e.g., a battery) for applying a voltage to the vibrotactile devices 5240 for activation thereof may be electrically coupled to vibrotactile devices 5240, such as via conductive wiring 5252. In some examples, each of vibrotactile devices 5240 may be independently electrically coupled to power source 5250 for individual activation. In some embodiments, a processor 5260 may be operatively coupled to power source 5250 and configured (e.g., programmed) to control activation of vibrotactile devices 5240.

Vibrotactile system 5200 may be implemented in a variety of ways. In some examples, vibrotactile system 5200 may be a standalone system with integral subsystems and components for operation independent of other devices and systems. As another example, vibrotactile system 5200 may be configured for interaction with another device or system 5270. For example, vibrotactile system 5200 may, in some examples, include a communications interface 5280 for receiving and/or sending signals to the other device or system 5270. The other device or system 5270 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 5280 may enable communications between vibrotactile system 5200 and the other device or system 5270 via a wireless (e.g., Wi-Fi, Bluetooth, cellular, radio, etc.) link or a wired link. If present, communications interface 5280 may be in communication with processor 5260, such as to provide a signal to processor 5260 to activate or deactivate one or more of the vibrotactile devices 5240.

Vibrotactile system 5200 may optionally include other subsystems and components, such as touch-sensitive pads 5290, pressure sensors, motion sensors, position sensors, lighting elements, and/or user interface elements (e.g., an on/off button, a vibration control element, etc.). During use, vibrotactile devices 5240 may be configured to be activated for a variety of different reasons, such as in response to the user's interaction with user interface elements, a signal from the motion or position sensors, a signal from the touch-sensitive pads 5290, a signal from the pressure sensors, a signal from the other device or system 5270, etc.

Although power source 5250, processor 5260, and communications interface 5280 are illustrated in FIG. 52 as being positioned in haptic device 5220, the present disclosure is not so limited. For example, one or more of power source 5250, processor 5260, or communications interface 5280 may be positioned within haptic device 5210 or within another wearable textile.

Figure 53:
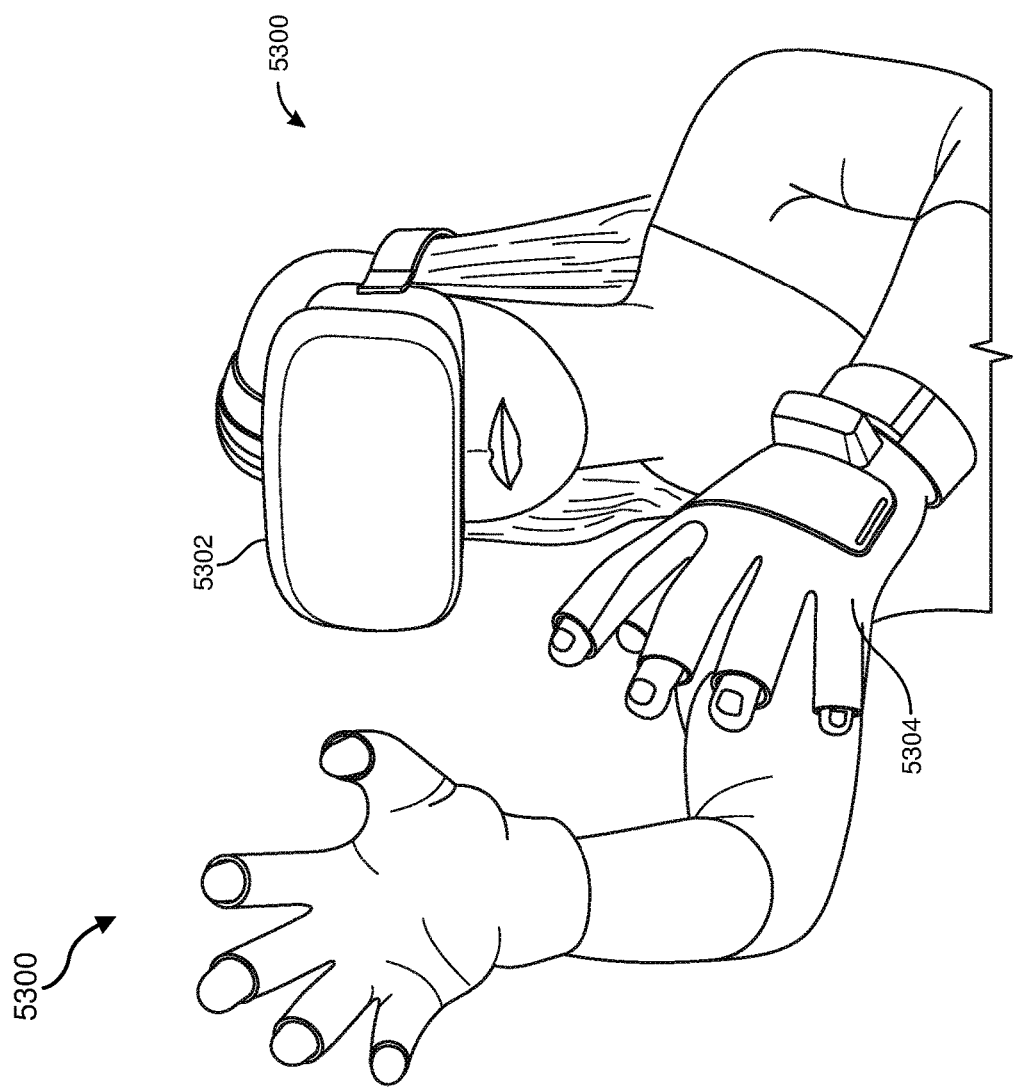
FIG. 53 is an illustration of an exemplary virtual-reality environment according to embodiments of this disclosure.

Haptic wearables, such as those shown in and described in connection with FIG. 52, may be implemented in a variety of types of artificial-reality systems and environments. FIG. 53 shows an example artificial reality environment 5300 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 5302 generally represents any type or form of virtual-reality system, such as virtual-reality system 5100 in FIG. 51. Haptic device 5304 generally represents any type or form of wearable device, worn by a use of an artificial reality system, that provides haptic feedback to the user to give the user the perception that he or she is physically engaging with a virtual object. In some embodiments, haptic device 5304 may provide haptic feedback by applying vibration, motion, and/or force to the user. For example, haptic device 5304 may limit or augment a user's movement. To give a specific example, haptic device 5304 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 5304 to send action requests to a console. Examples of action requests include, without limitation, requests to start an application and/or end the application and/or requests to perform a particular action within the application.

Figure 54:
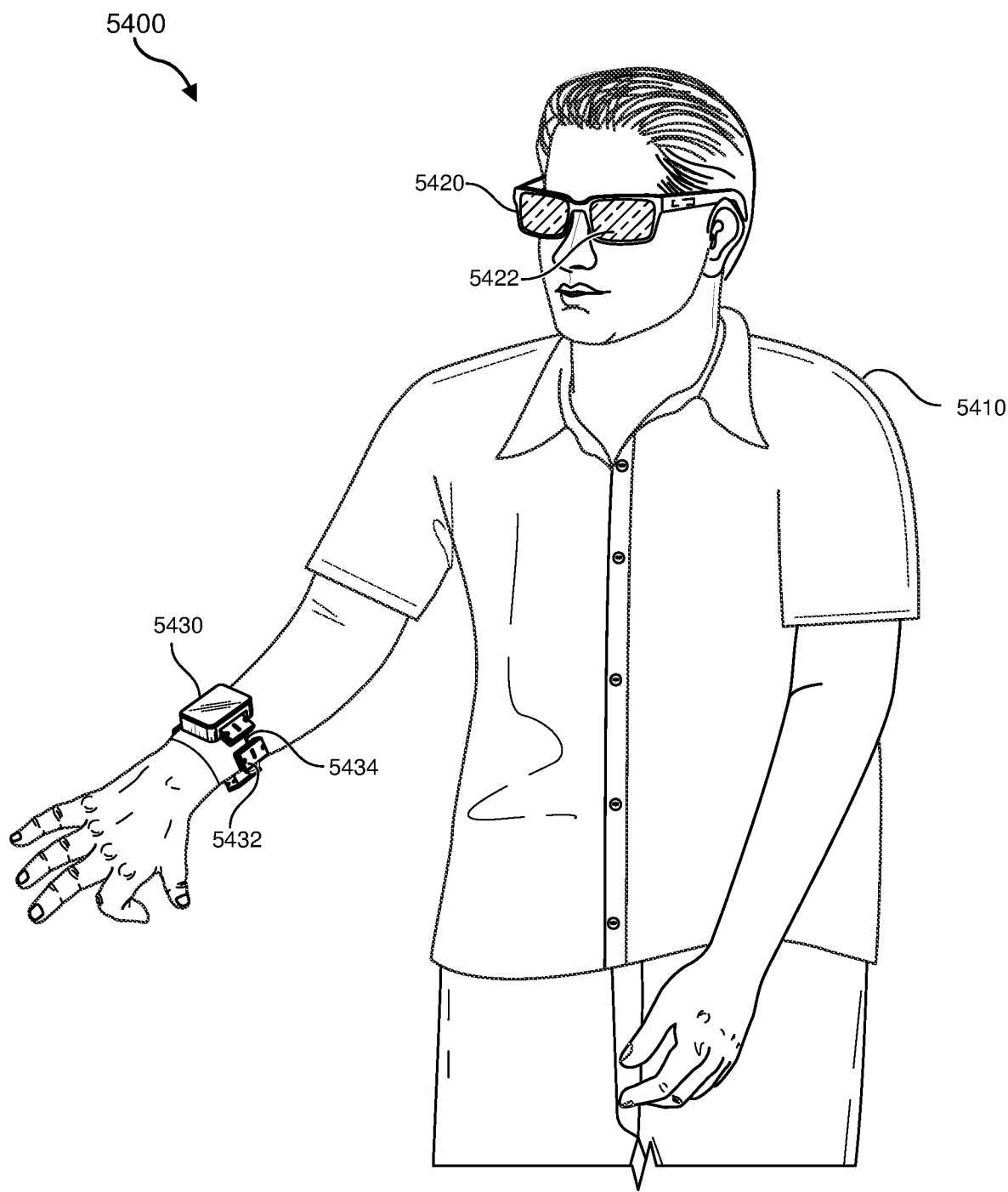
FIG. 54 is an illustration of an exemplary augmented-reality environment according to embodiments of this disclosure.

While haptic interfaces may be used with virtual-reality systems, as shown in FIG. 53, haptic interfaces may also be used with augmented-reality systems, as shown in FIG. 54. FIG. 54 is a perspective view a user 5410 interacting with an augmented-reality system 5400. In this example, user 5410 may wear a pair of augmented-reality glasses 5420 that have one or more displays 5422 and that are paired with a haptic device 5430. Haptic device 5430 may be a wristband that includes a plurality of band elements 5432 and a tensioning mechanism 5434 that connects band elements 5432 to one another.

One or more of band elements 5432 may include any type or form of actuator suitable for providing haptic feedback. For example, one or more of band elements 5432 may be configured to provide one or more of various types of cutaneous feedback, including vibration, force, traction, texture, and/or temperature. To provide such feedback, band elements 5432 may include one or more of various types of actuators. In one example, each of band elements 5432 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 5210, 5220, 5304, and 5430 may include any suitable number and/or type of haptic transducer, sensor, and/or feedback mechanism. For example, haptic devices 5210, 5220, 5304, and 5430 may include one or more mechanical transducers, piezoelectric transducers, and/or fluidic transducers. Haptic devices 5210, 5220, 5304, and 5430 may also include various combinations of different types and forms of transducers that work together or independently to enhance a user's artificial-reality experience. In one example, each of band elements 5432 of haptic device 5430 may include a vibrotactor (e.g., a vibrotactile actuator) configured to vibrate in unison or independently to provide one or more of various types of haptic sensations to a user.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure. By way of example and not limitation, some embodiments of the present disclosure include the following:

Example 1: A fluidic valve that includes an inlet port, a control port, an outlet port, a fluid channel configured to convey fluid from the inlet port to the outlet port, and a piston. The piston may include (1) a restricting gate transmission element configured to block, when the piston is in a first position, the fluid channel and unblock, when the piston is in a second position, the fluid channel, (2) a first controlling gate transmission element configured to interface with a first control pressure from the control port that, when applied to the first controlling gate transmission element, forces the piston towards the first position, and (3) a second controlling gate transmission element configured to interface with a second control pressure that, when applied to the second controlling gate transmission element, forces the piston towards the second position.

Example 2: The fluidic valve of Example 1 further including an additional inlet port and an additional fluid channel configured to convey fluid from the additional inlet port to the outlet port. Additionally, the piston may further include an additional restricting gate transmission element configured to block, when the piston is in the second position, the additional fluid channel and unblock, when the piston is in the first position, the additional fluid channel.

Example 3: The fluidic valve of Example 1, wherein the piston may be formed from a single piece of a substantially rigid material.

Example 4: The fluidic valve of Example 1, wherein a surface area of the first controlling gate transmission element may be greater than a surface area of the second controlling gate transmission element.

Example 5: A fluidic valve that includes a first inlet port, a second inlet port, a first control port, a second control port, an outlet port, a first fluid channel configured to convey fluid from the first inlet port to the outlet port, a second fluid channel configured to convey fluid from the second inlet port to the outlet port, and a piston. The piston may include (1) a first restricting gate transmission element configured to block, when the piston is in a first position, the first fluid channel and unblock, when the piston is in a second position, the first fluid channel, (2) a second restricting gate transmission element configured to block, when the piston is in the second position, the second fluid channel and unblock, when the piston is in the first position, the second fluid channel, (3) a first controlling gate transmission element configured to interface with a first control pressure from the first control port that, when applied to the first controlling gate transmission element, forces the piston towards the first position, and (4) a second controlling gate transmission element configured to interface with a second control pressure from the second control port that, when applied to the second controlling gate transmission element, forces the piston towards the second position.

Example 6: The fluidic valve of Example 5, wherein the piston may be formed from a single piece of a substantially rigid material.

Example 7: The fluidic valve of Example 5, wherein a surface area of the first controlling gate transmission element may be greater than a surface area of the second controlling gate transmission element.

Example 8: The fluidic valve of Example 5 further including a first one or more additional control ports and a second one or more additional control ports, and the piston may further include (1) a first one or more additional controlling gate transmission elements configured to respectively interface with a first one or more additional control pressures from a respective one of the first one or more additional control ports and (2) a second one or more additional controlling gate transmission elements configured to respectively interface with a second one or more additional control pressures from a respective one of the second one or more additional control ports. In some examples, each of the first one or more additional control pressures may, when applied to a respective one of the first one or more additional controlling gate transmission elements, force the piston towards the first position. Similarly, each of the second one or more additional control pressures may, when applied to a respective one of the second one or more additional controlling gate transmission elements, force the piston towards the second position.

Example 9: The fluidic valve of Example 5 further including a first substantially rigid layer, a second substantially rigid layer, and a third substantially rigid layer. In some examples, the first substantially rigid layer may include (1) the first inlet port, (2) the first control port, (3) a face that includes (a) a first controlling gate terminal, (b) a first restricting gate terminal, and (c) a first passthrough opening, (4) a third fluid channel connecting the first control port to the first controlling gate terminal, (5) a fourth fluid channel connecting the first inlet port to the first restricting gate terminal, and (6) a fifth fluid channel connecting the first restricting gate terminal to the first passthrough opening. In some examples, the second substantially rigid layer may be configured to house the piston and may include (1) a bottom face that is coupled to the face of the first substantially rigid layer and that includes (a) a first controlling-gate-terminal opening aligned with the first controlling gate terminal and exposing the first controlling gate transmission element of the piston, (b) a first restricting-gate-terminal opening aligned with the first restricting gate terminal and exposing the first restricting gate transmission element of the piston, and (c) a second passthrough opening aligned with the first passthrough opening, (2) a top face that includes (a) a second controlling-gate-terminal opening exposing the second controlling gate transmission element, (b) a second restricting-gate-terminal opening exposing the second restricting gate transmission element, and (c) a third passthrough opening, and (3) a sixth fluid channel connecting the second passthrough opening to the third passthrough opening. Furthermore, the third substantially rigid layer may include (1) the second inlet port, (2) the second control port, (3) the outlet port, (4) a face that is coupled to the top face of the second substantially rigid layer and that includes (a) a second controlling gate terminal aligned with the second controlling-gate-terminal opening, (b) a second restricting gate terminal aligned with the second restricting-gate-terminal opening, and (c) a fourth passthrough opening aligned with the third passthrough opening, (5) a seventh fluid channel connecting the second control port to the second controlling gate terminal, (6) an eighth fluid channel connecting the second inlet port to the second restricting gate terminal, and (7) a ninth fluid channel connecting the second restricting gate terminal to the fourth passthrough opening and the outlet port.

Example 10: The fluidic valve of Example 5 further including (1) a first substantially pliable seal sandwiched between the face of the first substantially rigid layer and the bottom face of the second substantially rigid layer that includes a first hole allowing fluid to pass from the first passthrough opening to the second passthrough opening and (2) a second substantially pliable seal sandwiched between the top face of the second substantially rigid layer and the face of the third substantially rigid layer that includes a second hole allowing fluid to pass from the third passthrough opening to the fourth passthrough opening.

Example 11: A fluidic system that includes a plurality of fluid-pressure sources, a fluid-pressure load, and a fluidic valve. In some embodiments, the fluidic valve may include a first inlet port, a second inlet port, a first control port, a second control port, an outlet port coupled to the fluid-pressure load, a first fluid channel configured to convey fluid from the first inlet port to the outlet port, a second fluid channel configured to convey fluid from the second inlet port to the outlet port, and a piston. In some examples, the piston may include (1) a first restricting gate transmission element configured to block, when the piston is in a first position, the first fluid channel and unblock, when the piston is in a second position, the first fluid channel, (2) a second restricting gate transmission element configured to block, when the piston is in the second position, the second fluid channel and unblock, when the piston is in the first position, the second fluid channel, (3) a first controlling gate transmission element configured to interface with a first control pressure from the first control port that, when applied to the first controlling gate transmission element, forces the piston towards the first position, and (4) a second controlling gate transmission element configured to interface with a second control pressure from the second control port that, when applied to the second controlling gate transmission element, forces the piston towards the second position. In various embodiments, at least one of the first inlet port, the second inlet port, the first control port, and the second control port are coupled to one of the plurality of fluid-pressure sources.

Example 12: The fluidic system of Example 11, wherein a surface area of the first controlling gate transmission element may be greater than a surface area of the second controlling gate transmission element.

Example 13: The fluidic system of Example 12, wherein the fluidic valve may be configured as a normally open valve, the second inlet port may be blocked, and the plurality of fluid-pressure sources may include an input pressure source coupled to the first inlet port, a gate pressure source coupled to the first control port, and a high-pressure source coupled to the second control port.

Example 14: The fluidic system of Example 12, wherein the fluidic valve may be configured as a normally closed valve, the first inlet port may be blocked, and the plurality of fluid-pressure sources may include an input pressure source coupled to the second inlet port, a gate pressure source coupled to the first control port, and a high-pressure source coupled to the second control port.

Example 15: The fluidic system of Example 12, wherein the fluidic valve may be configured as a binary inverter, and the plurality of fluid-pressure sources may include an input pressure source coupled to the first control port, a high-pressure source coupled to the first inlet port and the second control port, and a low-pressure source coupled to the second inlet port.

Example 16: The fluidic system of Example 12, wherein the fluidic valve may be configured as a three-way valve, and the plurality of fluid-pressure sources may include a first fluid source coupled to the first inlet port, a second fluid source coupled to the second inlet port, a control pressure source coupled to the first control port, and a high-pressure source coupled to the second control port.

Example 17: The fluidic system of Example 11, wherein the fluidic valve may perform a binary logic operation and may further include a third control port and a fourth control port. In such examples, the piston may further include a third controlling gate transmission element configured to interface with a third control pressure from the third control port that, when applied to the third controlling gate transmission element, forces the piston towards the second position and a fourth controlling gate transmission element configured to interface with a fourth control pressure from the fourth control port that, when applied to the fourth controlling gate transmission element, forces the piston towards the second position. In some examples, the plurality of fluid-pressure sources may include a high-pressure source coupled to the first control port, a first input pressure source coupled to the second control port, a second input pressure source coupled to the third control port, and a third input pressure source coupled to the fourth control port.

Example 18: The fluidic system of Example 17, wherein the fluidic valve may be configured to perform, as part of a full adder, a carry operation.

Example 19: The fluidic system of Example 17, wherein the fluidic valve may be configured to perform, as part of a full adder, a sum operation.

Example 20: The fluidic system of Example 11, wherein the fluidic valve may be configured to perform a pressure adding operation and/or a pressure subtracting operation and may further include a third control port, a fourth control port, and a fifth control port. In such examples, the piston may further include a third controlling gate transmission element configured to interface with a third control pressure from the third control port that when applied to the third controlling gate transmission element, forces the piston towards the first position, a fourth controlling gate transmission element configured to interface with a fourth control pressure from the fourth control port that, when applied to the fourth controlling gate transmission element, forces the piston towards the second position, and a fifth controlling gate transmission element configured to interface with a fifth control pressure from the fifth control port that, when applied to the fifth controlling gate transmission element, forces the piston towards the second position. Additionally, the plurality of fluid-pressure sources may include a high-pressure source coupled to the first inlet port, a low-pressure source coupled to the second inlet port, a first input pressure source coupled to the second control port, a second input pressure source coupled to the third control port, a third input pressure source coupled to the fourth control port, and a fourth input pressure source coupled to the fifth control port. Moreover, the outlet port may be coupled to the first control port.

Embodiments of the instant disclosure may include or be implemented in conjunction with an artificial reality system. Artificial reality is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A fluidic valve comprising:
a first inlet port, a second inlet port, a control port, and one or more outlet ports;
a first fluid channel configured to convey fluid from the first inlet port to at least one of the one or more outlet ports;
a second fluid channel configured to convey fluid from the second inlet port to at least one of the one or more outlet ports; and
a piston comprising:
  a first restricting gate transmission element configured to:
    block, when the piston is in a first position, the first fluid channel; and
    unblock, when the piston is in a second position, the first fluid channel;
  a second restricting gate transmission element configured to:
    block, when the piston is in the second position, the second fluid channel; and
    unblock, when the piston is in the first position, the second fluid channel;
  a first controlling gate transmission element configured to interface with a first control pressure from the control port, wherein the first control pressure, when applied to the first controlling gate transmission element, forces the piston towards the first position; and a second controlling gate transmission element configured to interface with a second control pressure, wherein the second control pressure, when applied to the second controlling gate transmission element, forces the piston towards the second position.

2. The fluidic valve of claim 1, wherein:
the one or more outlet ports comprise a single outlet port;
the first fluid channel is configured to convey fluid from the first inlet port to the single outlet port; and
the second fluid channel is configured to convey fluid from the second inlet port to the single outlet port.

3. The fluidic valve of claim 1, further comprising an additional control port through which the second control pressure may be applied to the second controlling gate transmission element.

4. The fluidic valve of claim 1, wherein the second control pressure is a mechanical preload force.

5. The fluidic valve of claim 1, wherein a surface area of the first controlling gate transmission element is different than a surface area of the second controlling gate transmission element.

6. The fluidic valve of claim 1, further comprising an interstitial-pressure port, wherein the piston further comprises:
a third controlling gate transmission element located between the first controlling gate transmission element and the second controlling gate transmission element and configured to interface with a third control pressure from the interstitial-pressure port, wherein the third control pressure, when applied to the third controlling gate transmission element, forces the piston towards the first position; and
a fourth controlling gate transmission element located between the first controlling gate transmission element and the second controlling gate transmission element and configured to interface with the third control pressure, wherein the third control pressure, when applied to the fourth controlling gate transmission element, forces the piston towards the second position.

7. The fluidic valve of claim 1, further comprising:
a first one or more additional control ports; and
a second one or more additional control ports, wherein the piston further comprises:
a first one or more additional controlling gate transmission elements configured to respectively interface with a first one or more additional control pressures from a respective one of the first one or more additional control ports, wherein each of the first one or more additional control pressures, when applied to a respective one of the first one or more additional controlling gate transmission elements, forces the piston towards the first position; and
a second one or more additional controlling gate transmission elements configured to respectively interface with a second one or more additional control pressures from a respective one of the second one or more additional control ports, wherein each of the second one or more additional control pressures, when applied to a respective one of the second one or more additional controlling gate transmission elements, forces the piston towards the second position.

8. A fluidic system comprising:
a plurality of fluid-pressure sources;
one or more fluid-pressure loads; and
a fluidic valve comprising:
a first inlet port, a second inlet port, and a control port, wherein at least one of the first inlet port, the second inlet port, or the control port are coupled to one of the plurality of fluid-pressure sources;
one or more outlet ports, each of the one or more one or more outlet ports being coupled to a corresponding one of the one or more fluid-pressure loads;
a first fluid channel configured to convey fluid from the first inlet port to at least one of the one or more outlet ports;
a second fluid channel configured to convey fluid from the second inlet port to at least one of the one or more outlet ports; and
a piston comprising:
a first restricting gate transmission element configured to:
block, when the piston is in a first position, the first fluid channel; and
unblock, when the piston is in a second position, the first fluid channel;
a second restricting gate transmission element configured to:
block, when the piston is in the second position, the second fluid channel; and
unblock, when the piston is in the first position, the second fluid channel;
a first controlling gate transmission element configured to interface with a first control pressure from the control port, wherein the first control pressure, when applied to the first controlling gate transmission element, forces the piston towards the first position; and
a second controlling gate transmission element configured to interface with a second control pressure, wherein the second control pressure, when applied to the second controlling gate transmission element, forces the piston towards the second position.

9. The fluidic system of claim 8, wherein:
the one or more outlet ports comprise a single outlet port;
the first fluid channel is configured to convey fluid from the first inlet port to the single outlet port; and
the second fluid channel is configured to convey fluid from the second inlet port to the single outlet port.

10. The fluidic system of claim 8, further comprising an additional control port through which the second control pressure may be applied to the second controlling gate transmission element.

11. The fluidic system of claim 8, wherein the second control pressure is a mechanical preload force.

12. The fluidic system of claim 8, wherein a surface area of the first controlling gate transmission element is different than a surface area of the second controlling gate transmission element.

13. The fluidic system of claim 8, wherein:
the fluidic valve further comprises:
a first one or more additional control ports; and
a second one or more additional control ports; and
the piston further comprises:
a first one or more additional controlling gate transmission elements configured to respectively interface with a first one or more additional control pressures from a respective one of the first one or more additional control ports, wherein each of the first one or more additional control pressures, when applied to a respective one of the first one or more additional controlling gate transmission elements, forces the piston towards the first position; and a second one or more additional controlling gate transmission elements configured to respectively interface with a second one or more additional control pressures from a respective one of the second one or more additional control ports, wherein each of the second one or more additional control pressures, when applied to a respective one of the second one or more additional controlling gate transmission elements, forces the piston towards the second position.

14. The fluidic system of claim 8, wherein the one or more fluid-pressure loads comprise one or more expansive cavities within a haptic feedback device.

15. A fluidic system comprising:
a plurality of fluid-pressure sources;
a fluid-pressure load; and
a fluidic valve comprising:
  an inlet port, a control port, and an outlet port;
  a fluid channel configured to convey fluid from the inlet port to the outlet port;
  a piston comprising:
    a restricting gate transmission element configured to:
      block, when the piston is in a first position, the fluid channel; and
      unblock, when the piston is in a second position, the fluid channel;
    a first controlling gate transmission element configured to interface with a first control pressure from the control port, wherein the first control pressure, when applied to the first controlling gate transmission element, forces the piston towards the first position; and
    a second controlling gate transmission element configured to interface with a second control pressure, wherein the second control pressure, when applied to the second controlling gate transmission element, forces the piston towards the second position.

16. The fluidic system of claim 15, further comprising an additional control port through which the second control pressure may be applied to the second controlling gate transmission element.

17. The fluidic system of claim 16, wherein:
the fluidic valve is configured as a normally open valve;
a surface area of the first controlling gate transmission element is greater than a surface area of the second controlling gate transmission element; and
the plurality of fluid-pressure sources comprises:
  an input pressure source coupled to the inlet port;
  a gate pressure source coupled to the control port; and
  a high-pressure source coupled to the additional control port.

18. The fluidic system of claim 16, wherein:
the fluidic valve is configured as a normally closed valve;
a surface area of the first controlling gate transmission element is less than a surface area of the second controlling gate transmission element; and
the plurality of fluid-pressure sources comprises:
  an input pressure source coupled to the inlet port;
  a gate pressure source coupled to the additional control port; and
  a high-pressure source coupled to the control port.

19. The fluidic valve of claim 15, wherein the second control pressure is a mechanical preload force.

20. The fluidic system of claim 15, wherein the fluid-pressure load comprises an expansive cavity within a haptic feedback device.

* * * * *